US011625305B2

(12) United States Patent
Chopra et al.

(10) Patent No.: US 11,625,305 B2
(45) Date of Patent: Apr. 11, 2023

(54) METHOD AND SYSTEM FOR INDEXING FRAGMENTED USER DATA OBJECTS

(71) Applicant: EMC IP Holding Company LLC, Hopkinton, MA (US)

(72) Inventors: Shelesh Chopra, Bangalore (IN); Sunil Yadav, Bangalore (IN); Jigar Premajibhai Bhanushali, Valsad (IN); Tushar Dethe, Bangalore (IN); Himanshu Arora, Bangalore (IN); Deependra Pratap Singh, Kanpur (IN); Sapna Chauhan, Bangalore (IN); Anjana Rao, Mangalore (IN); Amarendra Behera, Bangalore (IN); Ravi V. Chitloor, Bengaluru (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 191 days.

(21) Appl. No.: 16/886,456

(22) Filed: May 28, 2020

(65) Prior Publication Data

US 2021/0191822 A1    Jun. 24, 2021

(30) Foreign Application Priority Data

Dec. 20, 2019    (IN) .............................. 201941053078

(51) Int. Cl.
*G06F 11/14*    (2006.01)
*G06F 21/62*    (2013.01)
*H04L 51/42*    (2022.01)

(52) U.S. Cl.
CPC ...... *G06F 11/1464* (2013.01); *G06F 11/1451* (2013.01); *G06F 11/1453* (2013.01);
(Continued)

(58) Field of Classification Search
None
See application file for complete search history.

(56) References Cited

U.S. PATENT DOCUMENTS 6,886,024 B1    4/2005    Fujita et al.
8,375,008 B1 *  2/2013    Gomes .................. G06F 16/10
                                                707/694

(Continued)

OTHER PUBLICATIONS

Kim et al. "HEDS: Hybrid Deduplication Approach for Email Servers." 2012. IEEE. ICUFN 2012. pp. 97-102. (Year: 2012).*

(Continued)

*Primary Examiner* — Nathan Sadler
(74) *Attorney, Agent, or Firm* — Chamberlain, Hrdlicka, White, Williams & Aughtry

(57) ABSTRACT

A system including persistent storage for storing an object repository and a user data backup. The system also includes a manager that obtains fragmented user data associated with an object that is potentially duplicative of an object stored in the object repository; makes a determination that the object is duplicative based on a copy of the object stored in the object repository; in response to making the determination, adds the fragmented user data to a user data backup without adding the object to the backup; associates the fragmented user data in the user data backup with the copy of the object stored in the object repository; and stores the user data backup in the persistent storage.

17 Claims, 29 Drawing Sheets

(52) U.S. Cl.
CPC .......... *G06F 11/1469* (2013.01); *G06F 21/62* (2013.01); *H04L 51/42* (2022.05); *G06F 2201/80* (2013.01); *G06F 2201/84* (2013.01)

(56) References Cited

U.S. PATENT DOCUMENTS

| | | | |
|---|---|---|---|
| 8,751,449 B2 | 6/2014 | Carmichael | |
| 8,751,456 B2 | 6/2014 | Carmichael | |
| 8,775,486 B2 | 7/2014 | Carmichael | |
| 8,825,769 B2 | 9/2014 | Zheleva | |
| 8,959,060 B2 | 2/2015 | Carmichael | |
| 9,355,245 B2 | 5/2016 | Zheleva | |
| 9,460,105 B2 | 10/2016 | Carmichael | |
| 9,485,269 B2 | 11/2016 | Zheleva | |
| 9,647,975 B1 | 5/2017 | Dedenok | |
| 10,708,297 B2 | 7/2020 | Woods et al. | |
| 11,095,586 B2 | 8/2021 | Giura et al. | |
| 2004/0221295 A1* | 11/2004 | Kawai | H04L 51/08 719/313 |
| 2005/0060643 A1 | 3/2005 | Glass et al. | |
| 2005/0114450 A1* | 5/2005 | DeVos | H04L 51/08 709/206 |
| 2007/0113035 A1 | 5/2007 | Devos | |
| 2008/0133487 A1 | 6/2008 | Gross et al. | |
| 2011/0016091 A1* | 1/2011 | Prahlad | G06F 16/1748 707/654 |
| 2013/0232119 A1 | 9/2013 | Aronovich et al. | |
| 2014/0298214 A1 | 10/2014 | Machalani et al. | |
| 2015/0212889 A1 | 7/2015 | Amarendran et al. | |
| 2017/0329677 A1 | 11/2017 | Crofton et al. | |
| 2019/0102078 A1 | 4/2019 | Bhatt et al. | |
| 2019/0286726 A1 | 9/2019 | Labian | |
| 2019/0306167 A1 | 10/2019 | Lamanna et al. | |
| 2020/0034248 A1 | 1/2020 | Nara et al. | |
| 2020/0159413 A1 | 5/2020 | Seal et al. | |
| 2020/0379848 A1* | 12/2020 | Ekram | G06F 40/10 |

OTHER PUBLICATIONS

Kim et al. "SAFE: Structure-Aware File and Email Deduplication for Cloud-based Storage Systems." 2013. IEEE. CloudNet 2013. pp. 103-137. (Year: 2013).*

* cited by examiner

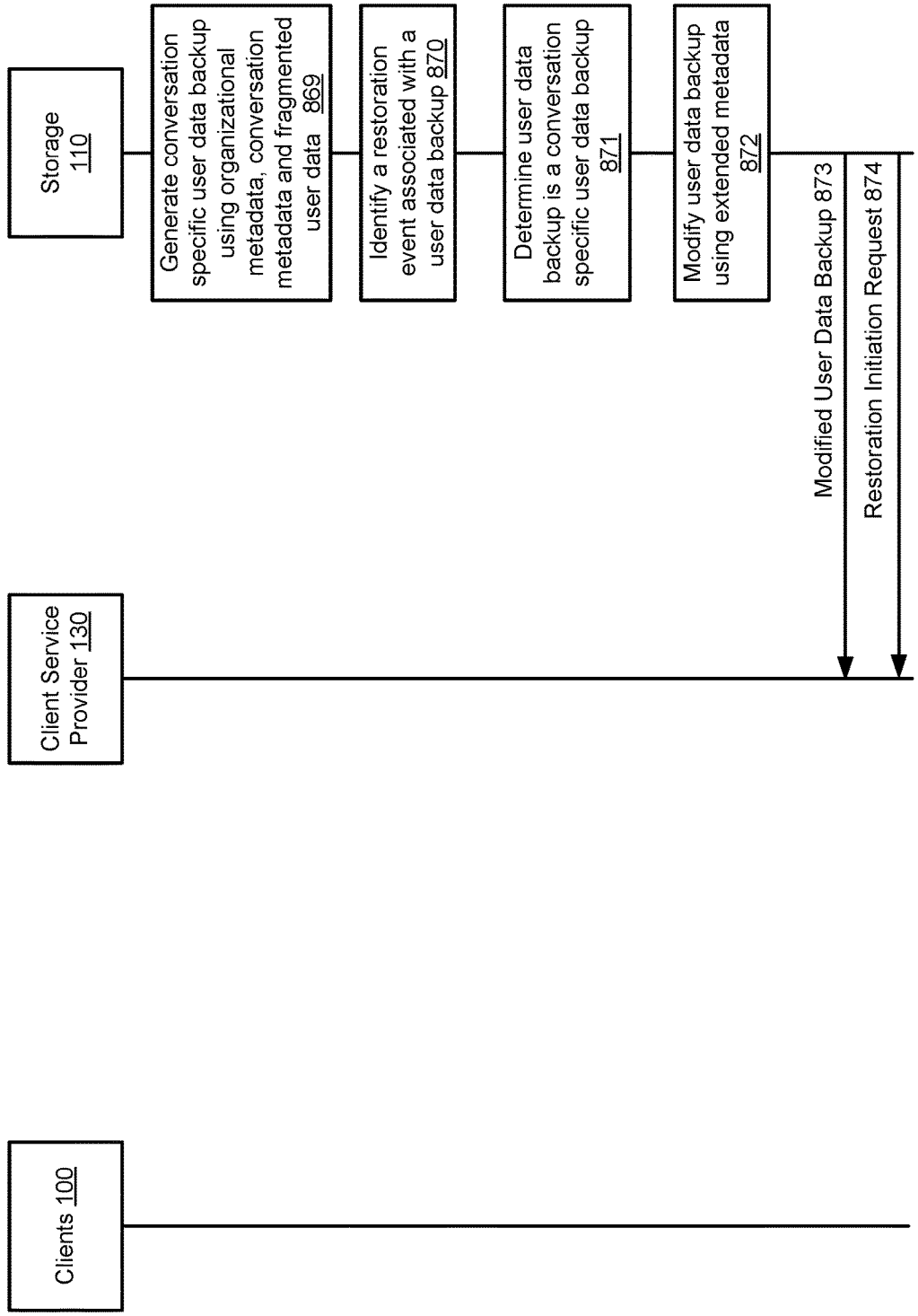

METHOD AND SYSTEM FOR INDEXING FRAGMENTED USER DATA OBJECTS

CROSS-REFERENCE TO RELATED APPLICATION

This application claims priority to Indian Patent Application No. 201941053078, filed Dec. 20, 2019, which is incorporated by reference herein in its entirety.

BACKGROUND

Devices may generate information based on existing information. For example, devices may obtain information and derive information based on the obtained information. To obtain information, devices may be able to communicate with other devices. The communications between devices may be through any means.

SUMMARY

In general, in one aspect, the invention relates to a system for providing backup services for limited-access user data. The system includes persistent storage for storing an object repository and a user data backup. The system also includes a manager that obtains fragmented user data associated with an object that is potentially duplicative of an object stored in the object repository; makes a determination that the object is duplicative based on a copy of the object stored in the object repository; in response to making the determination, adds the fragmented user data to a user data backup without adding the object to the backup; associates the fragmented user data in the user data backup with the copy of the object stored in the object repository; and stores the user data backup in the persistent storage.

In general, in one aspect, the invention relates to a method for providing backup services for limited-access user data. The method includes obtaining fragmented user data associated with an object that is potentially duplicative of an object stored in the object repository, making a determination, that the object is duplicative based on a copy of the object stored in the object repository, in response to making the determination, adding the fragmented user data to a user data backup without adding the object to the backup, associating the fragmented user data in the user data backup with the copy of the object stored in the object repository, and storing the user data backup in the persistent storage.

In general, in one aspect, the invention relates to a non-transitory computer readable medium which includes computer readable program code, which when executed by a computer processor enables the computer processor to performs a method. The method includes obtaining fragmented user data associated with an object that is potentially duplicative of an object stored in the object repository, making a determination, that the object is duplicative based on a copy of the object stored in the object repository, in response to making the determination, adding the fragmented user data to a user data backup without adding the object to the backup, associating the fragmented user data in the user data backup with the copy of the object stored in the object repository, and storing the user data backup in the persistent storage.

BRIEF DESCRIPTION OF DRAWINGS

FIGS. 8A-8J show diagrams of examples in accordance with one or more embodiments of the invention.

DETAILED DESCRIPTION

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

In general, embodiments of the invention relate to a method and system for generating user data backups of limited-access user data using indexing data. More specifically, embodiments of the invention relate to deleting duplicative objects of the fragmented user data to improve the computational efficiency of protecting limited-access user data using the indexing data. The indexing data may include an object repository that tracks the user data objects stored in a storage and the storage locations of each object. The indexing data may be updated based on the user data objects included and/or discarded from user data backups. Therefore, the computational efficiency of protecting limited-access user data is improved.

Figure 1A:
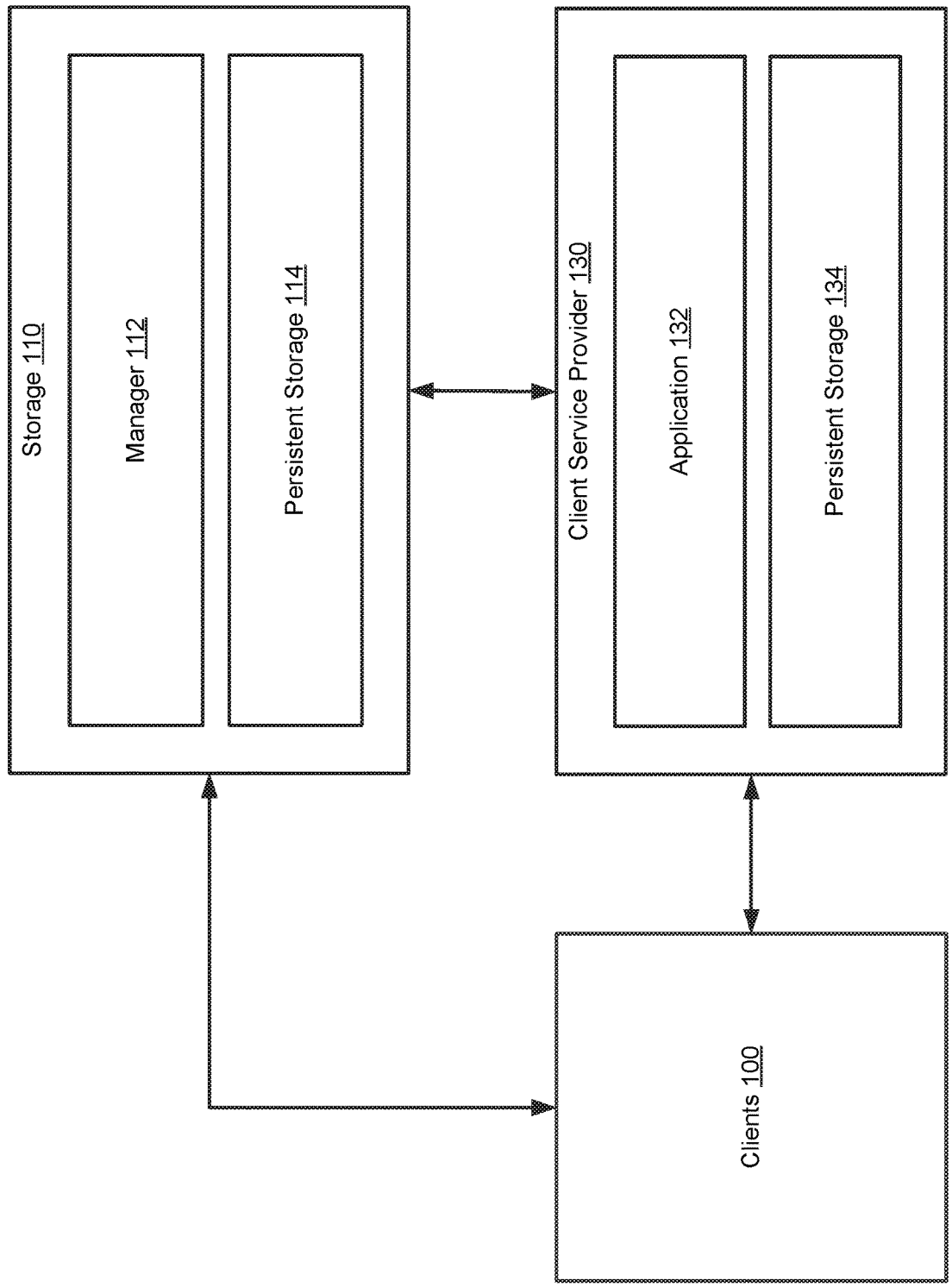
FIG. 1A shows diagram of a system in accordance with one or more embodiments of the invention.

FIG. 1A shows a diagram of a system in accordance with one or more embodiments of the invention. The system may include any number of clients (100), a storage (110), and a client service provider (130).

The clients (100), operated by users, may utilize services provided by the client service provider (130). For example, the client service provider (130) may provide data storage services, electronic mail services, instant messaging services, etc. that may be utilized by the clients. The client service provider (130) may host an application (132) that provides all, or a portion, of the services provided by the client service provider (130).

When the clients (100) utilize the services provided by the client service provider (130), data (e.g., user data) that is relevant to the clients (100) may be stored in persistent storage (134) of the client service provider (130). However, the user data may be lost, become corrupt, inaccessible, or undesirable for other reasons. Therefore, it may be desirable to obtain or store backups of user data. For example, it may be desirable to store such backups in the storage (110) so that if the data stored in the client service provider (130) becomes undesirable, the backups may be used to restore the user data.

However, the user data may be limited-access user data. The limited-access user data may not be easily accessed. In other words, additional and/or special methods may be required to obtain the limited-access user data. For example, the application (132) may gate or otherwise restrict access to all, or a portion, of the limited-access user data.

To enable the user data of the client service provider (130) to be restored, embodiments of the invention may provide a system that provides backup services and restoration services. By doing so, the user data stored in the client service provider (130) may restored to previous forms.

The backup services provided by the system of FIG. 1A may include generating user data backups of limited-access user data stored on the client service provider (130). The backup services may also include storing the user data backups in the storage (110) for future use.

The restoration services may include restoring limited-access user data on the client service provider (130) to previous point in time using the user data backups stored in the storage (110).

The system may include additional, fewer, and/or different components without departing from the invention. Each component may be operably connected to any of the other components via any combination of wired and/or wireless connections. Each of the components of the system illustrated in FIG. 1A is discussed below.

The clients (100) may be implemented using computing devices. The computing devices may be, for example, mobile phones, tablet computers, laptop computers, desktop computers, servers, or cloud resources. The computing devices may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform the functions described in this application and/or all, or a portion, of the methods illustrated in FIGS. 3A-7B. The clients (100) may be implemented using other types of computing devices without departing from the invention. For additional details regarding computing devices, refer to FIG. 9.

The clients (100) may be implemented using logical devices without departing from the invention. For example, the clients (100) may include virtual machines that utilize computing resources of any number of physical computing devices to provide the functionality of the clients (100). The clients (100) may be implemented using other types of logical devices without departing from the invention.

In one or more embodiments of the invention, the clients obtain computer implemented services from the client service provider (130). A computer implemented service may be, for example, managing a database, serving files, and/or other types of computer implemented services that may be utilized by users of the clients. The computer implemented services may be other types of services without departing from the invention.

When using the computer implemented services provided by the client service provider (130), the clients (100) may generate and/or obtain user data which may be stored in the client service provider (130).

For example, when using data database services, the clients (100) may store information from a user in a database. Users of the clients (100) may desire access to the aforementioned information in the future. Consequently, the future availability of the user data stored in the database may be valuable to the users of the clients (100).

Similarly, other entities may desire to access to all, or a portion, of the user data stored in the client service provider (130) at future points in time. For example, other entities may desire to obtain access to information in a database hosted by the client service provider (130).

To improve the likelihood that such user data is available in the future, the clients (100) may utilize backup and/or restoration services provided by the storage (110) and/or client service provider (130). As discussed above, the backup and/or restoration services provided by the storage (110) may include the orchestration of user data backup generation, storage of user data backups, and/or using user data backups to restore user data.

When utilizing the backup and/or restoration services provided by the storage (110), the clients (100) may grant permission to the storage (110) to access user data located in the client service provider (130). By doing so, the storage (110) may obtain user data from the client service provider (130) and generate user data backups.

The storage (110) may be implemented using computing devices. The computing devices may be, for example, mobile phones, tablet computers, laptop computers, desktop computers, servers, or cloud resources. The computing devices may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform the functions described in this application and/or all, or a portion, of the methods illustrated in FIGS. 3A-7B. The storage (110) may be implemented using other types of computing devices without departing from the invention. For additional details regarding computing devices, refer to FIG. 9.

The storage (110) may be implemented using logical devices without departing from the invention. For example, the storage (110) may include virtual machines that utilize computing resources of any number of physical computing devices to provide the functionality of the storage (110). The storage (110) may be implemented using other types of logical devices without departing from the invention.

In one or more embodiments of the invention, the storage (110) provides backup services and/or restoration services to the clients (100). The backup and/or restoration may include (i) generating user data backups of limited-access user data, (ii) generating incremental user data backups of limited-access user data backups, (iii) generating user data backups using indexing data, (iv) generating conversation specific user data backups, (v) generating user data visualization enhanced user data backups, and (vii) restoring user data using user data backups. The storage (110) may provide other and/or additional services without departing from the invention.

To provide the above noted of the storage (110), the storage (110) may include a manager (112) and persistent storage (114).

The manager (112) may provide the backup and/or restoration services, as discussed above, and/or includes functionality to (i) obtain fragmented user data and organizational metadata from the client service provider (130), (ii) perform change analysis, (iii) determine whether fragmented user data is associated with a conversation or a user data visualization, (iv) obtain conversation metadata and user data visualization metadata, (v) determine whether a fragmented user data object is included in indexing data, (vii) generating, updating, and/or modifying backup metadata, status metadata user data backups, indexing data, fragmented user data, and web-hooks, and (viii) identifying protection policy events. The manager (112) may provide other and/or additional services and include other and/or additional functionalities without departing from the invention.

The manager (112) may be implemented using a physical device. The physical device may include circuitry. The physical device may be, for example, a field-programmable gate array, application specific integrated circuit, programmable processor, microcontroller, digital signal processor, or other hardware processor. The physical device may be adapted to provide the functionality of the manager (112) described throughout this application and/or all or a portion of the methods illustrated in FIGS. 3A-7B. The manager (112) may be some other physical device without departing from the invention.

The manager (112) may be implemented using computer instructions (e.g., computing code) stored on a persistent storage (e.g., 114) that when executed by a processor of the storage (110) causes the storage (110) to perform the functionality of the manager (112) described throughout this application and/or all or a portion of the methods illustrated in FIGS. 3A-7B.

The manager (112) may utilize and/or generate data structures stored in the persistent storage (114) of the storage (110). The persistent storage may be implemented using one or more physical storage devices and/or a logical storage device.

A physical storage device may be hard disk drives, solid state disk drives, tape drives, and/or any other physical storage mediums for the storage of data.

The logical storage device (e.g., virtualized storage) may be a logical entity that utilizes any quantity of storage resources of any number of computing devices for storing data. For example, the logical storage device may utilize portions of storage resources provided by any combination of hard disk drives, solid state disk drives, tape drives, and/or any other physical storage medium of any number of computing devices. The logical storage device may be another type of logical storage without departing from the invention.

In one or more embodiments of the invention, the persistent storage (114) provides data storage services. The data storage services may include storing of data and providing of previously stored data. The persistent storage (114) may provide other and/or additional services without departing from the invention. For additional information regarding the persistent storage (114) of the storage (110), refer to FIG. 1B.

The client service provider (130) may be implemented using computing devices. The computing devices may be, for example, mobile phones, tablet computers, laptop computers, desktop computers, servers, or cloud resources. The computing devices may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform the functions described in this application and/or all, or a portion, of the methods illustrated in FIGS. 3A-7B. The client service provider (130) may be implemented using other types of computing devices without departing from the invention. For additional details regarding computing devices, refer to FIG. 9.

In one or more embodiments of the invention, the client service provider (130) is implemented using a logical device. The logical device may utilize the computing resources of any number of computing devices and thereby provide the functionality of the client service provider (130) described throughout this application.

In one or more embodiments of the invention, the client service provider (130) hosts an application (132). The application may be a logical entity executed using computing resources (not shown) of the client service provider (130). The application (132) may perform a process. In one or more embodiments of the invention, the application (132) provides a service to users, e.g., the clients (100). The application may be, for example, an instance of a database, an email server, and/or other applications without departing from the invention.

The application (132) may include the functionality to control the access to the limited-access user data generated by users of the client service provider (130). The application (132) may, through application programming interface (API) calls, provide portions of the limited-access user data to the storage (110) and/or other entities with authorization to access the limited-access user data stored on the client service provider (130). The application may include other and/or additional functionality without departing from the invention.

In one or more embodiments of the invention, the application (132) is implemented using computer instructions, e.g., computer code, stored on a persistent storage (e.g., 134) that when executed by a processor(s) of a computing device (see, e.g., FIG. 9) cause the computing device to provide the functionality of the application (132) described throughout this application.

While using the application (132), users may generate and/or obtain user data that may be stored in persistent storage (134). The persistent storage (134) may be implemented using one or more physical storage devices and/or logical storage devices.

A physical storage device may be hard disk drives, solid state disk drives, tape drives, and/or any other physical storage mediums for the storage of data.

The logical storage device (e.g., virtualized storage) may be a logical entity that utilizes any quantity of storage resources of any number of computing devices for storing data. For example, the logical storage device may utilize portions of storage resources provided by any combination of hard disk drives, solid state disk drives, tape drives, and/or any other physical storage medium of any number of computing devices. The logical storage device may be another type of logical storage without departing from the invention.

In one or more embodiments of the invention, the persistent storage (134) provides data storage services. The data storage services may include storing of data and providing of previously stored data. The persistent storage (134) may provide other and/or additional services without departing from the invention. For additional information regarding the persistent storage (134) of the client service provider (130), refer to FIG. 1C.

While the system of FIG. 1A has been described and illustrated as including a limited number of components for the sake of brevity, a system in accordance with embodiments of the invention may include additional, fewer, and/or different components than those illustrated in FIG. 1A without departing from the invention.

Figure 1B:
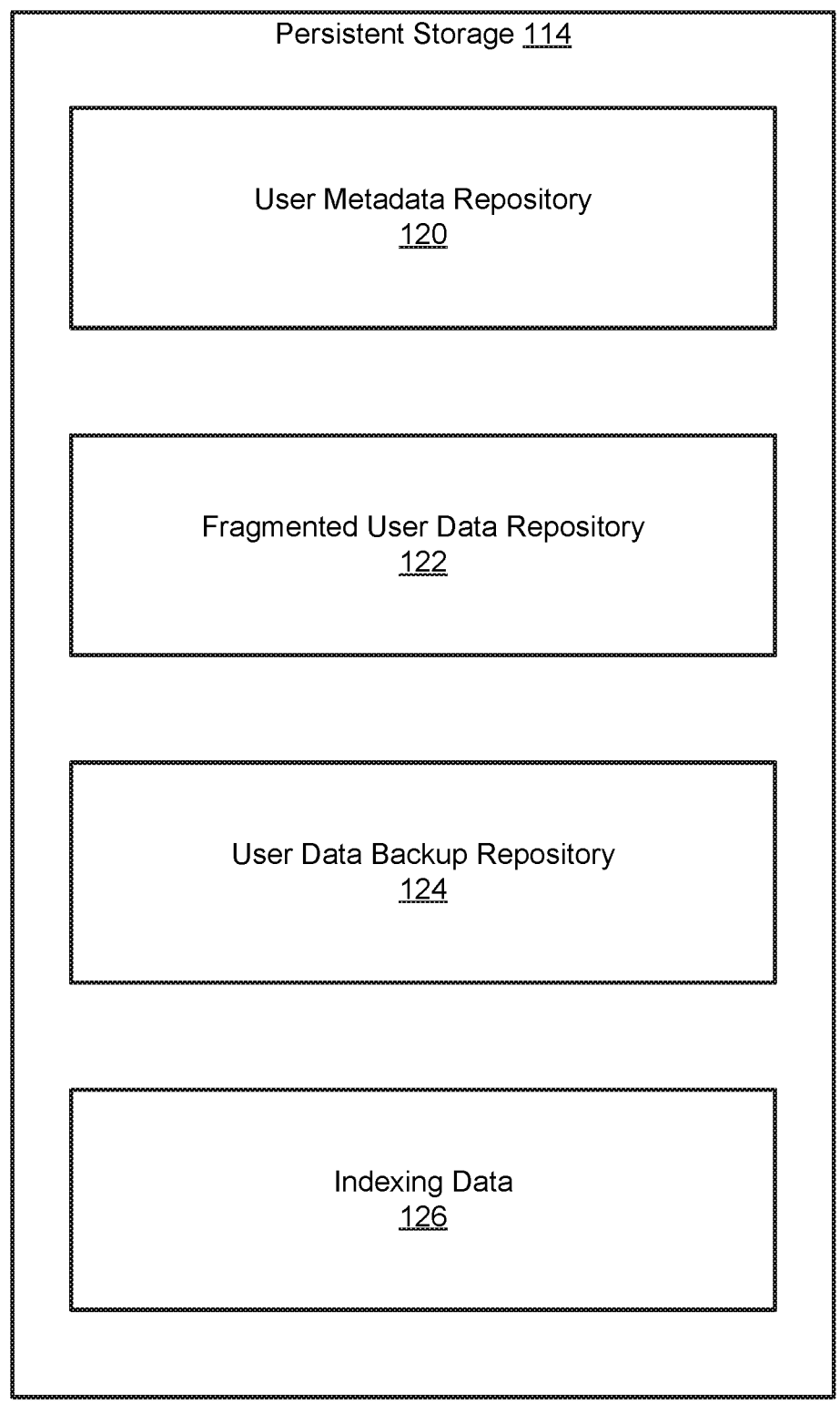
FIG. 1B shows a diagram of a persistent storage of a storage in accordance with one or more embodiments of the invention.

As discussed above, the storage (110) in accordance with embodiments of the invention may include persistent storage (114). FIG. 1B shows a diagram of the persistent storage (114) of the storage (110) of FIG. 1A in accordance with one or more embodiments of the invention. As discussed above, the persistent storage (114) may store data structures generated, obtained, and/or used by the manager (112). The persistent storage may include a user metadata repository (120), a fragmented user data repository (122), a user data backup repository (124), and indexing data (126). Each of these data structures stored in the persistent storage (114) of the storage (110) is discussed below.

The user metadata repository (120) may include one or more data structures that may be used to identify, access, and obtain user data stored in persistent storage (134) of the client service provider (130). The user metadata repository (120) may include user identifiers, user protection policies, and/or user security data. The user metadata repository may include other and/or additional information without departing from the invention. The information in the user metadata repository (120) may be obtained by the manager (112, FIG. 1A) of the storage (110, FIG. 1A) directly from the clients (100) or from the client service provider (130). The manager (112) may use the user metadata of the user metadata repository (120) to access a user's user data on the client service provider (130) as discussed above. The user metadata repository (130) may be used by the manager (112, FIG. 1A) for other and/or additional purposes without departing from the invention. For additional information regarding the user metadata repository (120), refer to FIG. 2A.

The fragmented user data repository (122) may be one or more data structures that may be used to generate user data backups (full and incremental), conversation specific user data backups, and user data visualization enhanced user data backups. The fragmented user data repository (122) may include fragmented user data and metadata associated with the fragmented user data. The fragmented user data and the associated metadata of the fragmented user data repository (122) may be obtained by the manager (112, FIG. 1A) of the storage (110, FIG. 1A) from the client service provider (130, FIG. 1A). The manager (112, FIG. 1A) may use the fragmented user data and the associated metadata to generate user data backups as discussed above. The manager (112, FIG. 1A) may use the information in the fragmented user data repository (122) for other and/or additional purposes without departing from the invention.

The fragmented user data of the fragmented user data repository (122) may include data chunks and/or portions of data chunks of user data objects obtained from a limited-access user data repository stored in persistent storage (134, FIG. 1A) of the client service provider (130, FIG. 1A). The limited-access user data repository may include one or more user data objects. The user data objects may include data structures generated by users using an application of the client service provider (130A, FIG. 1A). Each user data object may include one or more data chunks. The manager (112, FIG. 1A) of the storage (110, FIG. 1A) may not include the functionality to access and/or obtain the user data stored in the limited-access user data repository as a whole required for backup generation services. The manager may only include the functionality to obtain the individual data chunks that comprise the user data objects. The individual data chunks obtained from the limited-access user data repository may be referred to as fragmented user data throughout this application.

For example, a user data object of the fragmented user data repository (122) may be an electronic communication object and the user data chunks associated with the user data object may be electronic mail communication. The data chunks may include the message(s) and attachments of the electronic mail communication object and other and/or additional information regarding the electronic mail communication object without departing from the invention.

As discussed above the fragmented user data repository may also include metadata associated with the fragmented user data. The metadata may be obtained by the manager (112, FIG. 1A) of the storage (110, FIG. 1A) from an organizational metadata repository (138, FIG. 1C). The metadata may include organizational metadata, conversation specific metadata, and user data visualization metadata. The metadata may include other and/or additional metadata without departing from the invention. The metadata may be associated with fragmented user data to generate user data backups. For additional information regarding the organizational metadata repository, organizational metadata, conversation specific metadata, and user data visualization metadata, refer to FIG. 1C.

The user data backup repository (124) may include one or more data structures that may be used to restore user data on the client service provider (130, FIG. 1A). The user data backup repository (124) may include user data for one or more users. Each user data may include one or user data backups. Each user data backup may include backup data and backup metadata. The user data backup repository (124) may include other and/or additional information without departing from the invention. The manager (112, FIG. 1A) of the storage (110, FIG. 1A) may generate the user data backups using fragmented user data and associated metadata (organizational metadata, conversation specific metadata, status metadata and/or user data visualization metadata) from the fragmented user data repository (122). The manager (112, FIG. 1A) of the storage (110, FIG. 1A) may use the user data backups of the user data backup repository (124) to restore user data on the client service provider (130, FIG. 1A). For additional information regarding the user data backup repository (124), refer to FIG. 2B.

The indexing data (126) may include one or more data structures that may be used to identify fragmented user data objects that are already stored in persistent storage (114) and the corresponding fragmented user data object references associated with the fragmented user data objects. The indexing data (126) may include an object repository and object mapping. The indexing data (126) may be generated and/or obtained using the fragmented user data of the fragmented user data repository (122). The indexing data (126) may be used by the manager (112, FIG. 1A) of the storage (110, FIG. 1A) to delete duplicative fragmented user data objects and, subsequently, improve storage capacity. For additional information regarding the indexing data (126), refer to FIG. 2D.

While the data structures (e.g., 120, 122, 124, 126) of the persistent storage (114) of the storage (110, FIG. 1A) are illustrated as separate data structures and have been discussed as including a limited amount of specific information, any of the aforementioned data structures may be divided into any number of data structures, combined with any number of other data structures, and may include additional, less, and/or different information without departing from the invention.

Additionally, while illustrated as being stored in the persistent storage (114), any of the aforementioned data structures may be stored in different locations (e.g., in persistent storage of other computing devices, in memory rather than persistent storage, in a combination of memory and persistent storage, etc.)) and/or spanned across any number of computing devices without departing from the invention. Any of the aforementioned data structures may be implemented using, for example, lists, tables, linked lists, databases, and/or other types of data structures.

Figure 1C:
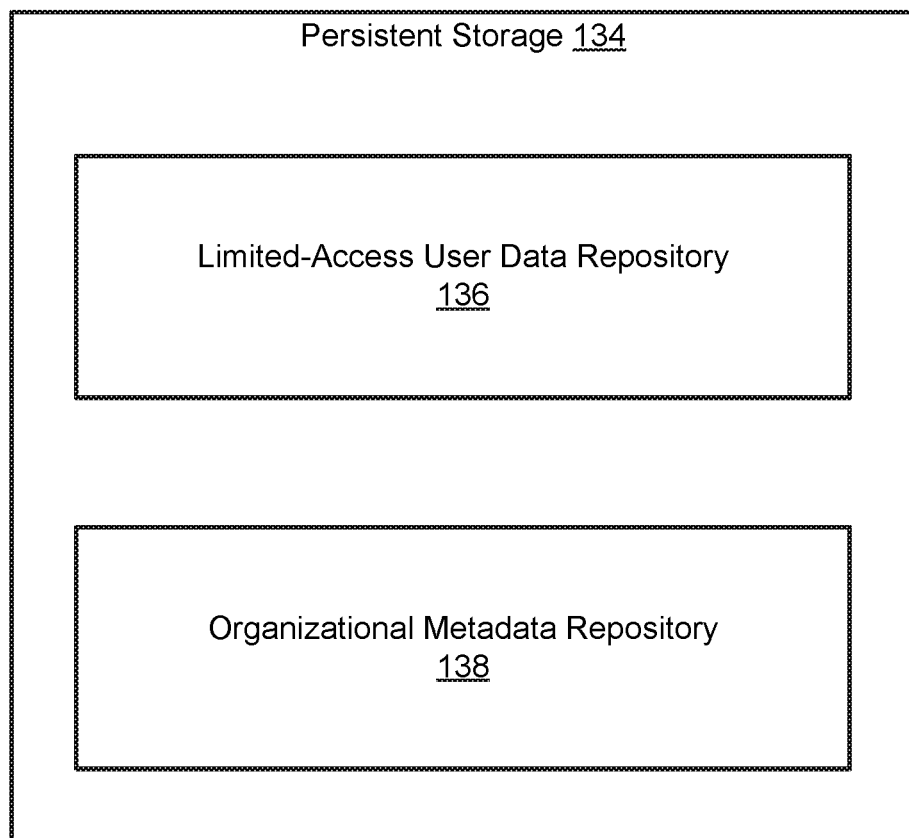
FIG. 1C shows a diagram of a persistent storage of a client service provider in accordance with one or more embodiments of the invention.

As discussed above, the client service provider (130) in accordance with embodiments of the invention may include persistent storage. FIG. 1C shows a diagram of the persistent storage (134) of the client service provider (130) of FIG. 1A in accordance with one or more embodiments of the invention. As discussed above, the persistent storage (134) may store data structures generated by users (e.g., clients (100, FIG. 1A)) of the client service provider (130) that may be obtained and/or used by the storage (110, FIG. 1A). The persistent storage (134) of the client service provider (130) may include a limited-access user data repository (136) and an organizational metadata repository (138). Each of the data structures stored in the persistent storage (134) of the client service provider (130) is discussed below.

The limited-access user data repository (136) may include one or more data structures that may be used to generate user data backups. The limited-access user data repository (136) may include user data generated by users of the client service provider (130, FIG. 1A) as discussed above. The user data may be database data, email data, calendar data, and/or other data generated by users of the client service provider without departing from the invention. Users (e.g., clients (100)) may use the user data of the limited-access user data repository (136) when obtaining computer implemented services from the client service provider (130). Additionally, the user data of the limited-access user data repository (136) may be obtained by the storage (110) for backup generation services. The user data of the limited-access user data repository (136) may be used by other and/or additional entities for other and/or additional purposes without departing from the invention.

The limited-access user data of the limited-access user data repository (136) may be stored in proprietary format that prevents other applications, users and/or other entities from reading and/or using the limited-access user data. The limited-access user data may not be accessed or used by other users, applications, or other entities without authorization. The limited-access user data may be encrypted using encryption keys associated with the application (132, FIG. 1B) and a specific user to secure the limited-access user data. The limited-access user data of the limited-access user data repository may be secured using other security methods without departing from the invention.

In one or more embodiments of the invention, access to the limited-access user data repository is gated by one or more applications. In other words, the data included in the limited-access user data repository may not be accessed by other entities without utilizing the functionality of the applications that maintain the limited-access user data repository. For example, the limited-access user data repository (136) may include one or more proprietary databases that are unreadable by entities other than an application (i.e., a database application) that maintains the database.

In one or more embodiments of the invention, the limited-access user data repository includes a database that stores electronic mail (or other types of message based) communications. The electronic mail communications may be associated with each other by, for example, forming conversations, time histories of message transmission, or other social-contextual information. The aforementioned information may be stored as, for example, metadata maintained by the database.

In one or more embodiments of the invention, the limited-access user data repository only stores and/or allows access to predetermined types and quantities (e.g., not all of the metadata maintained by the database) of metadata regarding the electronic mail communications. Consequently, requesting all, or a portion, of the metadata associated with an electronic mail communication may not provide sufficient information to determine one or more characteristics of the communication. Embodiments of the invention may address this, and other limited data availability problems, by synthesizing, reconstructing, or otherwise obtaining information regarding the electronic mail communications indirectly. For example, a system in accordance with embodiments of the invention may reconstruct information regarding relationships between electronic communication messages that is present but inaccessible by querying or otherwise requesting metadata from an application that gates access (e.g., controls access) to the database.

In one or more embodiments of the invention, the limited-access user data repository is gated by an application that includes limited options for populating the limited-access user data repository. For example, the application that gates access to the limited-access user data repository may only allow information to be added to the limited-access user data in predetermined manners.

In one or more embodiments of the invention, the application that gates access to the limited-access user data repository does not include functionality to perform restorations of the limited-access user data repository using backups of the limited-access user data repository. For example, the application (e.g., the API associated with the application) may only include functionality to (i) add data to the limited-access user data repository, (ii) remove data from the limited-access user data repository, (iii) obtain metadata regarding portions of the limited-access user data repository (e.g., fields or other types of discrete data constructs), and/or (iv) modify existing metadata.

In one or more embodiments of the invention, when data is added to the limited-access user data repository using the API, the application treats the data as newly added even if the data is a backup of data that was previously added to the limited-access user data repository. For example, if a field of a database of the limited-access user data repository is extracted using the API, adding the extracted data using the API may cause the application to treat the data as new rather than as a copy of a previous version of the data.

As discussed above, the storage (110, FIG. 1A) may have limited access to the user data of the limited-access user data repository (136). Therefore, the storage (110, FIG. 1A) may not be able to obtain whole user data of the limited-access user data repository (136) necessary to generate user data backups. The storage (110, FIG. 1A) may only be able to obtain portions of the user data included in the limited-access user data repository (136) and may perform backup generation services on the obtained portions of user data to properly protect the user data of the limited-access user data repository (136).

The organizational metadata repository (138) may include one or more data structures that may be used to generate user data backups. The organizational metadata repository (138) may include metadata associated with the user data of the limited-access user data repository. The organizational metadata repository (138) may include, for example, user data identifiers, creation timestamps, user identifiers and other and/or additional information regarding the user data of the limited-access user data repository (136) without departing from the invention. The metadata of the organizational metadata repository (138) may be generated by users (e.g., clients 100)) while using the computer implemented services provided by the client service provider (130, FIG. 1A) or by the application (132, FIG. 1A) of the client service provider (130, FIG. 1A). The users (e.g., clients 100)) may use the metadata of the organizational metadata repository (138) when obtaining the computer implemented services provided by the client service provider (130, FIG. 1A). Additionally, the storage (110) may use the metadata of the organizational metadata repository (138) to generate user data backups. The organizational metadata repository (138) may include, for example, organizational metadata, change information, conversation metadata, and user data visualization metadata and other and/or additional types of metadata without departing from the invention.

While the data structures (e.g., 136, 138) of the persistent storage (134) of the client service provider (130, FIG. 1A) are illustrated as separate data structures and have been discussed as including a limited amount of specific information, any of the aforementioned data structures may be divided into any number of data structures, combined with any number of other data structures, and may include additional, less, and/or different information without departing from the invention.

Additionally, while illustrated as being stored in the persistent storage (134), any of the aforementioned data structures may be stored in different locations (e.g., in persistent storage of other computing devices, in memory rather than persistent storage, in a combination of memory and persistent storage, etc.) and/or spanned across any number of computing devices without departing from the invention. Any of the aforementioned data structures may be implemented using, for example, lists, tables, linked lists, databases, and/or other types of data structures.

Figure 2A:
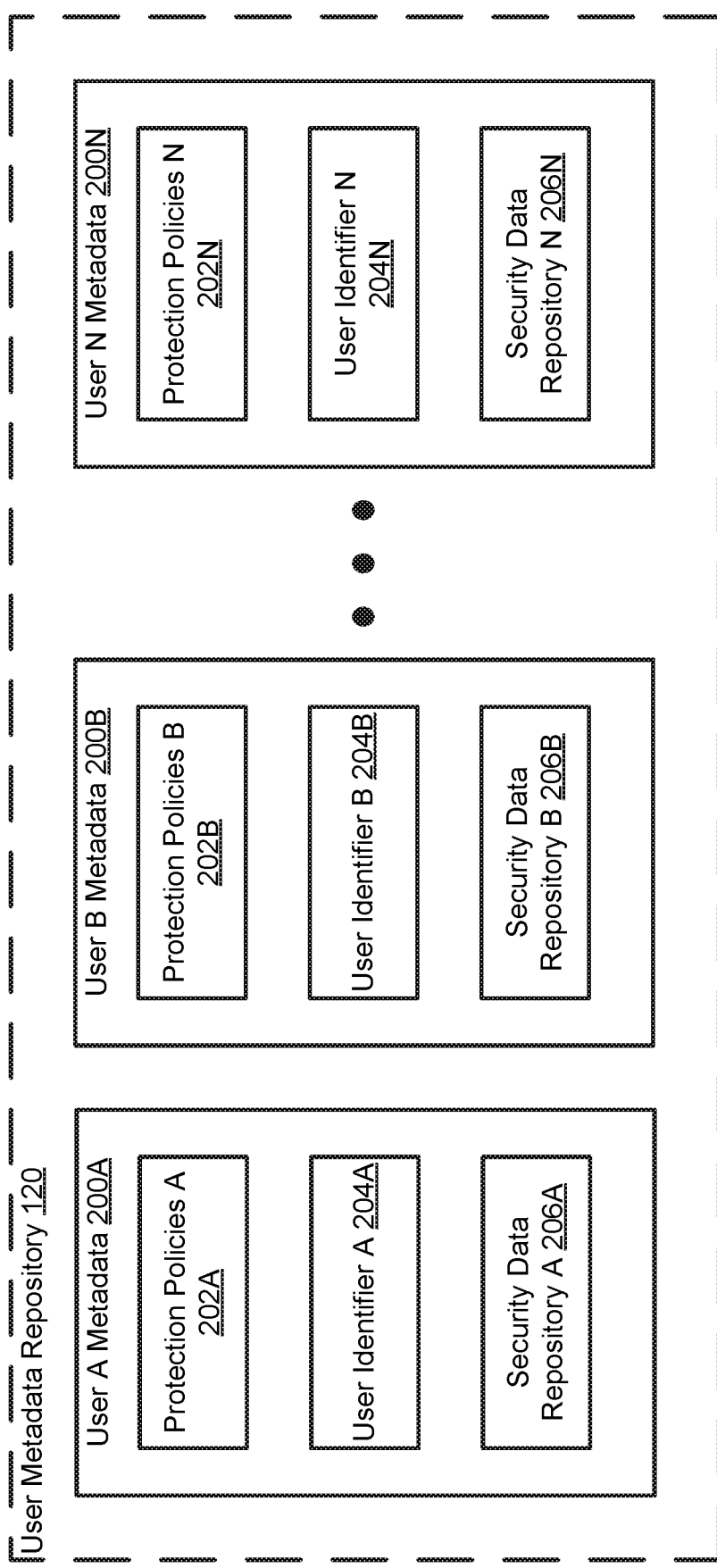
FIG. 2A shows a diagram of a user metadata repository in accordance with one or more embodiments of the invention.

As discussed above, the persistent storage of the storage may include a user metadata repository. FIG. 2A shows a diagram of a user metadata repository (120) of FIG. 1B in accordance with one or more embodiments of the invention. As discussed above, the user metadata repository may include information used to access limited-access user data stored in the client service provider (130, FIG. 1A). The user metadata repository (120) may include user A metadata (200A), user B metadata (200B), and user N metadata (200N). Each component of the user metadata repository (120) is discussed below.

The user A metadata (200A) may include one or more data structures that may be used to access user data and metadata associated with user A (not shown in FIG. 1A). The user A metadata (200A) may include protection policies A (202A), user identifier A (204A), and security data repository A (206A). User A metadata (200A) may include other and/or additional information regarding user A without departing from the invention. User A metadata (200A) may be obtained from clients (100). The manager (112, FIG. 1A) may send a request to the clients for user A metadata (200A) and, in response to the request, user A metadata (200A) may be obtained from the clients (100). The manager (112, FIG. 1A) of the storage (110, FIG. 1A) may use user A metadata to obtain user A data and associated metadata from the limited-access user data repository (136, FIG. 1C) and the organizational metadata repository (138, FIG. 1C). User A metadata (200A) may be used by other and/or additional entities for other and/or additional purposes without departing from the invention.

The user B metadata (200B) may include one or more data structures that may be used to access limited-access user data associated with user B (not shown in FIG. 1A). The user B metadata (200B) may include protection policies B (202B), user identifier B (204B), and security data repository B (206B). User B metadata (200B) may include other and/or additional information regarding user B without departing from the invention. User B metadata (200B) may be obtained from clients (100). The manager (112, FIG. 1A) may send a request to the clients for user B metadata (200B)

and, in response to the request, user B metadata (200B) may be obtained from the clients (100). The manager (112, FIG. 1A) of the storage (110, FIG. 1A) may use user B metadata to obtain user B data and associated metadata from the limited-access user data repository (136, FIG. 1C) and the organizational metadata repository (138, FIG. 1C). User B metadata (200B) may be used by other and/or additional entities for other and/or additional purposes without departing from the invention.

The user N metadata (200N) may include one or more data structures that may be used to access limited-access user data associated with user N (not shown in FIG. 1A). The user N metadata (200N) may include protection policies N (202N), user identifier N (204N), and security data repository N (206N). User N metadata (200N) may include other and/or additional information regarding user N without departing from the invention. User N metadata (200N) may be obtained from clients (100). The manager (112, FIG. 1A) may send a request to the clients for user N metadata (200N) and, in response to the request, user N metadata (200N) may be obtained from the clients (100). The manager (112, FIG. 1A) of the storage (110, FIG. 1A) may use user N metadata to obtain user N data and associated metadata from the limited-access user data repository (136, FIG. 1C) and the organizational metadata repository (138, FIG. 1C). User N metadata (200N) may be used by other and/or additional entities for other and/or additional purposes without departing from the invention.

The protection policies (e.g., 202A, 202B, 202N) may include one or more data structures that may be used to establish user data protection guidelines and requirements. The protection policies (e.g., 202A, 202B, 202N) may include information that denotes a user data backup schedule, user data backup types, and retention periods. The user data backup schedule may specify when a user data backup is to be generated. The user data backup types may specify what type of user data backup is to be generated (e.g., a full user data backup). The retention period may specify an amount of time a user data backup may not be modified and/or deleted from the storage (110, FIG. 1A). The protection policies (e.g., 202A, 202B, 202N) may include other and/or additional information that provides guidelines for protecting user data without departing from the invention. The protection policies (e.g., 202A, 202B, 202N) may be obtained from the users of the clients (100). The manager (112, FIG. 1A) may use protection policies (e.g., 202A, 202B, 202N) to determine when and how to generate user data backups. The protection policies (e.g., 202A, 202B, 202N) may be used by other and/or additional entities for other and/or additional purposes without departing from the invention.

The user identifiers (e.g., 204A, 204B, 204N) may include one or more data structures that may be used to identify a specific user of the clients (100). The user identifiers (e.g., 204A, 204B, 204N) may include a unique character, or a bit string that is associated with a specific user. The user identifiers (e.g., 204A, 204B, 204N) may include other and/or additional information that may be used to identify a specific user of the clients (100) without departing from the invention. The user identifiers (e.g., 204A, 204B, 204N) may be obtained upon request from the clients (100). The manager (112, FIG. 1A) may use the user identifiers (e.g., 204A, 204B, 204N) to identify user data associated with a specific user of the clients (100). The user identifiers (e.g., 204A, 204B, 204N) may be used by other and/or additional entities for other and/or additional purposes without departing from the invention.

The security data repositories (e.g., 206A, 206B, 206N) may include one or more data structures that may be used to obtain security clearance to access user data stored in the client service provider (130, FIG. 1A). The security data repositories (e.g., 206A, 206B, 206N) may include encryption keys, authorization information and/or other information that may be used to encrypt or otherwise secure user data stored in the client service provider without departing from the invention. The information included in the security data repositories (e.g., 206A, 206B, 206N) may be obtain upon request from the clients (100). The manager may use the information included in the security data repositories (e.g., 206A, 206B, 206N) to obtain access to user data stored in the client service provider (130, FIG. 1A) as discussed above. The security data repositories (e.g., 206A, 206B, 206N) may be used by other and/or additional entities for other and/or additional purposes without departing from the invention.

While the data structures (e.g., 200A, 200B, 200N) of the user metadata repository (120) of the persistent storage (114, FIG. 1A) are illustrated as separate data structures and have been discussed as including a limited amount of specific information, any of the aforementioned data structures may be divided into any number of data structures, combined with any number of other data structures, and may include additional, less, and/or different information without departing from the invention. Any of the aforementioned data structures may be implemented using, for example, lists, tables, linked lists, databases, and/or other types of data structures.

Figure 2B:
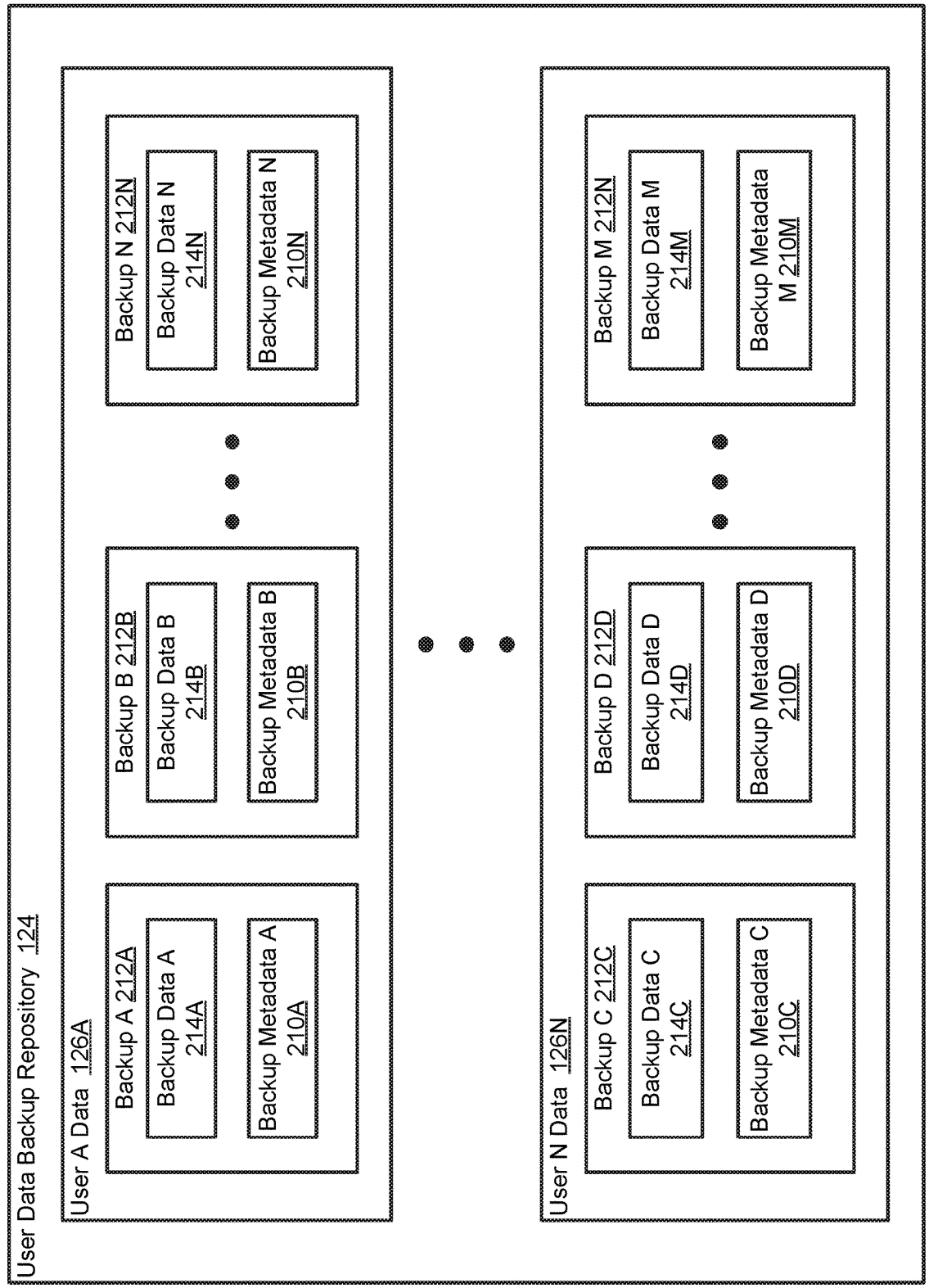
FIG. 2B shows a diagram of a user data backup repository in accordance with one or more embodiments of the invention.

As discussed above, the persistent storage of the storage may include a user data backup repository. FIG. 2B shows a diagram of a user data backup repository (124) of FIG. 1B in accordance with one or more embodiments of the invention. As discussed above, the user data backup repository may include information used to restore user data in the client service provider (130, FIG. 1A). The user data backup repository (124) may include user A data (126A) and user N data (126N). Each component of the user data backup repository (124) is discussed below.

The user A data (126A) may include one or more data structures that may be used to restore user data associated with user A (not shown in FIG. 1A). The user A data (126A) may include one or more backups (i.e., backup A (212A), backup B (212B), backup N (212N)). Each backup may include backup data (e.g., backup data A (214A), backup data B (214B), backup data N (214N)) and backup metadata (e.g., backup metadata A (210A), backup metadata B (210B), backup metadata N (210N)). User A data (126A) may include other and/or additional information regarding user A data without departing from the invention. User A data (126A) may be generated using fragmented user data and metadata (organizational metadata, conversation specific metadata, status metadata, and/or user data visualization metadata) from the fragmented user data repository (122, FIG. 1B). User A data (126A) may be used by the storage (110, FIG. 1A) to restore inaccessible user A data in the client service provider (130, FIG. 1A) as discussed above. User A data (126A) may be used by other and/or additional entities for other and/or additional purposes without departing from the invention.

The user N data (126N) may include one or more data structures that may be used to restore user data associated with user N (not shown in FIG. 1A). The user N data (126N) may include one or more backups (i.e., backup C (212C), backup D (212D), backup M (212M)). Each backup may include backup data (e.g., backup data C (214C), backup data D (214D), backup data M (214M)) and backup metadata (e.g., backup metadata C (210C), backup metadata D (210D), backup metadata M (210M)). User N data (126N) may include other and/or additional information regarding user N data without departing from the invention. User N data (126N) may be generated using fragmented user data and metadata (organizational metadata, conversation specific metadata, status metadata, and/or user data visualization metadata) from the fragmented user data repository (122, FIG. 1B). User N data (126A) may be used by the storage (110, FIG. 1A) to restore inaccessible user N data in the client service provider (130, FIG. 1A) as discussed above. User N data (126N) may be used by other and/or additional entities for other and/or additional purposes without departing from the invention.

As discussed above, each user data (e.g., 126A) may include one or more backups (e.g, 212A, 212B, 212N) and each backup (e.g., 212A) may include both backup data (e.g., 214A) and backup metadata (e.g., 210A). The backup data (e.g., 214A) may include fragmented user data obtained from the client service provider (130) that has been associated with backup metadata (e.g., 210A), and is therefore, able to be used to restore inaccessible user data associated with the backup (e.g., 212A). The backup metadata (e.g., 210A) may be generated by the manager (112, FIG. 1A) and include metadata obtained from the client service provider (130, FIG. 1A). The backup metadata (e.g., 210A) may include information regarding the fragmented user data included in the backup data (e.g., 214A). For additional information regarding backup metadata (e.g., 210A), refer to FIG. 2C).

While the data structures (e.g., 126A, 126N) of the user data backup repository (124) of the persistent storage (114, FIG. 1A) are illustrated as separate data structures and have been discussed as including a limited amount of specific information, any of the aforementioned data structures may be divided into any number of data structures, combined with any number of other data structures, and may include additional, less, and/or different information without departing from the invention. Any of the aforementioned data structures may be implemented using, for example, lists, tables, linked lists, databases, and/or other types of data structures.

Figure 2C:
FIG. 2C shows a diagram of backup metadata in accordance with one or more embodiments of the invention.

As discussed above, the user data backup repository may include backup metadata. FIG. 2C shows a diagram of backup metadata A (210A) of FIG. 2B in accordance with one or more embodiments of the invention. As discussed above, backup metadata A (210A) may include information associated with backup data A (214A, FIG. 2B) and may be used to restore user data in the client service provider (130, FIG. 1A). Backup metadata A (210A) may include backup information (220), extended metadata (222), backup status metadata (224), and web-hook information (226). Backup metadata A (210A) may include other and or additional information regarding backup data A (214A, FIG. 2B) without departing from the invention. Each component of the backup metadata A (210A) is discussed below.

The backup information (220) may include one or more data structures that information regarding backup A (212A, FIG. 2B). The backup information (220) may include, for example, backup type, object identifiers, creation timestamps that depicted the point in time a user data backup was generated and other and/or additional information regarding backup A (212A, FIG. 2B). The backup information may be generated by the manager (112, FIG. 1A) using organizational metadata from the organizational metadata repository (138, FIG. 1C) and/or fragmented user data from the limited-access user data repository (136, FIG. 1C). The backup information (220) may be used by the manager to restore inaccessible user A data stored in the client service provider (130, FIG. 1A) associated with backup A (212A, FIG. 2B). The backup information (220) may be used by other and/or additional entities for other and/or additional purposes without departing from the invention.

The extended metadata (222) may include one or more data structures that may be used to restore conversation specific user data backups and/or user data visualization enhanced user data backups. Subsequently, the extended metadata may include conversation specific metadata and/or user data visualization metadata.

The conversation specific metadata may include information associated with an email conversation, message conversation, and/or another type of conversation involving multiple users and multiple messages without departing from the invention. The conversation metadata may include a conversation identifier, conversation index, and/or other and/or additional information associated with a conversation without departing from the invention. The conversation identifier may include a unique character or bit string that may be used to specify a specific conversation. The conversation identifier may include other and/or additional information that may be used to identify a specific conversation without departing from the invention. The conversation index may include a list of users (or participants) of the conversation and an order of messages that are included in the conversation. The conversation index may include other and/or additional information associated with users and an order of messages of a conversation without departing from the invention.

The user data visualization metadata may include information regarding how data included in a user data backup is displayed to user. The user data visualization metadata may include timestamps, data properties, and/or other information that may determine how user data of a user data backup is displayed to a user without departing from the invention. The timestamps may specify when user data of a user data backup was created or obtained. The user data may be displayed in a specific way based on the timestamps. For example, user data may be displayed in a specific order, where user data with more recent timestamps or displayed before user data with later timestamps. The data properties may specify a characteristic of the user data included in the user data backup. The data properties may include, for example, whether an email message is a draft, was sent, or was obtained. The user data of the user data backup may be displayed to the user in a specific way depending on the data properties. Continuing with the example, user data that includes the draft property may be displayed in a different way than user data that incudes the sent property.

Continuing with the discussion of extended metadata (222), extended metadata may be obtained by the manager (112, FIG. 1A) from the client service provider (130, FIG. 1A) (e.g., the organizational metadata repository (138, FIG. 1C)). The manager (112, FIG. 1A) may use the extended metadata to restore conversation specific user data backup and/or user data visualization enhanced user data backups as discussed above. The extended metadata may be used by other and/or additional entities for other and/or additional purposes without departing fom the invention.

The backup status metadata (224) may include one or more data structures that may be used to determine whether a user data backup is to be a full user data backup or an incremental user data backup. The backup status metadata (224) may include change information associated with the user data objects stored in the client service provider (130, FIG. 1A) obtained during change analysis and a status identifier for each object of the aforementioned user data objects that was generated during change analysis (refer to FIG. 4B for additional information regarding change analysis). The backup status metadata (224) may include other and/or additional information without departing from the invention. The change information may include user data objects that have been created, modified, or deleted from the client service provider. The change information may include other and/or additional information without departing from the invention. The status identifiers may specify whether the user data objects included in the change information were created, deleted or modified. The status identifiers may include other and/or additional information regarding the status of user data in the client service provider (130, FIG. 1A) without departing from the invention. The backup status metadata (224) may be generated by the manager (112, FIG. 1A) during change analysis as discussed above. The backup status metadata (224) may be used by the manager (112, FIG. 1A) to determine whether a user data backup is to be a full user data backup or an incremental user data backup. The backup status metadata (224) may be used by other and/or additional entities for other and/or additional purposes without departing from the invention.

The web-hook information (226) may include one or more data structures that may include web-hooks associated with user data objects of backup A (212A) and information associated with the web-hooks. A web-hook may be a callback that is triggered by an event. The callback may be executable computer instructions that when executed by a processor of a computing device (e.g., the client service provider (130, FIG. 1A)) causes the computing device to perform the functionality of the callback. The callback may include the functionality to send a notification to the storage (110, FIG. 1A) that a user data object has been modified on the client service provider (130, FIG. 1A). The callback may be triggered by a modification of a user data object on the client service provider (130, FIG. 1A).

The web-hook information (226) may also include information associated with each web-hook. The web-hook information (226) may include the object for which the web-hook is associated, the number of times a web-hook has been triggered, and other and/or additional information associated with the web-hook. The web-hook information (226) may be generated by the manager (112, FIG. 1A) and used by the manager (112, FIG. 1A) to obtain notifications when user data objects have been modified on the client service provider (130, FIG. 1A) and to trigger incremental user data backups. The web-hook information (226) may be used by other and/or additional entities for other and/or additional purposes without departing from the invention.

While the data structures (e.g., 220, 222, 224, 226) of backup metadata A (210A) of the user data backup repository (124, FIG. 2B) are illustrated as separate data structures and have been discussed as including a limited amount of specific information, any of the aforementioned data structures may be divided into any number of data structures, combined with any number of other data structures, and may include additional, less, and/or different information without departing from the invention. Any of the aforementioned data structures may be implemented using, for example, lists, tables, linked lists, databases, and/or other types of data structures.

Figure 2D:
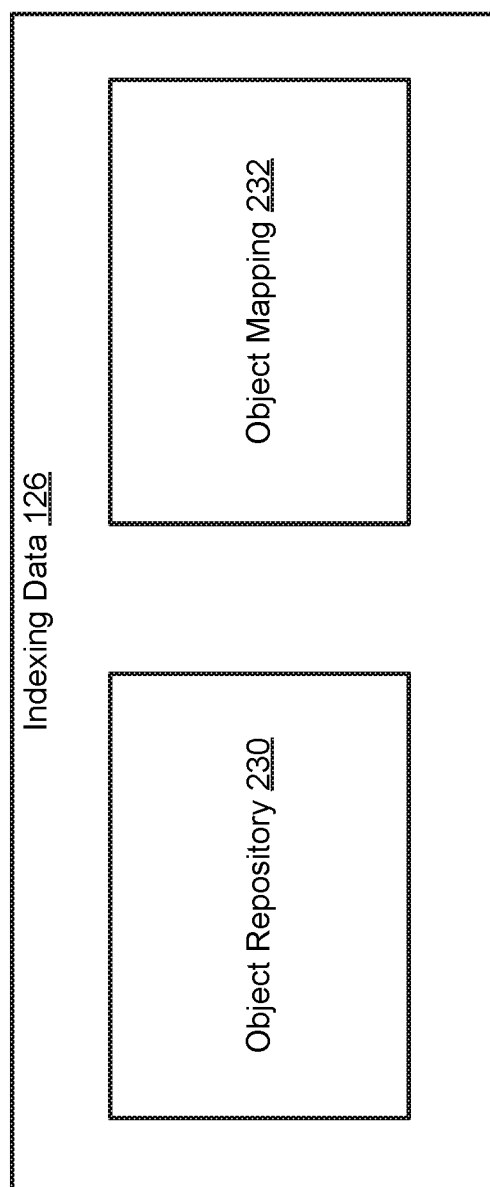
FIG. 2D shows a diagram of indexing data in accordance with one or more embodiments of the invention.

As discussed above, the persistent storage of the storage may include indexing data. FIG. 2D shows a diagram of indexing data (126) of FIG. 1B in accordance with one or more embodiments of the invention. As discussed above, indexing data (126) may include information associated fragmented user data objects already stored in the storage (110, FIG. 1A) and references associated with the aforementioned fragmented user data objects. Indexing data (126) may include an object repository (230) and object mapping (232). The indexing data (126) may include other and or additional information regarding fragmented user data objects already stored in the storage (110) without departing from the invention. Each component of the indexing data (126) is discussed below.

The object repository (230) may include one or more data structures that may be used to determine whether fragmented user data objects to be included in user data backups are duplicative of fragmented user data objects that have previously been stored in the storage (110, FIG. 1A). The object repository (230) may include, for example, object identifiers for object stored in the storage (110, FIG. 1A). The object identifiers may be unique characters or bit strings that may be associated with a specific fragmented user data object. The object repository (230) may include other and/or additional information that may be used to identify fragmented user data objects without departing from the invention. The object repository (230) may be generated and updated by the manager (112, FIG. 1A) each time an object identifier of an object not included in the object repository (230) is obtained. The object repository (230) may be used by the manager to determine whether fragmented user data objects to be included in user data backups are duplicative of fragmented user data objects that have previously been stored in the storage (110, FIG. 1A) as discussed above. The object repository (230) may be used by other and/or additional entities for other and/or additional purposes without departing from the invention.

The object mapping (232) may include one or more data structures that may be used to determine which user data backups are associated with a fragmented user data object and which user data backup includes the fragmented user data object. The object mapping (232) may include a list of all object identifiers and the associated user data backups that include references to each of the fragmented user data objects. The object mapping (232) may include another list that includes a list of all object identifiers and the corresponding user data backups in which the fragmented user data objects are included. The object mapping may include other and/or additional information that may be used to determine which user data backups are associated with a fragmented user data object and which user data backup includes the fragmented user data object without departing from the invention.

While the data structures (e.g., 230, 232) of the indexing data (126) are illustrated as separate data structures and have been discussed as including a limited amount of specific information, any of the aforementioned data structures may be divided into any number of data structures, combined with any number of other data structures, and may include additional, less, and/or different information without departing from the invention. Any of the aforementioned data structures may be implemented using, for example, lists, tables, linked lists, databases, and/or other types of data structures.

Figure 3A:
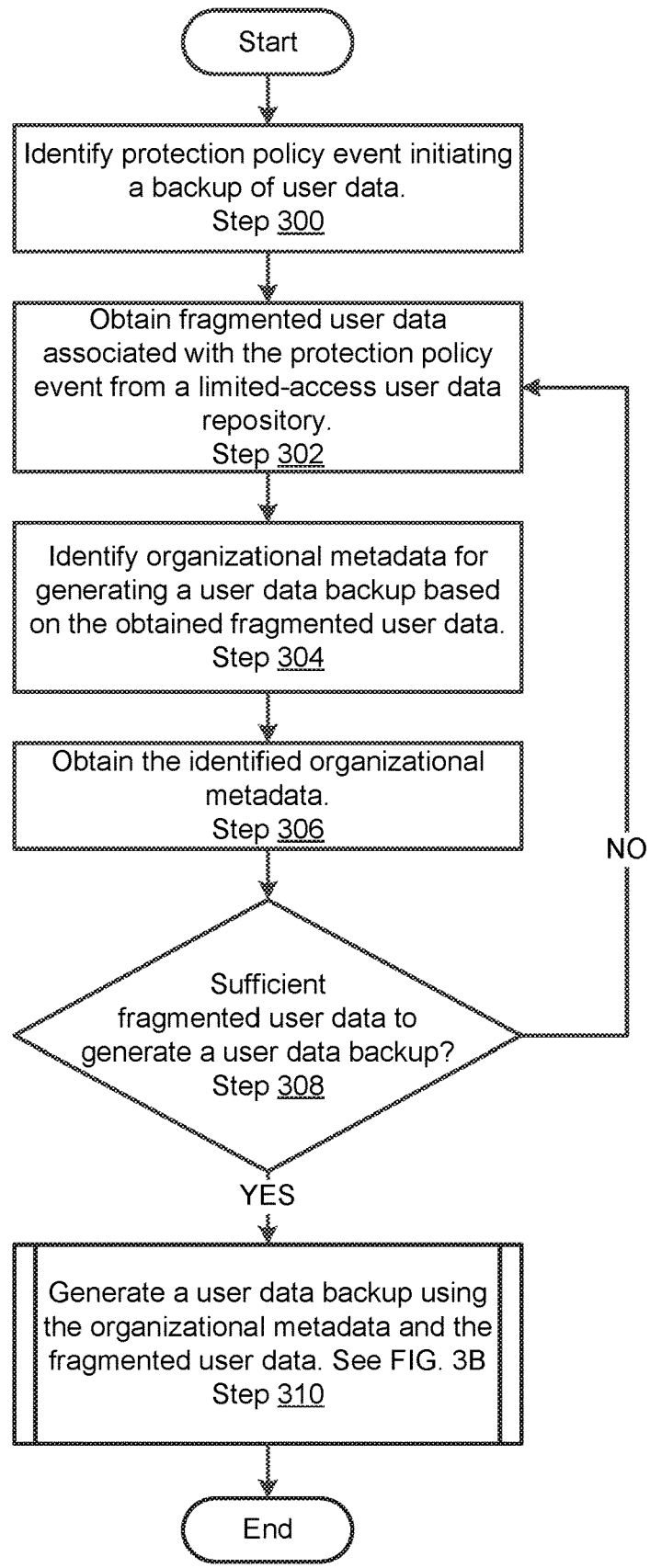
FIG. 3A shows a flowchart of a method for backing up limited-access user data in accordance with one or more embodiments of the invention.
Figure 3B:
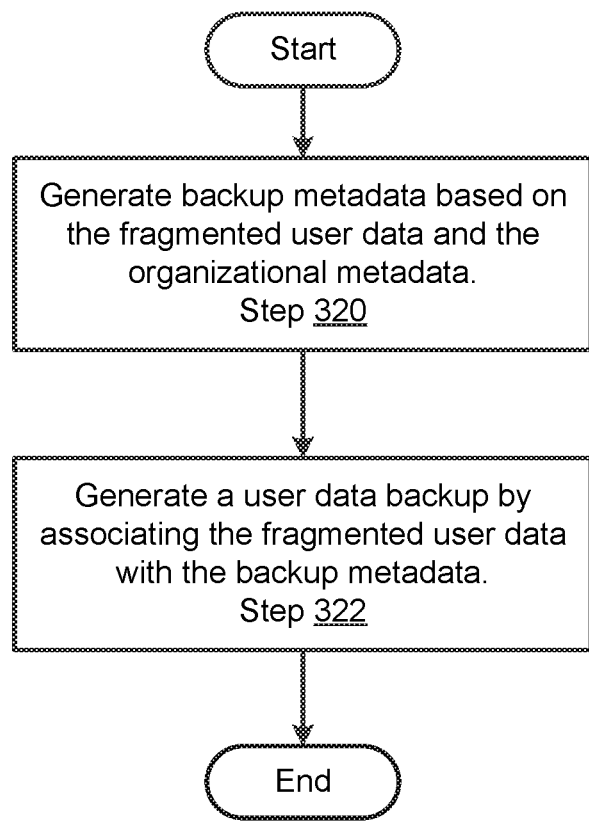
FIG. 3B shows a flowchart of a method for generating a user data backup in accordance with one or more embodiments of the invention.

As discussed, embodiments of the invention may provide a system that generates backups of user data to which access is limited and/or gated by another entities. Because the gating entity may not natively provide for generation of backups of user data managed by the gating entity, information that may be used to generate a backup may need to be obtained from the gating entity to generate the user data backup. FIGS. 3A-3B show methods that may be used to generate backups of user data when access to the user data is limited due to a gating entity.

FIG. 3A shows a flowchart of a method for backing up limited-access user data in accordance with one or more embodiments of the invention. The method shown in FIG. 3A may be performed by, for example, the manager (e.g., 112, FIG. 1A) Other components of the system in FIG. 1A may perform all, or a portion, of the method of FIG. 3A without departing from the invention.

While FIG. 3A is illustrated as a series of steps, any of the steps may be omitted, performed in a different order, additional steps may be included, and/or any or all of the steps may be performed in a parallel and/or partially overlapping manner without departing from the invention.

In step 300, a protection policy event initiating a backup of user data is identified.

As discussed above, protection policies may specify guidelines and/or requirements for protecting user data stored on the client service provider. The protection policies may specify events that trigger backups of user data. The manager of the storage may monitor the protection policies and identify the occurrence of the specified events in the protection policies. In response to the identification of the protection policy events, the manager of the storage may initiate the generation of a backup of user data.

For example, a protection policy may specify that user data of a user should be backed up once a week at noon on Sunday. The manager of the storage may monitor this protection policy as well as the time and date, and at noon every Sunday, may initiate backup generation of user data associated with the protection policy.

In step 302, fragmented user data associated with the protection policy event is obtained from a limited-access user data repository.

In one or more embodiments of the invention, the manager of the storage sends application interface programming (API) calls to the application of the client service provider to obtain the fragmented user data associated with the protection policy event. Fragmented user data may be refer to information returned by the application that gates access to the limited-access user data repository in response to a query (e.g., an API call). The API calls may include requests for user data stored in the limited-access user data repository of the client service provider associated with a user. More specifically, the API calls may include requests for user data associated with a user that includes creation timestamps after the timestamp of the most recent previous backup associated with the user data. One or more API calls may be made to the client service provider to obtain the fragmented user data without departing from the invention.

The API calls may include requests for fragmented user data based on timestamp analysis. A first API call may request a list of object identifiers associated with user data objects stored in the limited-access user data repository that were generated after a specific point in time. In response to the request, the client service provider may send a list of object identifiers associated with objects that were generated after the specified point in time. The storage may send additional API calls requesting the fragmented user data that are associated with the obtained object identifiers. In response to obtaining the API calls, the client service provider may send the requested fragmented user data to the storage. Fragmented user data associated with the protection policy event may be obtained from the limited-access user data repository via other and/or additional methods without departing from the invention.

For example, a protection policy event may specify that a backup of user data is to be generated once a week at noon on Sunday. The manager may send one or more API calls requesting fragmented user data associated with the protection policy event. The API calls may request all fragmented user data generated after noon of the previous Sunday. In response to the API calls, the client service provider may identify fragmented user data generated after noon of the previous Sunday and send the identified fragmented user data to the storage.

When fragmented user data is obtained in step 302, the fragmented user data may be without context. For example, metadata that provides context for the fragmented user data may not be provided along with or otherwise in conjunction with the fragmented user data. Thus, the user data obtained in step 302 is fragmented with respect to other user data in the limited-access user data repository, backups of the limited-access user data repository, etc. Thus, the fragmented user data, in isolation, may not be usable for backup generation purposes.

In step 304, organizational metadata for generating a user data backup is identified based on the obtained fragmented user data.

The obtained fragmented user data may be associated with one or more user data objects stored in the limited-access user data repository. The obtained fragmented user data may include one or more object identifiers for which the fragmented user data may be associated. The manager of the storage may use the object identifiers included in the obtained fragmented user data to identify the organizational metadata for generating a user data backup. The organizational metadata for generating a user data backup may be identified based on the obtained fragmented user data via other and/or additional methods without departing from the invention.

For example, consider a scenario where the limited-access user data repository is a database including electronic mail communications. Each of the electronic mail communications may be associated with a corresponding identifier (e.g., a reference to an entry in the database that includes the respective electronic mail communication). The fragmented user data may be a single electronic mail communication. To use the electronic mail communication for restoration purposes, the identifier of the corresponding database entry must be known. In this scenario, the organization metadata may include the reference to the database entry in which the electronic mail communication is stored. Consequently, when a restoration is performed, the reference to the entry may be provided along with the copy of the electronic mail communication to enable the entry of the database to be restored to an earlier state by, for example, overwriting the entry's contents, adding a new entry and changing its metadata to replace the previous entry, etc.

In step 306, the identified organizational metadata is obtained.

In one or more embodiments of the invention, the manager of the storage sends API calls to the application of the client service provider to obtain the identified organizational metadata associated with the obtained fragmented user data. The manager may send one or more API calls to the application of the client service provider. The API calls may include requests for organizational metadata that are associated with the identified object identifiers that are stored in the organizational metadata repository in the client service provider. In response to obtaining the API calls, the application of the client service provider may send the requested organizational metadata to the storage. The identified organizational metadata may be obtained via other and/or additional methods without departing from the invention.

In step 308, it is determined whether sufficient fragmented user data is obtained to generate a user data backup.

It may be determined whether sufficient fragmented user data is obtained to generate a user data backup using the organizational metadata and/or the timestamp analysis performed in step 302. The organizational metadata may include information regarding all fragmented user data associated with the obtained fragmented user data. The information may include a list of user data chunk identifiers, object identifiers, and other and/or additional information without departing from the invention. The manager may compare the information of the organizational metadata with the obtained fragmented user data. If the information included in the organizational metadata indicates that the obtained fragmented user data does not include the entirety of the fragmented user data stored in the limited-access user data repository on the client service provider associated with the obtained fragmented user data, then it may be determined that insufficient fragmented user data is obtained to generate a user data backup.

Alternatively, in other embodiments of the invention, the manager of the storage may compare the timestamp analysis mentioned above with the obtained fragmented user data. If the timestamp analysis includes additional fragmented user data stored in the limited-access user data repository on the client service provider that is not included in the obtained fragmented user data, then it may be determined that insufficient fragmented user data is obtained to generate a user data backup. It may be determined whether sufficient fragmented user data is obtained to generate a user data backup via other and/or additional methods without departing from the invention.

If it is determined that sufficient fragmented user data is obtained to generate a user data backup, then the method may proceed to step 310. If it is determined that sufficient fragmented user data is not obtained to generate a user data backup, then the method proceeds to step 302.

In step 310, a user data backup is generated using the organizational metadata and the fragmented user data.

In response to the determination of step 308 that sufficient fragmented user data is obtained to generate a user data backup, the manager of the storage may generate backup metadata using the organizational metadata and the fragmented user data as discussed above. The backup metadata may indicate portions of the fragmented user data that have changed since a previous user data backup associated with the fragmented user data. The user data backup may be generated by associating portions of the changed fragmented user data with portions of the organizational metadata included in the backup metadata until each portion of the changed fragmented user data is associated with a portion of the organizational metadata. The generated user data backup may result in a backup that is usable by the manager to restore inaccessible user data on the client service provider. A user data backup may be generated using the organizational metadata and the fragmented user data via other and/or additional methods without departing from the invention. For additional information regarding generating a user data backup, refer to FIG. 3B.

The method may end following step 310.

FIG. 3B shows a flowchart of a method for generating a user data backup in accordance with one or more embodiments of the invention. The method shown in FIG. 3B may be performed by, for example, the manager (e.g., 112, FIG. 1A) Other components of the system in FIG. 1A may perform all, or a portion, of the method of FIG. 3B without departing from the invention.

While FIG. 3B is illustrated as a series of steps, any of the steps may be omitted, performed in a different order, additional steps may be included, and/or any or all of the steps may be performed in a parallel and/or partially overlapping manner without departing from the invention.

In step 320, backup metadata is generated based on the fragmented user data and the organizational metadata.

In one or more embodiments of the invention, the backup metadata is generated using the organizational metadata and the fragmented user data. As discussed above the backup metadata may include backup information, extended metadata, status metadata, and web-hook information. The manager of the storage may generate the backup information by (i) generating a list of object identifiers included in the user data backup that are specified by the organization metadata and the fragmented user data, and (ii) specifying the type of user data backup based on the identification of status metadata, conversation metadata, and/or user data visualization metadata obtained from the client service provider. The manager of the storage may generate extended metadata by generating a list of object identifiers and associating the list of object identifiers with conversation metadata or user data visualization metadata included in the organization metadata if the user data backup is a conversation specific user data backup or a user data visualization enhanced user data backup. The status metadata may include the status of the fragmented user data objects included in the user data backups that were generated by the manager of the storage during change analysis (e.g., refer to FIG. 4B for additional information regarding change analysis). The web-hook information may be generated by the manager of the storage by generating web-hooks associated with fragmented user data objects generated during a full user data backup and generating and/or updating web-hook information for each fragmented user data object included in the user data backup. The backup metadata may be generated via other and/or additional methods without departing from the invention.

The backup metadata may be compared with the backup metadata of previously generated user data backups associated with the obtained fragmented user data to determine portions of the obtained fragmented user data that have changed since the previous user data backup was generated. Changed portions of the fragmented user data may be identified via other and/or additional methods without departing from the invention.

In step 322, a user data backup is generated by associating the fragmented user data and the backup metadata.

In one or more embodiments of the invention, each portion of the backup metadata is associated with a portion of the changed fragmented user data to generate a user data backup. Portions of the changed fragmented user data may be associated with portions of the backup information of the backup metadata. Portions of the changed fragmented user data that are associated with a conversation may be associated with conversation metadata included in the extended metadata of the backup metadata. Similarly, portions of the changed fragmented user data that are associated with a user data visualization may be associated with user data visualization metadata included in the extended metadata of the backup metadata. Portions of the changed fragmented user data may be associated with portions of the backup metadata using lists. For each changed fragmented user data object, a list may be generated that includes the portions of the backup metadata or references (e.g., pointers) to the portions of backup metadata that are associated with the changed fragmented user data object. The user data backup may be generated by associating the fragmented user data with the backup metadata via other and/or additional methods without departing from the invention.

For example, the manager of the storage may generate a user data backup that includes a list for each object included in the fragmented user data of the user data backup. For each fragmented user data object, the list may include references to the changed fragmented user data and all of the backup metadata associated with the fragmented user data object. A fragmented user data object may include a list that includes references to (i) the fragmented user data of the fragmented user data object, (ii) the backup information of the backup metadata associated with the fragmented user data object, (iii) the status metadata associated with the fragmented user data object, and (iv) the web-hook information associated with the fragmented user data object.

The method may end following step 322.

Figure 4A:
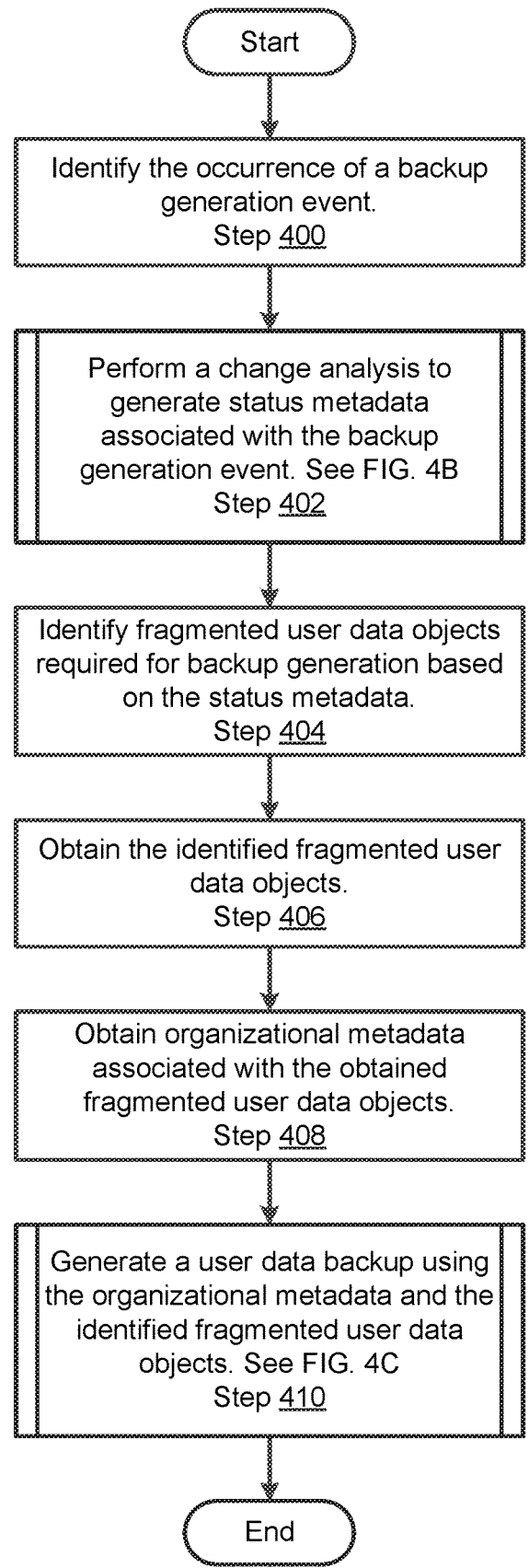
FIG. 4A shows a flowchart of a method for incrementally backing up limited-access user data in accordance with one or more embodiments of the invention.
Figure 4B:
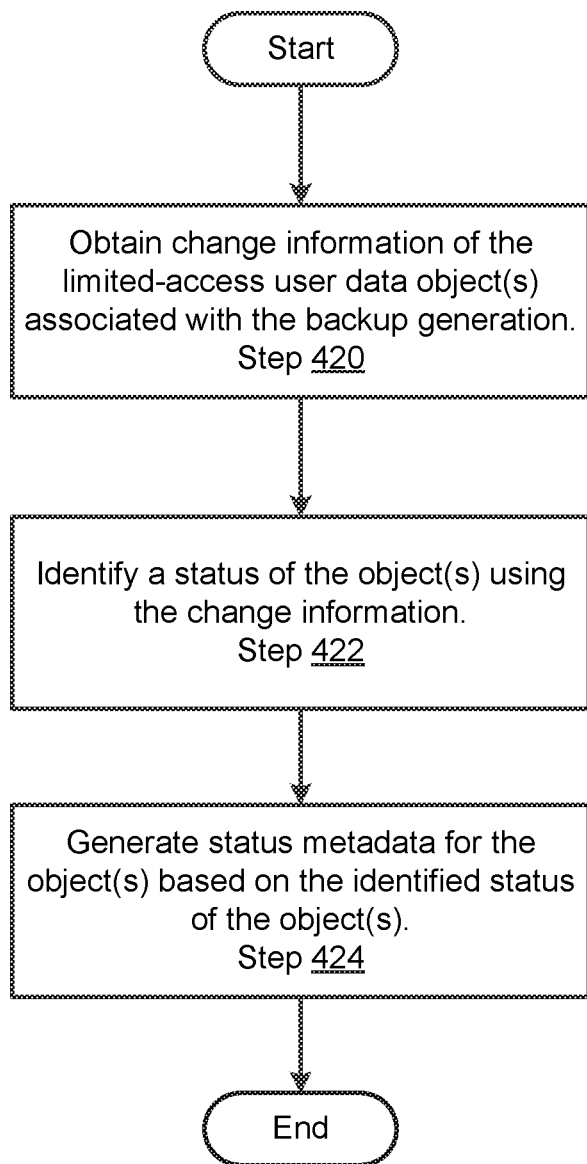
FIG. 4B shows a flowchart of a method for performing change analysis in accordance with one or more embodiments of the invention.
Figure 4C:
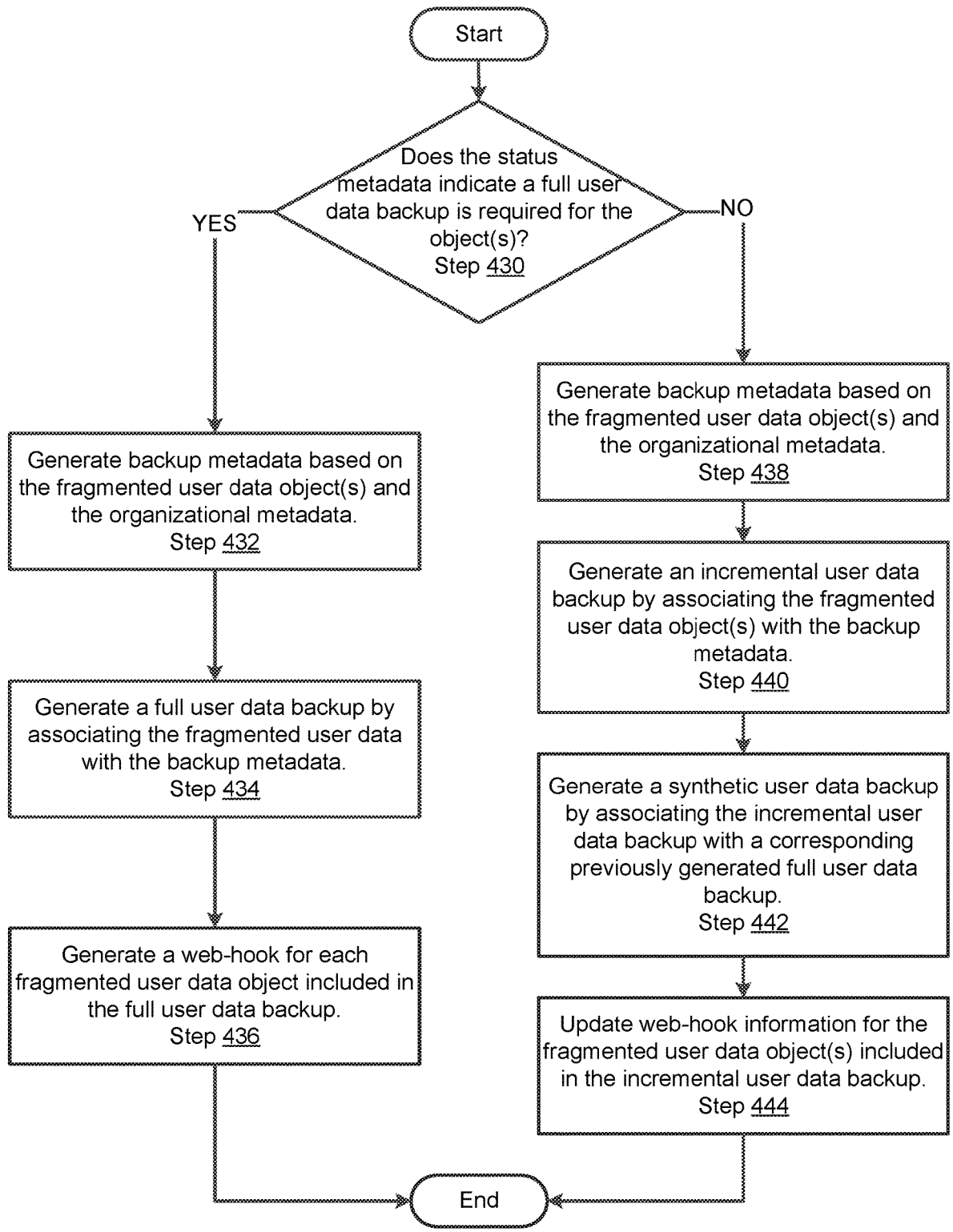
FIG. 4C shows a flowchart of a method for generating an incremental user data backup in accordance with one or more embodiments of the invention.

As discussed, embodiments of the invention may provide a system that generates backups of user data to which access is limited and/or gated by another entities. Consequently, when information regarding the user data is obtained from a gating entity, the information may be without context. For example, the information may not be directly indicative of whether the data is an a backed-up state or not in a backed-up state (e.g., user data which may be restored using existing backups). FIGS. 4A-4C show methods that may be used to ascertain whether user data obtained from a gating entity is in a backed-up state and use the aforementioned information to generate backups for user data that is not in a backed-up state.

FIG. 4A shows a flowchart of a method for backing up limited-access user data in accordance with one or more embodiments of the invention. The method shown in FIG. 4A may be performed by, for example, the manager (e.g., 112, FIG. 1A) Other components of the system in FIG. 1A may perform all, or a portion, of the method of FIG. 4A without departing from the invention.

While FIG. 4A is illustrated as a series of steps, any of the steps may be omitted, performed in a different order, additional steps may be included, and/or any or all of the steps may be performed in a parallel and/or partially overlapping manner without departing from the invention.

In step 400, the occurrence of a backup generation event is identified.

As discussed above, protection policies may specify guidelines and/or requirements for protecting user data stored on the client service provider. The protection policies may specify backup generation events that trigger backups of user data. The manager of the storage may monitor the protection policies and identify the occurrence of the backup generation events specified by the protection policies. In response to the identification of the backup generation event, the manager of the storage may initiate the generation of a backup of user data.

For example, a protection policy may specify that user data of a user should be backed up once a week at noon on Sunday. Subsequently, the backup generation event may be at noon every Sunday. The manager of the storage may monitor this protection policy as well as the time and date, and at noon every Sunday, may initiate backup generation of user data associated with the protection policy.

In step 402, change analysis is performed to generate status metadata associated with the backup generation event.

In one or more embodiments of the invention, the change analysis generates status metadata associated with the backup generation event. The change analysis may include (i) obtaining change information of the limited-access user data object(s) associated with the backup generation event from the client service provider, (ii) identifying a status of the object(s) using the change information, and (iii) generating status metadata for the object(s) based on the identified status of the object(s). The change analysis may generate status metadata via other and/or additional methods without departing from the invention. For additional information regarding performing change analysis to generate status metadata, refer to FIG. 4B.

In step 404, fragmented user data objects required for backup generation are identified based on the status metadata.

As discussed above, the status metadata may indicate which user data object(s) stored in the limited-access user data repository that are associated with the backup generation event have changed since the previous user data backup associated with the user data was generated. The status metadata may indicate that a user data object has been modified, deleted, added, or has not changed. The status metadata may include object identifiers for the user data object(s) stored in the limited-access user data repository. The manager of the storage may use the status information and the associated object identifiers to identify fragmented user data objects required for backup generation. The fragmented user data objects required for backup generation may be identified based on the status metadata via other and/or additional methods without departing from the invention.

In one or more embodiments of the invention, the identified fragmented user data object(s) only include objects that have created, modified, or deleted since the last user data backup associated with the backup generation event was generated as indicated in the status metadata. In other words, the identified fragmented user data objects do not include the user data object(s) associated with the backup generation event that have not changed since the last user data backup associated with the backup generated event was generated. Therefore, the user data backup generated using the identified fragmented user data backup may include less data.

In step 406, the identified fragmented user data objects are obtained.

In one or more embodiments of the invention, the manager of the storage sends application interface programming (API) calls to the application of the client service provider to obtain the identified fragmented user data objects associated with the backup generation event. The obtained fragmented user data may include all fragmented user data associated with the backup generation event. The API calls may include requests for user data stored in the limited-access user data repository of the client service provider associated with a user. More specifically, the API calls may include requests for user data objects associated with a user that includes object identifiers associated with the user data objects. One or more API calls may be made to the client service provider to obtain the identified fragmented user data objects without departing from the invention. In response to obtaining the API calls, the client service provider may send the requested fragmented user data objects to the storage. The identified fragmented user data objects associated with the backup generation event may be obtained from the limited-access user data repository via other and/or additional methods without departing from the invention.

In step 408, the organizational metadata associated with the obtained fragmented user data objects is obtained.

The manager of the storage may use the object identifiers included in the obtained fragmented user data to identify the organizational metadata for generating a user data backup. The organizational metadata for generating a user data backup may be identified based on the obtained fragmented user data via other and/or additional methods without departing from the invention.

In one or more embodiments of the invention, the manager of the storage sends API calls to the application of the client service provider to obtain the identified organizational metadata associated with the obtained fragmented user data objects. The manager may send one or more API calls to the application of the client service provider. The API calls may include requests for organizational metadata that are associated with the identified object identifiers that are stored in the organizational metadata repository in the client service provider. In response to obtaining the API calls, the application of the client service provider may send the requested organizational metadata to the storage. The identified organizational metadata may be obtained via other and/or additional methods without departing from the invention.

In step 410, a user data backup is generated using the organizational metadata and the obtained fragmented user data objects.

The manager of the storage may generate backup metadata using the organizational metadata and the fragmented user data as discussed above. The user data backup may be generated by associating portions of the fragmented user data with portions of the organizational metadata included in the backup metadata until each portion of the fragmented user data is associated with a portion of the organizational metadata. The generated user data backup may result in a backup that is usable by the manager to restore inaccessible user data on the client service provider. A user data backup may be generated using the organizational metadata and the fragmented user data via other and/or additional methods without departing from the invention. For additional information regarding generating a user data backup, refer to FIG. 4C.

The method may end following step 410.

FIG. 4B shows a flowchart of a method for performing change analysis in accordance with one or more embodiments of the invention. The method shown in FIG. 4B may be performed by, for example, the manager (e.g., 112, FIG. 1A) Other components of the system in FIG. 1A may perform all, or a portion, of the method of FIG. 4B without departing from the invention.

While FIG. 4B is illustrated as a series of steps, any of the steps may be omitted, performed in a different order, additional steps may be included, and/or any or all of the steps may be performed in a parallel and/or partially overlapping manner without departing from the invention.

In step 420, change information of limited-access user data object(s) associated with the backup generation event is obtained.

The change information may include information that may be used to determine whether a user data object on the client service provider associated with a backup generation event has been changed in any way on the client service provider by a user since the previous user data backup associated with the user data object(s) was generated. Since the previous user data backup associated with a backup generation event, user data object(s) associated with the backup generation event may have been created, modified, and/or deleted from the limited-access user data repository of the client service provider. The change information may include a list of object identifiers associated with the user data object(s) stored in the limited-access user data repository that have been modified in any way since the last user data backup associated with the user data object(s) was generated. The change information may also include a deleted flag that associated with an object identifier that may indicate the user data object associated with the object identifier that was deleted since the previous user data backup associated with the user data objects as discussed above. The change information may include other and/or additional information without departing from the invention.

In one or more embodiments of the invention, the manager of the storage sends API calls to the application of the client service provider to obtain the change information of user data object(s) stored in the limited-access user data repository of the client service provider associated with the backup generation event. The manager may send one or more API calls to the application of the client service provider. The API calls may include requests for change information of user data object(s) stored in the limited-access user data repository of the client service provider associated with the backup generation event. In response to obtaining the API calls, the application of the client service provider may send the requested change information of the user data object(s) stored in the limited-access user data repository of the client service provider to the storage. The change information of the limited-access user data object(s) associated with the backup generation event may be obtained via other and/or additional methods without departing from the invention.

In step 422, a status of the object(s) is identified using the change information.

As discussed above, the change information may specify whether a user data object stored in the limited-access user data repository of the client service provider has changed or been deleted since the last user data backup associated with user data objects was generated. However, the change information may not specify how the user data objects were changed. The change information may not specify whether a user data object was created or modified since the last user data backup associated with the user data objects.

The manager of the storage may compare the change information with the previous user data backup associated with the user data objects to be included in the user data backup to generate a status of the user data objects. The manager of the storage may identify the user data backup associated with the user data objects with the most recent creation timestamp as the previous user data backup. The manager of the storage may use the backup metadata of the user data backup and the change information to compare the object identifiers of the fragmented user data objects included in the previous user data backup with the object identifiers of the user data objects stored in the limited-access user data repository that have changed since the previous user data backup was generated included in the change information.

The status of user data objects that include object identifiers that are included in the change information but not in the backup metadata of the previous user data backup may be identified as new user data objects (i.e., the user data objects were created after the previous user data backup). The status of user data objects that include object identifiers that are included in the change information and included in the backup metadata may be identified as modified. The status of user data objects that are included in the backup metadata and included in the change information, but have a deleted flag associated with the object identifier in the change information may be identified as deleted. The status of the objects associated with the change information may be identified via other and/or additional methods without departing from the invention.

In step 424, status metadata is generated for the object(s) based on the identified status of the object(s).

In one or more embodiments of the invention, the status metadata is generated by associating the user data object(s) with the identified status of the user data objects. The manager of the storage may generate a list of the user data object identifiers included in the change information. Each object identifier in the list may be associated with the identified status. The manager may generate a status identifier that may be associated with each object identifier included in the status metadata. The status identifier may include a unique identifier for each type of status as discussed above. The status identifier may indicate whether a user data object associated with an object identifier is new user data object, a modified user data object, or a deleted user data object. The status metadata may be generated for the objects based on the identified status of the objects via other and/or additional methods without departing from the invention.

The method may end following step 424.

FIG. 4C shows a flowchart of a method for generating an incremental user data backup in accordance with one or more embodiments of the invention. The method shown in FIG. 4C may be performed by, for example, the manager (e.g., 112, FIG. 1A) Other components of the system in FIG. 1A may perform all, or a portion, of the method of FIG. 4C without departing from the invention.

While FIG. 4C is illustrated as a series of steps, any of the steps may be omitted, performed in a different order, additional steps may be included, and/or any or all of the steps may be performed in a parallel and/or partially overlapping manner without departing from the invention.

In step 430, it is determined whether the status metadata indicates a full user data backup is required for the object(s).

As discussed above, the status metadata includes the status of the object(s) included in the fragmented user data obtained from the limited-access user data repository on the client service provider. The manager of the storage may use the status metadata to determine whether to generate a full user data backup or an incremental user data backup. If the status metadata indicates that at least one of the objects included in the fragmented user data is new, then it may be determined that a full user data backup is to be generated. If the status metadata indicates that no object included in the fragmented user data is new, then it may be determined that an incremental user data backup is to be generated. It may be determined that the status metadata indicates a full user data backup is required for the object(s) via other and/or additional methods without departing from the invention.

If it is determined that the status metadata indicates a full user data backup is required for the object(s), then the method may proceed to step 432. If it is determined that the status metadata indicates a full user data backup is not required for the object(s), then the method may proceed to step 438.

In step 432, backup metadata is generated based on the fragmented user data object(s) and the organizational metadata.

In one or more embodiments of the invention, the backup metadata is generated using the organizational metadata and the fragmented user data. As discussed above the backup metadata may include backup information, extended metadata, status metadata, and web-hook information. The manager of the storage may generate the backup information by (i) generating a list of object identifiers included in the user data backup that are specified by the organization metadata and the fragmented user data, and (ii) specifying the type of user data backup based on the identification of, status metadata, conversation metadata, and/or user data visualization metadata obtained from the client service provider. The manager of the storage may generate extended metadata by generating a list of object identifiers and associating the list of object identifiers with conversation metadata or user data visualization metadata included in the organization metadata if the user data backup is a conversation specific user data backup or a user data visualization enhanced user data backup. The status metadata may include the status of the fragmented user data objects included in the user data backups that were generated by the manager of the storage during change analysis (e.g., refer to FIG. 4B for additional information regarding change analysis). The web-hook information may be generated by the manager of the storage by generating web-hooks associated with fragmented user data objects generated during a full user data backup and generating and/or updating web-hook information for each fragmented user data object included in the user data backup. The backup metadata may be generated via other and/or additional methods without departing from the invention.

The backup metadata may be compared with the backup metadata of previously generated user data backups associated with the obtained fragmented user data to determine portions of the obtained fragmented user data that have changed since the previous user data backup was generated. Changed portions of the fragmented user data may be identified via other and/or additional methods without departing from the invention.

In step 434, a full user data backup is generated by associating the fragmented user data object(s) with the backup metadata.

In one or more embodiments of the invention, each portion of the backup metadata is associated with a portion of the changed fragmented user data to generate a user data backup. Portions of the changed fragmented user data may be associated with portions of the backup information of the backup metadata. Portions of the changed fragmented user data that are associated with a conversation may be associated with conversation metadata included in the extended metadata of the backup metadata. Similarly, portions of the changed fragmented user data that are associated with a user data visualization may be associated with user data visualization metadata included in the extended metadata of the backup metadata. Portions of the changed fragmented user data may be associated with portions of the backup metadata using lists. For each changed fragmented user data object, a list may be generated that includes the portions of the backup metadata or references (e.g., pointers) to the portions of backup metadata that are associated with the changed fragmented user data object. The user data backup may be generated by associating the fragmented user data with the backup metadata via other and/or additional methods without departing from the invention.

For example, the manager of the storage may generate a user data backup that includes a list for each object included in the fragmented user data of the user data backup. For each fragmented user data object, the list may include references to the changed fragmented user data and all of the backup metadata associated with the fragmented user data object. A fragmented user data object may include a list that includes references to (i) the fragmented user data of the fragmented user data object, (ii) the backup information of the backup metadata associated with the fragmented user data object, and (iii) the status metadata associated with the fragmented user data object.

In step 436, a web-hook is generated for each fragmented user data object included in the full user data backup.

A web-hook may be generated by associating a user data object stored in the limited-access user data repository with an event, a message, and the manager of the storage. The manager of the storage may generate and send a callback to the application of the client service provider. The manager may associate the callback with an object identifier of an object stored in the limited-access user data repository. The manager may also associate the callback with a trigger event. The trigger event may be when the object is modified in any way. The callback may include initiating the transmission of a notification from the client service provider to the manager of the storage upon the occurrence of the trigger event. A web-hook may be generated via other and/or additional methods without departing from the invention.

The method may end following step 436.

In step 438, backup metadata is generated based on the fragmented user data object(s) and the organizational metadata.

In one or more embodiments of the invention, the backup metadata is generated using the organizational metadata and the fragmented user data. As discussed above the backup metadata may include backup information, extended metadata, status metadata, and web-hook information. The manager of the storage may generate the backup information by (i) generating a list of object identifiers included in the user data backup that are specified by the organization metadata and the fragmented user data, and (ii) specifying the type of user data backup based on the identification of, status metadata, conversation metadata, and/or user data visualization metadata obtained from the client service provider. The manager of the storage may generate extended metadata by generating a list of object identifiers and associating the list of object identifiers with conversation metadata or user data visualization metadata included in the organization metadata if the user data backup is a conversation specific user data backup or a user data visualization enhanced user data backup. The status metadata may include the status of the fragmented user data objects included in the user data backups that were generated by the manager of the storage during change analysis (e.g., refer to FIG. 4B for additional information regarding change analysis). The web-hook information may be generated by the manager of the storage by generating web-hooks associated with fragmented user data objects generated during a full user data backup and generating and/or updating web-hook information for each fragmented user data object included in the user data backup. The backup metadata may be generated via other and/or additional methods without departing from the invention.

In step 440, an incremental user data backup is generated by associating the fragmented user data object(s) with the backup metadata.

In one or more embodiments of the invention, each portion of the backup metadata is associated with a portion of the changed fragmented user data to generate a incremental user data backup. The portions of the fragmented user data that have not changed based on the status metadata may be discarded from the user data backup. The manager may include references to the portions of the fragmented user data that were discarded. Portions of the changed fragmented user data may be associated with portions of the backup information of the backup metadata. Portions of the changed fragmented user data that are associated with a conversation may be associated with conversation metadata included in the extended metadata of the backup metadata. Similarly, portions of the changed fragmented user data that are associated with a user data visualization may be associated with user data visualization metadata included in the extended metadata of the backup metadata. Portions of the changed fragmented user data may be associated with portions of the backup metadata using lists. For each changed fragmented user data object, a list may be generated that includes the portions of the backup metadata or references (e.g., pointers) to the portions of backup metadata that are associated with the changed fragmented user data object. The incremental user data backup may be generated by associating the fragmented user data with the backup metadata via other and/or additional methods without departing from the invention.

For example, the manager of the storage may generate a incremental user data backup that includes a list for each changed object included in the fragmented user data of the incremental user data backup. For each changed fragmented user data object, the list may include references to the fragmented user data and all of the backup metadata associated with the fragmented user data object. A changed fragmented user data object that is associated with a conversation may include a list that includes references to (i) the fragmented user data of the fragmented user data object, (ii) the backup information of the backup metadata associated with the fragmented user data object, (iii) the conversation metadata of the extended metadata associated with the fragmented user data object, (iv) the status metadata associated with the fragmented user data object, and (v) the web-hook information associated with the fragmented user data object.

In step 442, a synthetic user data backup is generated by associating the incremental user data backup with a corresponding previously generated full user data backup.

In order to generate a synthetic user data backup, the manager of the storage may associate the generated incremental user data backup with a previous full user data backup. The incremental user data backup may include at least one of the fragmented user data objects included in the previous full user data backup. The objects included in the incremental user data backup may be modified versions of the objects included in the previous full user data backup that were generated at a later time. The manager may identify the previously generated full user data backup based on the backup type and the creation timestamp of the full user data backup included in the backup information of the backup metadata. The manager of the storage may include the backup identifier of the identified previous full user data backup in the backup information of the backup metadata of the incremental user data backup to associate the incremental user data backup with the full user data backup. Additionally, the manager of the storage may include the backup identifier and the creation timestamp of the incremental user data backup in the backup information of the backup metadata of the previous full user data backup to associate the incremental user data backup with the full user data backup. A synthetic user data backup may be generated by associating the incremental user data backup with a corresponding previously generated full user data backup via other and/or additional methods without departing from the invention.

In step 444, web-hook information is updated for the fragmented user data object(s) included in the incremental user data backup.

As discussed above, the backup generation event may be associated with a web-hook notification that indicates a user data object had been modified. The manager may update an incremental user data backup count in the web-hook information of the backup metadata of the incremental user data backup for each fragmented user data object. The incremental user data backup count may track the number of incremental backups associated with a fragmented user data object. Additionally, the manager of the storage may update a web-hook notification count of the web-hook information of the backup metadata of the incremental user data backup that may track the number of web-hook notifications received from the client service provider for each fragmented user data object. The manager of the storage may update other and/or additional information associated with the web-hook information without departing from the invention. The web-hook information may be updated for the fragmented user data objects included in the incremental user data backup via other and/or additional methods without departing from the invention.

The method may end following step 444.

As discussed, embodiments of the invention may provide a system that generates backups of user data to which access is limited and/or gated by other entities. When user data is obtained, it may include data that is duplicative of already backed-up data.

For example, consider a scenario where the limited-access user data includes multiple email messages. More than one of the email messages may include a copy of an attachment. If copies of the emails and multiple, redundant copies of the attachment are added to a user data backup, the user data backup may be larger in size, consume additional computing resources (e.g., storage space, memory space, etc.) when compared to a user data backup that does not include duplicative data.

Figure 5A:
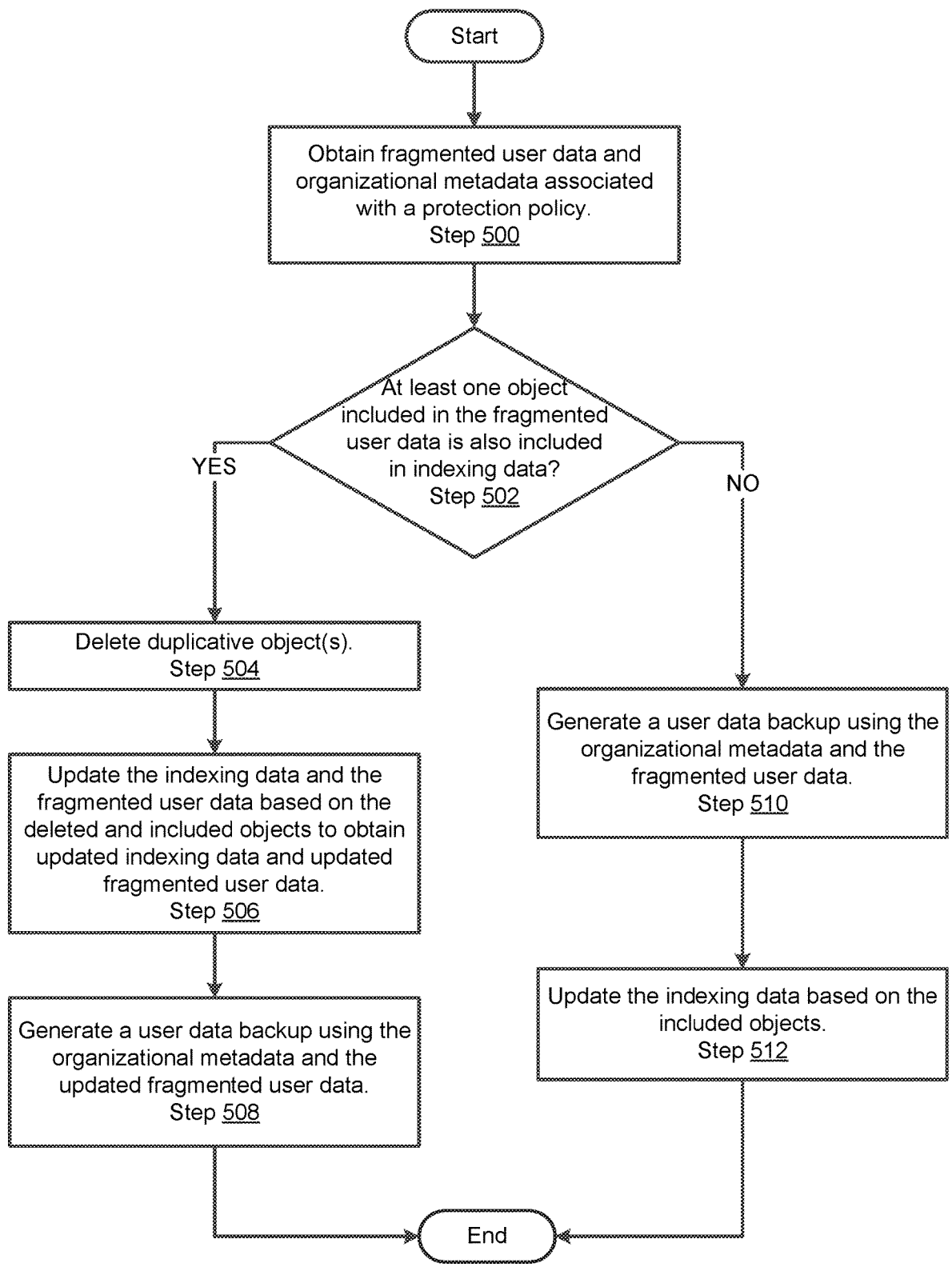
FIG. 5A shows a flowchart of a method for backing up limited-access user data using indexing data in accordance with one or more embodiments of the invention.
Figure 5B:
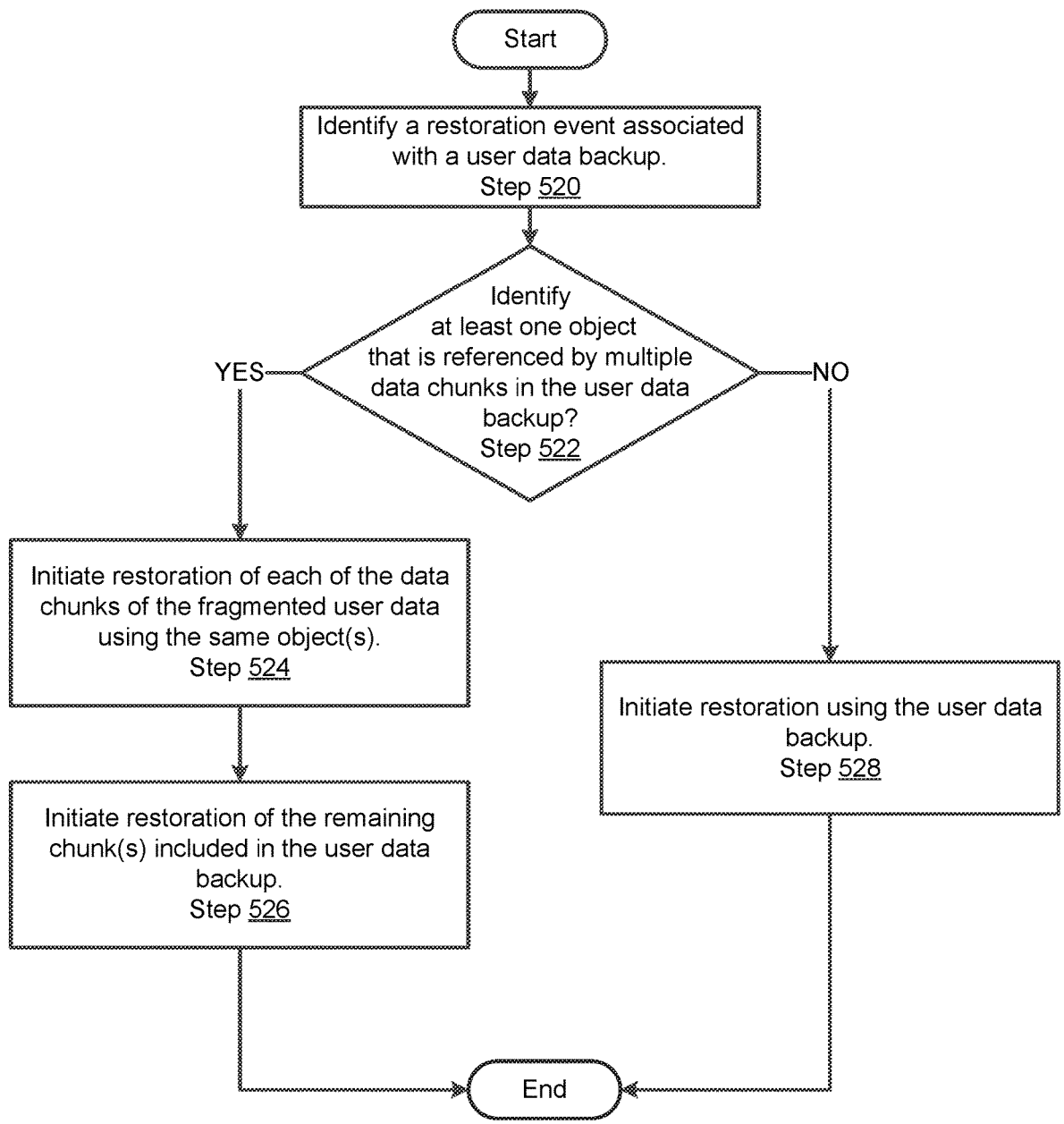
FIG. 5B shows a flowchart of a method for restoring limited-access user data using indexing data in accordance with one or more embodiments of the invention.

FIGS. 5A-5B show methods that may be used to generate user data backups that are less likely to include duplicative data. Consequently, the storage space (as well as other computing resources such a processor cycles required to store data) for storing user data backups may be reduced.

FIG. 5A shows a flowchart of a method for backing up limited-access user data using indexing data in accordance with one or more embodiments of the invention. The method shown in FIG. 5A may be performed by, for example, the manager (e.g., 112, FIG. 1A) Other components of the system in FIG. 1A may perform all, or a portion, of the method of FIG. 5A without departing from the invention.

While FIG. 5A is illustrated as a series of steps, any of the steps may be omitted, performed in a different order, additional steps may be included, and/or any or all of the steps may be performed in a parallel and/or partially overlapping manner without departing from the invention.

In step 500, fragmented user data and organizational metadata associated with a protection policy are obtained.

As discussed above, protection policies may specify guidelines and/or requirements for protecting user data stored on the client service provider. The protection policies may specify events that trigger backups of user data. The manager of the storage may monitor the protection policies and identify the occurrence of the specified events in the protection policies. In response to the identification of the protection policy events, the manager of the storage may initiate the generation of a backup of user data.

In response to the occurrence of the backup generation event specified by the protection policies, the manager of the storage may send application interface programming (API) calls to the application of the client service provider to obtain the fragmented user data associated with the protection policy event. The API calls may include requests for user data stored in the limited-access user data repository of the client service provider associated with a user. In response to obtaining the API calls, the client service provider may send the requested fragmented user data to the storage. Fragmented user data associated with the protection policy event may be obtained from the limited-access user data repository via other and/or additional methods without departing from the invention.

The obtained fragmented user data may be associated with one or more user data objects stored in the limited-access user data repository. The obtained fragmented user data may include one or more object identifiers for which the fragmented user data may be associated. The manager of the storage may use the object identifiers included in the obtained fragmented user data to identify the organizational metadata for generating a user data backup.

The manager of the storage may send API calls to the application of the client service provider to obtain the identified organizational metadata associated with the obtained fragmented user data. The API calls may include requests for organizational metadata that are associated with the identified object identifiers that are stored in the organizational metadata repository in the client service provider. In response to obtaining the API calls, the application of the client service provider may send the requested organizational metadata to the storage. The identified organizational metadata may be obtained via other and/or additional methods without departing from the invention.

In step 502, it is determined whether at least one object included in the obtained fragmented user data is also included in the indexing data.

In one or more embodiments of the invention, it is determined whether at least one object included in the obtained fragmented user data is duplicative of a copy of an object in the indexing data by comparing the fragmented user data with the object repository of the indexing data. The manager of the storage may compare the object identifiers of the obtained fragmented user data with the object identifiers included in the object repository of the indexing data. If any of the object identifiers included in the fragmented user data match the object identifiers included in the object repository of the indexing data, then it may be determined that at least one object included in the fragmented user data is also included in the indexing data. If none of the object identifiers included in the fragmented user data match the object identifiers included in the indexing data, then it may be determined that no object included in the fragmented user data is also included in the indexing data. It may be determined that at least one object included in the fragmented user data is also included in the indexing data via other and/or additional methods without departing from the invention.

If it is determined that at least one object included in the obtained fragmented user data is also included in the indexing data, then the method may proceed to step 504. If it is determined that no object included in the obtained fragmented user data is also included in the indexing data, then the method may proceed to step 510.

In step 504, the duplicative object(s) is deleted.

The manager of the storage may identifier fragmented user data objects that are associated with object identifiers that match object identifiers in the object repository of the indexing data as duplicative objects. The manager of storage may delete the identified duplicative objects from the fragmented user data in order to prevent backing up a duplicative object and improve storage capacity of the storage. The duplicative object(s) may be deleted via other and/or additional methods without departing from the invention.

In step 506, the indexing data and the fragmented user data are updated based on the deleted and included object(s) to obtain updated indexing data and updated fragmented user data.

The object repository and the object mapping of the indexing data may be updated to generate updated indexing data. The indexing data may be updated by including the information regarding fragmented user data objects that are not already included in the indexing data in the object repository and the object mapping and updating the object mapping of the fragmented user data objects already included in the indexing data. The manager of the storage may update the object repository to include the object identifiers of the fragmented user data objects that are not already included in the object repository. Additionally, the manager of the storage may update the object mapping to associate the added object identifiers with the upcoming user data backup. The manager of the storage may also update the object mapping to include references that associate the deleted duplicative objects with the obtained fragmented user data. The references may be pointers that point to where the original object is stored in the storage or the user data backup that includes the original object.

The fragmented user data may also be updated based on the deleted duplicative objects to generate updated fragmented user data. The manager of the storage may update the fragmented user data to include references (e.g., pointers) in the fragmented user data to the original object(s) associated with the duplicative object(s) that may be already stored in the storage. The indexing data and the fragmented user data may be updated based on the deleted and included objects to obtain updated indexing data and updated fragmented user data via other and/or additional methods without departing from the invention.

In step 508, a user data backup is generated using the organizational metadata and the updated fragmented user data.

The manager of the storage may generate a user data backup using the organizational metadata and the updated fragmented user data as discussed above. The manager of the storage may generate backup metadata using both the fragmented user data and the organizational metadata. The user data backup may be generated by associating portions of the updated fragmented user data with portions of the backup metadata until each portion of the updated fragmented user data is associated with a portion of the backup metadata. The generated user data backup may result in a backup that is usable by the manager to restore inaccessible user data on the client service provider. A user data backup may be generated using the organizational metadata and the updated fragmented user data via other and/or additional methods without departing from the invention. For additional information regarding generating a user data backup, refer to FIG. 3B.

The method may end following step 508.

In step 510, a user data backup is generated using the organizational metadata and the fragmented user data.

The manager of the storage may generate a user data backup using the organizational metadata and the updated fragmented user data as discussed above. The manager of the storage may generate backup metadata using both the fragmented user data and the organizational metadata. The user data backup may be generated by associating portions of the updated fragmented user data with portions of the backup metadata until each portion of the updated fragmented user data is associated with a portion of the backup metadata. The generated user data backup may result in a backup that is usable by the manager to restore inaccessible user data on the client service provider. A user data backup may be generated using the organizational metadata and the updated fragmented user data via other and/or additional methods without departing from the invention. For additional information regarding generating a user data backup, refer to FIG. 3B.

In step 512, the indexing data is updated based on the included object(s).

The object repository and the object mapping of the indexing data may be updated to generate updated indexing data. The manager of the storage may update the object repository of the indexing data to include the object identifiers of the fragmented user data objects that are not already included in the object repository. Additionally, the manager of the storage may update the object mapping of the indexing data to associate the added object identifiers with the generated user data backup. The object mapping may include references to the user data backup in which the fragmented user data objects are to be included. The references may be pointers that point to where the fragmented user data objects may be stored in the storage or the user data backup that includes the fragmented user data object. The indexing data may be updated based on the included objects via other and/or additional methods without departing from the invention.

The method may end following step 512.

FIG. 5B shows a flowchart of a method for restoring limited-access user data using indexing data in accordance with one or more embodiments of the invention. The method shown in FIG. 5B may be performed by, for example, the manager (e.g., 112, FIG. 1A) Other components of the system in FIG. 1A may perform all, or a portion, of the method of FIG. 5B without departing from the invention.

While FIG. 5B is illustrated as a series of steps, any of the steps may be omitted, performed in a different order, additional steps may be included, and/or any or all of the steps may be performed in a parallel and/or partially overlapping manner without departing from the invention.

In step 520, a restoration event associated with a user data backup is identified.

User data stored on the client service provider may become inaccessible for any reason. The client service provider or an application of the client service provider may perform or initiate a restoration event that may be associated with a user data backup stored in the storage. The restoration event may include receiving a message from the application of the client service provider that requests the restoration of inaccessible user data using a user data backup. The message may include a user identifier, a user data backup identifier, a timestamp, and/or one or more object identifiers to specify the user data backup requested by the application of the client service provider. The manager of the storage may identify the message from the client service provider as a restoration event and, in response to identifying the restoration event, the manager of the storage may initiate the restoration using the specified user data backup. A restoration event associated with a user data backup may be identified via other and/or additional methods without departing from the invention.

In step 522, it is determined whether at least one object is identified that is reference by multiple data chunks in the user data backup.

In one or more embodiments of the invention, it is determined whether at least one object is identified that is referenced by multiple data chunks in the user data backup using the backup metadata of the user data backup and the indexing data. As discussed above, the backup metadata may include object identifiers for the fragmented user data objects included in the user data backup. Furthermore, the object repository of the indexing data may include the object identifiers of the fragmented user data objects stored in the storage. The object mapping of the indexing data may include the reference(s) of each fragmented user data object. The manager of the storage may use the object identifiers included in the backup metadata to identify the backup user data objects included in the user data backup. The manager of the storage may then use the object repository and the object mapping to determine whether the fragmented user data object(s) included in the user data backup are referenced by multiple data chunks in the user data backup.

If a fragmented user data object is referenced by multiple data chunks, then it may be determined that at least one object is identified that is referenced by multiply data chunks in the user data backup. If a fragmented user data object is referenced by a single data chunk, then it may be determined that no object is identified that is referenced by multiply data chunks in the user data backup. It may be determined whether at least one object is identified that is referenced by multiple data chunks in the user data backup via other and/or additional methods without departing from the invention.

If it is determined that at least one object is identified that is referenced by multiple data chunks in the user data backup, then the method may proceed to step 524. If it is determined that no object is identified that is referenced by multiply data chunks in the user data backup, then the method may proceed to step 528.

In step 524, the restoration of each of the data chunks of the fragmented user data using the same object(s) is initiated.

In response to the determination in step 522 that at least one object is identified to referenced by multiple data chunks in the user data backup, the manager of the storage may use the indexing data to initiate the restoration of each of the data chunks of the fragmented user data that reference the same object using only that same object. The manager of the storage may generate copies of the data chunks of the fragmented user data that reference the same object. The manager of the storage may also generate copies of the same object that is referenced by the data chunks of the fragmented user data. The manager may include the copies of the same object in each of the copies of the data chunks of the fragmented user data that reference the same object. The manager of the storage may then send each of the copies of the data chunks of the fragmented user data that each include a copy of the same object to the client service provider. The manager of the storage may then send a API call to the client service provider to initiate the restoration of a portion of the inaccessible user data associated with data chunk copies of the fragmented user data and the included copy of the same object. Restoration of each of the data chunks of the fragmented user data using the same object(s) may be initiated via other and/or additional methods without departing from the invention.

In step 526, the restoration of the remaining chunk(s) included in the user data backup is initiated.

The manager of the storage may copy data chunks associated with the remaining fragmented user data and backup metadata included in the user data backup. The manager of the storage may then send the copies of the remaining fragmented user data and backup metadata included in the user data backup to the client service provider. The manager of the storage may send a API call to the client service provider to initiate the restoration of the remaining user data associated with the remaining copies of the fragmented user data and the backup metadata of the user data backup. The restoration of the remaining chunk(s) included in the user data backup may be initiated via other and/or additional methods without departing from the invention.

The method may end following step 526.

In step 528, the restoration of the user data backup is initiated.

In response to the determination of step 522 that no object was identified to be referenced by multiple data chunks in the user data backup, the manager of the storage may then initiate the restoration of user data using the user data backup. The manager of the storage may copy the fragmented user data and backup metadata included in the user data backup. The manager of the storage may then send the copies of the fragmented user data and backup metadata included in the user data backup to the client service provider. The manager of the storage may send a API call to the client service provider to initiate the restoration of the user data associated with the copies of the fragmented user data and the backup metadata of the user data backup. The restoration using the user data backup may be initiated via other and/or additional methods without departing from the invention.

The method may end following step 528.

As discussed, embodiments of the invention may provide a system that generates backups of user data to which access is limited and/or gated by another entities. In some embodiments of the invention, the limited access user data may include relationships between different portions that need to be maintained.

For example, consider a scenario where limited-access user data includes multiple electronic mail communications that form a conversation. In such a scenario, the timing, relational aspects (e.g., replies to other messages, forwards, etc.), and/or other characteristics of the messages may need to be maintained when a backup of the limited-access user data is used for restoration purposes.

Figure 6A:
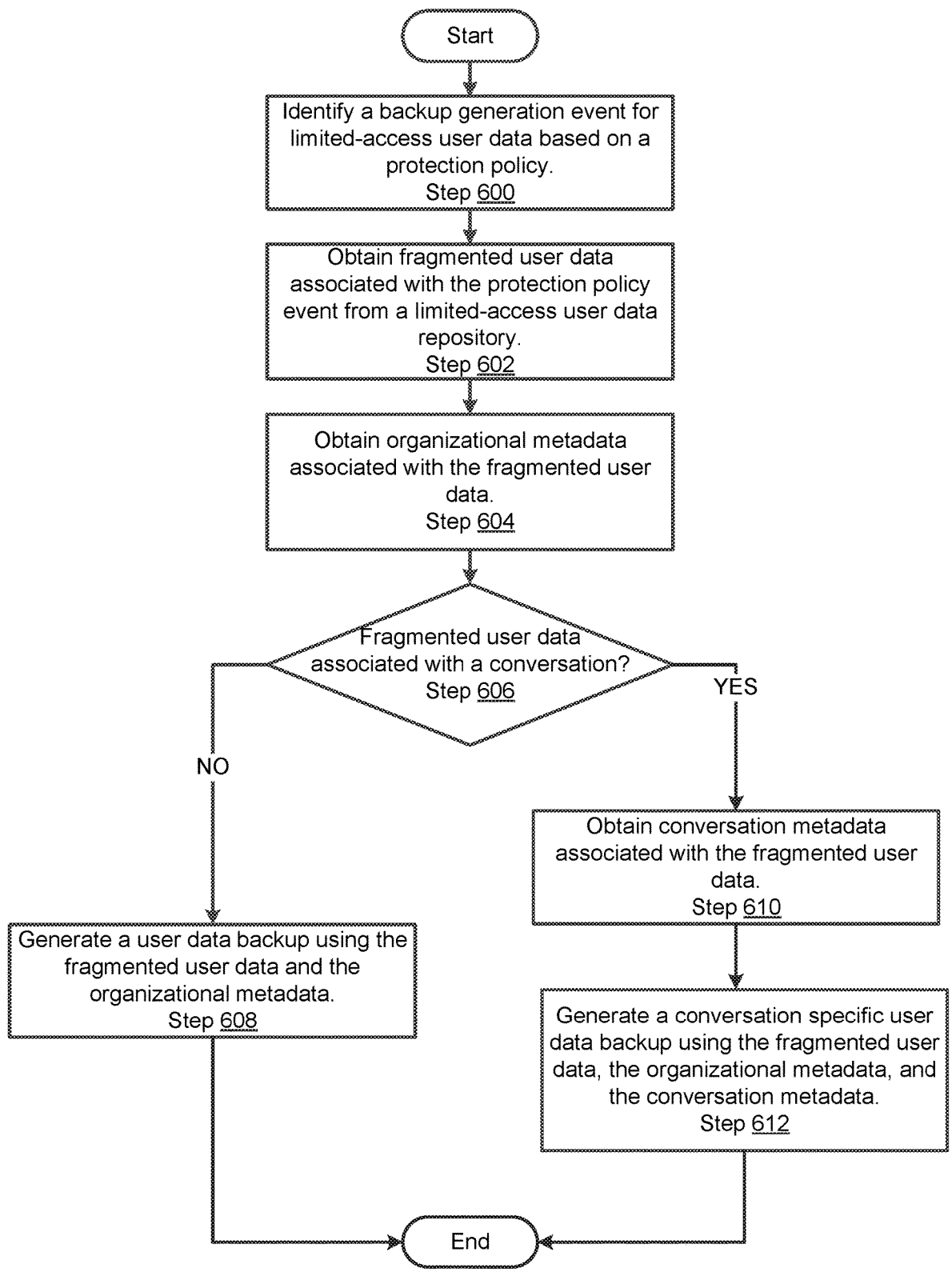
FIG. 6A shows a flowchart of a method for generating a conversation specific user data backup in accordance with one or more embodiments of the invention.
Figure 6B:
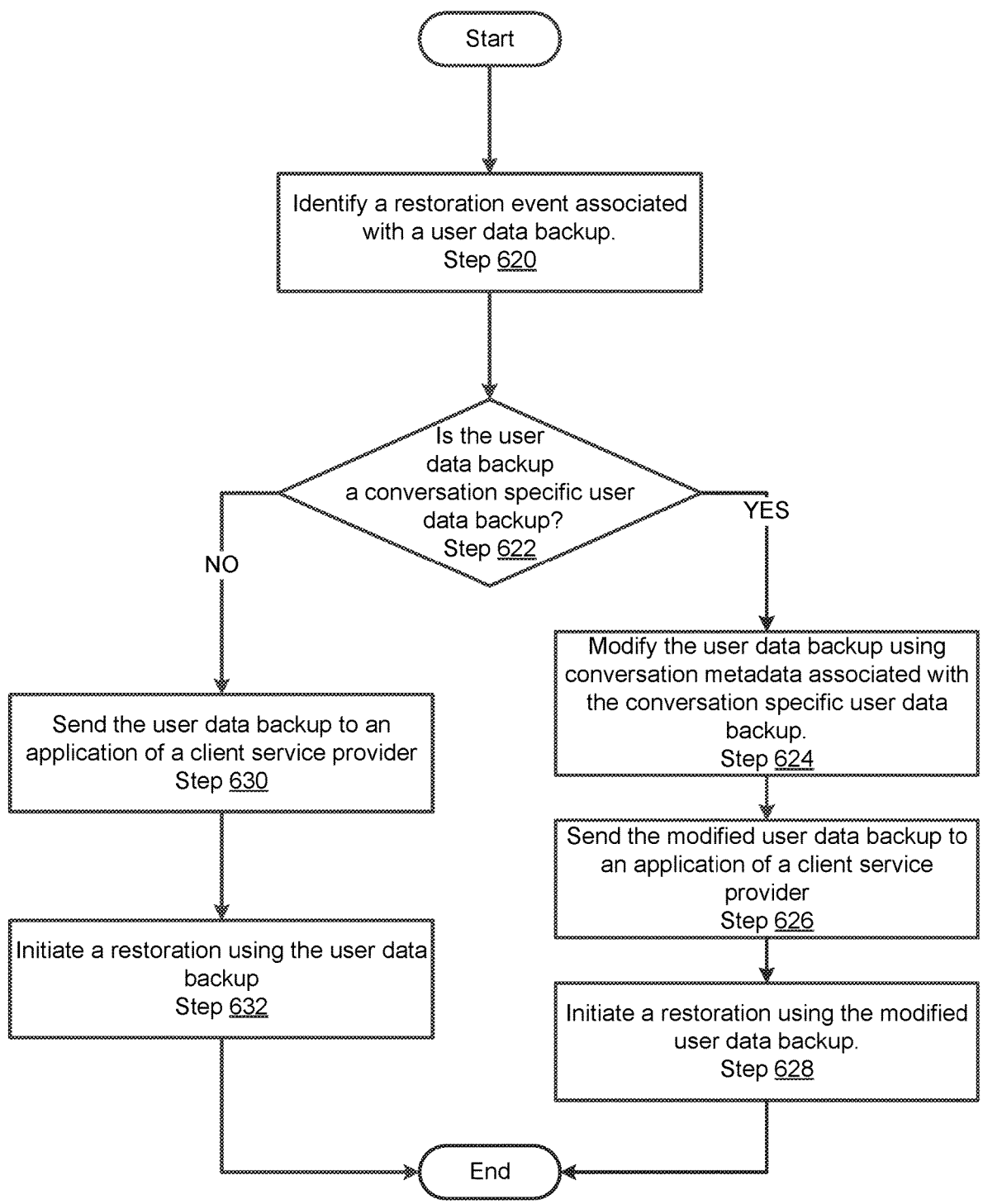
FIG. 6B shows a flowchart of a method for performing a restoration using a conversation specific user data backup in accordance with one or more embodiments of the invention.

FIGS. 6A-6B show methods that may be used to generate user data backups that enable the aforementioned relationships to be restored using the user data backups.

FIG. 6A shows a flowchart of a method for generating a conversation specific user data backup in accordance with one or more embodiments of the invention. The method shown in FIG. 6A may be performed by, for example, the manager (e.g., 112, FIG. 1A) Other components of the system in FIG. 1A may perform all, or a portion, of the method of FIG. 6A without departing from the invention.

While FIG. 6A is illustrated as a series of steps, any of the steps may be omitted, performed in a different order, additional steps may be included, and/or any or all of the steps may be performed in a parallel and/or partially overlapping manner without departing from the invention.

In step 600, a backup generation event for limited-access user data based on a protection policy is identified.

As discussed above, protection policies may specify guidelines and/or requirements for protecting user data stored on the client service provider. The protection policies may specify backup generation events that trigger backups of user data. The manager of the storage may monitor the protection policies and identify the occurrence of the backup generation events specified by the protection policies. In response to the identification of the backup generation event, the manager of the storage may initiate the generation of a backup of user data.

For example, a protection policy may specify that user data of a user should be backed up once a week at noon on Sunday. Subsequently, the backup generation event may be at noon every Sunday. The manager of the storage may monitor this protection policy as well as the time and date, and at noon every Sunday, may initiate backup generation of user data associated with the protection policy.

In step 602, fragmented user data associated with the protection policy event is obtained from a limited-access user data repository.

In one or more embodiments of the invention, the manager of the storage sends application interface programming (API) calls to the application of the client service provider to obtain the fragmented user data associated with the protection policy event. The API calls may include requests for user data stored in the limited-access user data repository of the client service provider associated with a user. More specifically, the API calls may include requests for user data associated with a user that includes creation timestamps after the timestamp of the most recent previous backup associated with the user data. One or more API calls may be made to the client service provider to obtain the fragmented user data without departing from the invention. In response to obtaining the API calls, the client service provider may send the requested fragmented user data to the storage. Fragmented user data associated with the protection policy event may be obtained from the limited-access user data repository via other and/or additional methods without departing from the invention.

For example, a protection policy event may specify that a backup of user data is to be generated once a week at noon on Sunday. The manager may send one or more API calls requesting fragmented user data associated with the protection policy event that include creation timestamps that are more recent than the previously generated backup associated with the protection policy event. More specifically, the fragmented user data may include user data generated on the client service provider after the previous backup was generated on the previous Sunday. In response to the API calls, the client service provider may send the user data associated with the protection policy event that was generated after the previous Sunday to the storage.

In step 604, organizational metadata associated with the fragmented user data is obtained.

The manager of the storage may use the object identifiers included in the obtained fragmented user data to identify the organizational metadata for generating a user data backup. The organizational metadata for generating a user data backup may be identified based on the obtained fragmented user data via other and/or additional methods without departing from the invention.

In one or more embodiments of the invention, the manager of the storage sends API calls to the application of the client service provider to obtain the identified organizational metadata associated with the obtained fragmented user data objects. The manager may send one or more API calls to the application of the client service provider. The API calls may include requests for organizational metadata that are associated with the identified object identifiers that are stored in the organizational metadata repository in the client service provider. In response to obtaining the API calls, the application of the client service provider may send the requested organizational metadata to the storage. The identified organizational metadata may be obtained via other and/or additional methods without departing from the invention.

In step 606, it is determined whether the fragmented user data is associated with a conversation.

In one or more embodiments of the invention, the obtained fragmented user data and organizational metadata includes information that indicates the obtained fragmented user data and organizational metadata with a conversation. As discussed above, a conversation may refer to a sequence of messages that may include the same subject, the same users, and a specific order of messages that may be associated with the messages. The organizational metadata may include references to a conversation such as a specific conversation message order for the message(s) included in the user data backup. The manager of the storage may identify any conversation references included in the organizational metadata. If the manager identifies a conversation reference, it may be determined that the fragmented user data is associated with a conversation. If the manager does not identify any conversation references, it may be determined that the fragmented user data is not associated with a conversation. It may be determined whether the fragmented user data is associated with a conversation via other and/or additional methods without departing from the invention.

The organizational metadata may include a conversation flag. The conversation flag may be a binary value that acts as an indicator as to whether the fragmented user data is associated with a conversation. If the flag is set, it may be determined that the obtained fragmented user data is associated with a conversation. If the flag is not set, it may be determined that the obtained fragmented user data is not associated with a conversation. It may be determined whether the fragmented user data is associated with a conversation via other and/or additional methods without departing from the invention.

If it is determined that the fragmented user data is associated with a conversation, then the method may proceed to step 610. If it is determined that the fragmented user data is not associated with a conversation, then the method may proceed to step 608.

In step 608, a user data backup is generated using the fragmented user data and the organizational metadata.

The manager of the storage may generate a user data backup using the organizational metadata and the updated fragmented user data as discussed above. The manager of the storage may generate backup metadata using both the fragmented user data and the organizational metadata. The user data backup may be generated by associating portions of the updated fragmented user data with portions of the backup metadata until each portion of the updated fragmented user data is associated with a portion of the backup metadata. The generated user data backup may result in a backup that is usable by the manager to restore inaccessible user data on the client service provider. A user data backup may be generated using the organizational metadata and the updated fragmented user data via other and/or additional methods without departing from the invention. For additional information regarding generating a user data backup, refer to FIG. 3B.

The method may end following step 608.

In step 610, conversation metadata associated with the fragmented user data is obtained.

The manager of the storage may use the object identifiers included in the obtained fragmented user data to identify the conversation metadata for generating a conversation specific user data backup. The conversation metadata for generating a user data backup may be identified based on the obtained fragmented user data via other and/or additional methods without departing from the invention.

In one or more embodiments of the invention, the manager of the storage sends API calls to the application of the client service provider to obtain the identified conversation metadata associated with the obtained fragmented user data objects. The manager may send one or more API calls to the application of the client service provider. The API calls may include requests for conversation metadata that are associated with the identified object identifiers that are stored in the organizational metadata repository in the client service provider. In response to obtaining the API calls, the application of the client service provider may send the requested conversation metadata to the storage. The identified conversation metadata may be obtained via other and/or additional methods without departing from the invention.

In step 612, a conversation specific user data backup is generated using the fragmented user data, the organizational metadata, and the conversation metadata.

The manager of the storage may generate a conversation specific user data backup using the organizational metadata and the updated fragmented user data as discussed above. The manager of the storage may generate backup metadata using both the fragmented user data and the organizational metadata. The conversation specific user data backup may be generated by associating portions of the updated fragmented user data with portions of the backup metadata until each portion of the updated fragmented user data is associated with a portion of the backup metadata. The generated conversation specific user data backup may result in a backup that is usable by the manager to restore inaccessible user data on the client service provider. A conversation specific user data backup may be generated using the organizational metadata and the updated fragmented user data via other and/or additional methods without departing from the invention. For additional information regarding generating a conversation specific user data backup, refer to FIG. 3B.

The method may end following step 612.

FIG. 6B shows a flowchart of a method for performing a restoration using a conversation specific user data backup in accordance with one or more embodiments of the invention. The method shown in FIG. 6B may be performed by, for example, the manager (e.g., 112, FIG. 1A) Other components of the system in FIG. 1A may perform all, or a portion, of the method of FIG. 6B without departing from the invention.

While FIG. 6B is illustrated as a series of steps, any of the steps may be omitted, performed in a different order, additional steps may be included, and/or any or all of the steps may be performed in a parallel and/or partially overlapping manner without departing from the invention.

In step 620, a restoration event associated with a user data backup is identified.

User data stored on the client service provider may become inaccessible for any reason. The client service provider or a component within may perform or initiate a restoration event that may be associated with a user data backup stored in the storage. The restoration event may include receiving a message from the application of the client service provider that requests the initiation of inaccessible user data using a user data backup. The message may include a user identifier and a user data backup identifier to specify the user data backup requested by the application of the client service provider. The manager of the storage may identify the message from the client service provider as a restoration event and, in response to identifying the restoration event, the manager of the storage may initiate the restoration using the specified user data backup. A restoration event associated with a user data backup may be identified via other and/or additional methods without departing from the invention.

In step 622, it is determined whether the user data backup is a conversation specific user data backup.

In one or more embodiments of the invention, it is determined whether the user data backup is a conversation specific backup by using the backup metadata of the user data backup. As discussed above, the backup metadata may include a backup type and extended metadata. The backup type may indicate whether the user data backup is a conversation specific user data backup or another type of user data backup (e.g., a user data visualization enhanced user data backup) without departing from the invention. Additionally, the extended metadata of the of the backup metadata may include conversation specific information associated with the user data backup. The manager of the storage may use the backup type and/or the extended metadata to determine whether the user data backup is a conversation specific user data backup. If the backup type and/or the extended metadata indicate that the user data backup is a conversation specific user data backup, then it may be determined that the user data backup is a conversation specific user data backup. If the backup type and/or the extended metadata indicate that the user data backup is not a conversation specific user data backup, then it may be determined that the user data backup is not a conversation specific user data backup. It may be determined whether the user data backup is a conversation specific user data backup via other and/or additional methods without departing from the invention.

If it is determined that the user data backup is a conversation specific user data backup, then the method may proceed to step 624. If it is determined that the user data backup is not a conversation specific user data backup, then the method may proceed to step 630.

In step 624, the user data backup is modified using the conversation metadata associated with the conversation specific user data backup.

In response to the determination in step 622 that the user data backup is a conversation specific user data backup, the manager of the storage may modify the user data backup to include the conversation metadata included in the extended metadata of the backup metadata associated with the user data backup. As discussed above, the conversation metadata may include a conversation identifier and a conversation index. The conversation identifier and the conversation index of the conversation metadata may be included in the user data backup along with the fragmented user data and the organizational metadata for restoration purposes. As a result, the user data restored using the modified user data backup may include accurate conversation information. The user data backup may be modified using the conversation metadata associated with the conversation specific user data backup via other and/or additional methods without departing from the invention.

In step 626, the modified user data backup is sent to an application of a client service provider.

The manager of the storage may send a message an application of the client service provider. The message may include the modified user data backup. The message may include other and/or additional information. The modified user data backup may be sent to an application of the client service provider via other and/or additional methods without departing from the invention.

In step 628, a restoration using the modified user data backup is initiated.

In one or more embodiments of the invention, the manager of the storage sends an API call to the application of the client service provider to initiate a restoration using the modified user data backup. The API call may include a request to initiate the restoration of inaccessible user data stored on the client service provider using the modified user data backup. A restoration using the modified user data backup may be initiated via other and/or additional methods without departing from the invention.

The method may end following step 628.

In step 630, the user data backup is sent to an application of a client service provider.

The manager of the storage may send a message an application of the client service provider. The message may include the user data backup. The message may include other and/or additional information. The user data backup may be sent to an application of the client service provider via other and/or additional methods without departing from the invention.

In step 632, a restoration using the user data backup is initiated.

In one or more embodiments of the invention, the manager of the storage sends an API call to the application of the client service provider to initiate a restoration using the user data backup. The API call may include a request to initiate the restoration of inaccessible user data stored on the client service provider using the user data backup. A restoration using the user data backup may be initiated via other and/or additional methods without departing from the invention.

The method may end following step 632.

As discussed above, embodiments of the invention may provide a system that generates backups of user data to which access is limited and/or gated by other entities. Visual representation, presented to users, of the limited-access user data may include features that indicate special information regarding different portions of the limited-access user data.

For example, consider a scenario in which an application gates access to data reflecting electronic mail communications. To provide a user with additional information regarding the electronic mail communications, the application may cause the graphical representations of the electronic mail communications to differ depending on the characteristics of the electronic mail communications, the relationships between electronic mail communications, etc.

In such a scenario, it may be necessary to obtain additional information regarding how an electronic mail communication is being displayed to a user to properly restore the electronic mail communication.

Figure 7A:
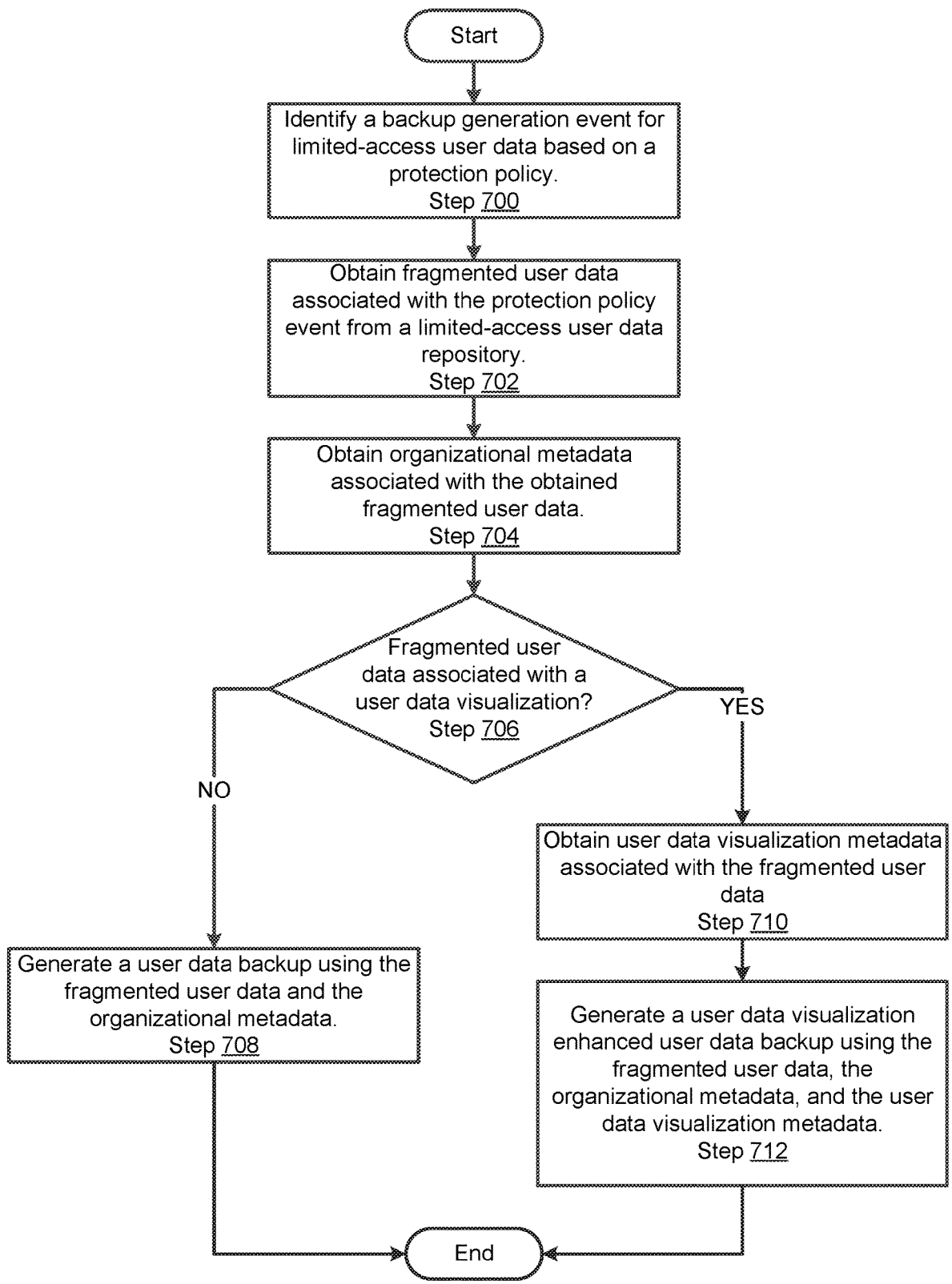
FIG. 7A shows a flowchart of a method for generating a specific user display orientation user data backup in accordance with one or more embodiments of the invention.
Figure 7B:
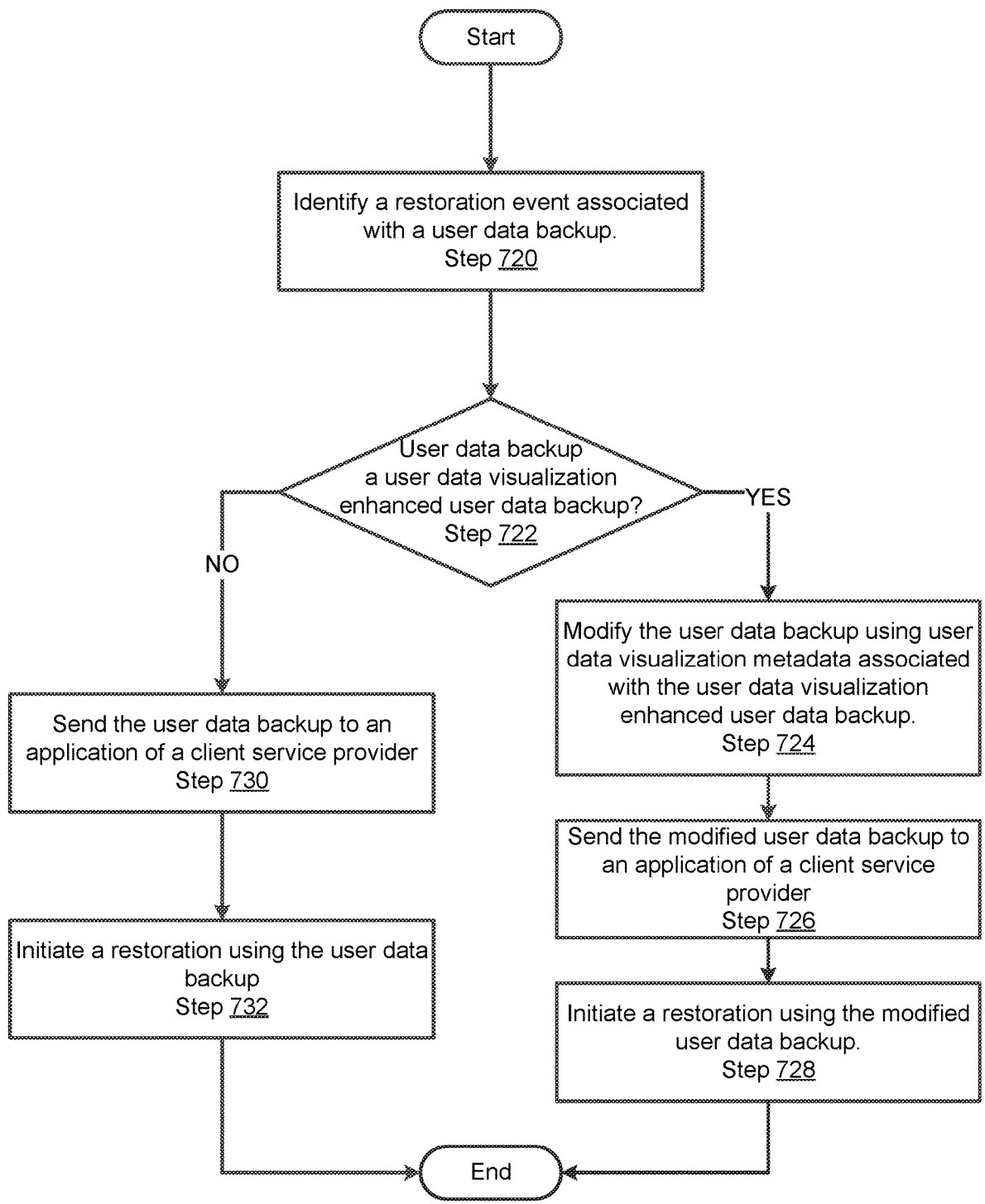
FIG. 7B shows a flowchart of a method for performing a restoration using a user data visualization enhanced user data backup in accordance with one or more embodiments of the invention.

FIGS. 7A-7B show methods that may be used to generate user data backups of limited-access user data in a manner that enables restorations performed using the user data backups to maintain previous visual representation of the limited-access user data. By doing so, information presented to a user may be preserved when the user data is restored using a user data backup.

FIG. 7A shows a flowchart of a method for generating a user data visualization enhanced user data backup in accordance with one or more embodiments of the invention. The method shown in FIG. 7A may be performed by, for example, the manager (e.g., 112, FIG. 1A) Other components of the system in FIG. 1A may perform all, or a portion, of the method of FIG. 7A without departing from the invention.

While FIG. 7A is illustrated as a series of steps, any of the steps may be omitted, performed in a different order, additional steps may be included, and/or any or all of the steps may be performed in a parallel and/or partially overlapping manner without departing from the invention.

In step 700, a backup generation event for limited-access user data based on a protection policy is identified.

As discussed above, protection policies may specify guidelines and/or requirements for protecting user data stored on the client service provider. The protection policies may specify backup generation events that trigger backups of user data. The manager of the storage may monitor the protection policies and identify the occurrence of the backup generation events specified by the protection policies. In response to the identification of the backup generation event, the manager of the storage may initiate the generation of a backup of user data.

For example, a protection policy may specify that user data of a user should be backed up once a week at noon on Sunday. Subsequently, the backup generation event may be at noon every Sunday. The manager of the storage may monitor this protection policy as well as the time and date, and at noon every Sunday, may initiate backup generation of user data associated with the protection policy.

In step 702, fragmented user data associated with the protection policy event is obtained from a limited-access user data repository.

In one or more embodiments of the invention, the manager of the storage sends application interface programming (API) calls to the application of the client service provider to obtain the fragmented user data associated with the protection policy event. The API calls may include requests for user data stored in the limited-access user data repository of the client service provider associated with a user. More specifically, the API calls may include requests for user data associated with a user that includes creation timestamps after the timestamp of the most recent previous backup associated with the user data. One or more API calls may be made to the client service provider to obtain the fragmented user data without departing from the invention. In response to obtaining the API calls, the client service provider may send the requested fragmented user data to the storage. Fragmented user data associated with the protection policy event may be obtained from the limited-access user data repository via other and/or additional methods without departing from the invention.

For example, a protection policy event may specify that a backup of user data is to be generated once a week at noon on Sunday. The manager may send one or more API calls requesting fragmented user data associated with the protection policy event that include creation timestamps that are more recent than the previously generated backup associated with the protection policy event. More specifically, the fragmented user data may include user data generated on the client service provider after the previous backup was generated on the previous Sunday. In response to the API calls, the client service provider may send the user data associated with the protection policy event that was generated after the previous Sunday to the storage.

In step 704, organizational metadata associated with the fragmented user data is obtained.

The manager of the storage may use the object identifiers included in the obtained fragmented user data to identify the organizational metadata for generating a user data backup.

The organizational metadata for generating a user data backup may be identified based on the obtained fragmented user data via other and/or additional methods without departing from the invention.

In one or more embodiments of the invention, the manager of the storage sends API calls to the application of the client service provider to obtain the identified organizational metadata associated with the obtained fragmented user data objects. The manager may send one or more API calls to the application of the client service provider. The API calls may include requests for organizational metadata that are associated with the identified object identifiers that are stored in the organizational metadata repository in the client service provider. In response to obtaining the API calls, the application of the client service provider may send the requested organizational metadata to the storage. The identified organizational metadata may be obtained via other and/or additional methods without departing from the invention.

In step 706, it is determined whether the fragmented user data is associated with a user data visualization.

In one or more embodiments of the invention, the obtained fragmented user data and organizational metadata includes information that indicates the obtained fragmented user data and organizational metadata with a user data visualization. As discussed above, a user data visualization may refer to a sequence of messages that may include the same subject, the same users, and a specific order of messages that may be associated with the messages. The organizational metadata may include references to a user data visualization such as a specific user data visualization message order for the message(s) included in the user data backup. The manager of the storage may identify any user data visualization references included in the organizational metadata. If the manager identifies a user data visualization reference, it may be determined that the fragmented user data is associated with a user data visualization. If the manager does not identify any user data visualization references, it may be determined that the fragmented user data is not associated with a user data visualization. It may be determined whether the fragmented user data is associated with a user data visualization via other and/or additional methods without departing from the invention.

The organizational metadata may include a user data visualization flag. The user data visualization flag may be a binary value that acts as an indicator as to whether the fragmented user data is associated with a user data visualization. If the flag is set, it may be determined that the obtained fragmented user data is associated with a user data visualization. If the flag is not set, it may be determined that the obtained fragmented user data is not associated with a user data visualization. It may be determined whether the fragmented user data is associated with a user data visualization via other and/or additional methods without departing from the invention.

If it is determined that the fragmented user data is associated with a user data visualization, then the method may proceed to step 710. If it is determined that the fragmented user data is not associated with a user data visualization, then the method may proceed to step 708.

In step 708, a user data backup is generated using the fragmented user data and the organizational metadata.

The manager of the storage may generate a user data backup using the organizational metadata and the updated fragmented user data as discussed above. The manager of the storage may generate backup metadata using both the fragmented user data and the organizational metadata. The user data backup may be generated by associating portions of the updated fragmented user data with portions of the backup metadata until each portion of the updated fragmented user data is associated with a portion of the backup metadata. The generated user data backup may result in a backup that is usable by the manager to restore inaccessible user data on the client service provider. A user data backup may be generated using the organizational metadata and the updated fragmented user data via other and/or additional methods without departing from the invention. For additional information regarding generating a user data backup, refer to FIG. 3B.

The method may end following step 708.

In step 710, user data visualization metadata associated with the fragmented user data is obtained.

The manager of the storage may use the object identifiers included in the obtained fragmented user data to identify the user data visualization metadata for generating a user data visualization enhanced user data backup. The user data visualization metadata for generating a user data visualization enhanced user data backup may be identified based on the obtained fragmented user data via other and/or additional methods without departing from the invention.

In one or more embodiments of the invention, the manager of the storage sends API calls to the application of the client service provider to obtain the identified user data visualization metadata associated with the obtained fragmented user data objects. The manager may send one or more API calls to the application of the client service provider. The API calls may include requests for user data visualization metadata that are associated with the identified object identifiers that are stored in the organizational metadata repository in the client service provider. In response to obtaining the API calls, the application of the client service provider may send the requested user data visualization metadata to the storage. The user data visualization metadata may be obtained via other and/or additional methods without departing from the invention.

In step 712, a user data visualization enhanced user data backup is generated using the fragmented user data, the organizational metadata, and the user data visualization metadata.

The manager of the storage may generate a user data visualization enhanced user data backup using the organizational metadata and the updated fragmented user data as discussed above. The manager of the storage may generate backup metadata using both the fragmented user data and the organizational metadata. The user data visualization enhanced user data backup may be generated by associating portions of the updated fragmented user data with portions of the backup metadata until each portion of the updated fragmented user data is associated with a portion of the backup metadata. The generated user data visualization enhanced user data backup may result in a backup that is usable by the manager to restore inaccessible user data on the client service provider. A user data visualization enhanced user data backup may be generated using the organizational metadata and the updated fragmented user data via other and/or additional methods without departing from the invention. For additional information regarding generating a user data visualization enhanced user data backup, refer to FIG. 3B.

The method may end following step 712.

FIG. 7B shows a flowchart of a method for performing a restoration using user data visualization enhanced user data backup in accordance with one or more embodiments of the invention. The method shown in FIG. 7B may be performed by, for example, the manager (e.g., 112, FIG. 1A) Other components of the system in FIG. 1A may perform all, or a portion, of the method of FIG. 7B without departing from the invention.

While FIG. 7B is illustrated as a series of steps, any of the steps may be omitted, performed in a different order, additional steps may be included, and/or any or all of the steps may be performed in a parallel and/or partially overlapping manner without departing from the invention.

In step 720, a restoration event associated with a user data backup is identified.

User data stored on the client service provider may become inaccessible for any reason. The client service provider or a component within may perform or initiate a restoration event that may be associated with a user data backup stored in the storage. The restoration event may include receiving a message from the application of the client service provider that requests the initiation of inaccessible user data using a user data backup. The message may include a user identifier and a user data backup identifier to specify the user data backup requested by the application of the client service provider. The manager of the storage may identify the message from the client service provider as a restoration event and, in response to identifying the restoration event, the manager of the storage may initiate the restoration using the specified user data backup. A restoration event associated with a user data backup may be identified via other and/or additional methods without departing from the invention.

In step 722, it is determined whether the user data backup is a user data visualization enhanced user data backup.

In one or more embodiments of the invention, it is determined whether the user data backup is a user data visualization enhanced backup by using the backup metadata of the user data backup. As discussed above, the backup metadata may include a backup type and extended metadata. The backup type may indicate whether the user data backup is a user data visualization enhanced user data backup or another type of user data backup (e.g., a conversation specific user data backup) without departing from the invention. Additionally, the extended metadata of the of the backup metadata may include user data visualization information associated with the user data backup. The manager of the storage may use the backup type and/or the extended metadata to determine whether the user data backup is a user data visualization enhanced user data backup. If the backup type and/or the extended metadata indicate that the user data backup is a user data visualization enhanced user data backup, then it may be determined that the user data backup is a user data visualization enhanced user data backup. If the backup type and/or the extended metadata indicate that the user data backup is not a user data visualization enhanced user data backup, then it may be determined that the user data backup is not a user data visualization enhanced user data backup. It may be determined whether the user data backup is a user data visualization enhanced user data backup via other and/or additional methods without departing from the invention.

If it is determined that the user data backup is a user data visualization enhanced user data backup, then the method may proceed to step 724. If it is determined that the user data backup is not a user data visualization enhanced user data backup, then the method may proceed to step 730.

In step 724, the user data backup is modified using the user data visualization metadata associated with the user data visualization enhanced user data backup.

In response to the determination in step 622 that the user data backup is a user data visualization enhanced user data backup, the manager of the storage may modify the user data backup to include the user data visualization metadata included in the extended metadata of the backup metadata associated with the user data backup. As discussed above, the user data visualization metadata may include user data visualization information associated with a specific user data visualization when displayed to a user on the application of the client service provider. The user display information of the user data visualization metadata may be included in the user data backup along with the fragmented user data and the organizational metadata for restoration purposes. As a result, the user data restored using the modified user data backup may include accurate user data visualization information. The user data backup may be modified using the user data visualization metadata associated with the user data visualization enhanced user data backup via other and/or additional methods without departing from the invention.

In step 726, the modified user data backup is sent to an application of a client service provider.

The manager of the storage may send a message an application of the client service provider. The message may include the modified user data backup. The message may include other and/or additional information. The modified user data backup may be sent to an application of the client service provider via other and/or additional methods without departing from the invention.

In step 728, a restoration using the modified user data backup is initiated.

In one or more embodiments of the invention, the manager of the storage sends an API call to the application of the client service provider to initiate a restoration using the modified user data backup. The API call may include a request to initiate the restoration of inaccessible user data stored on the client service provider using the modified user data backup. A restoration using the modified user data backup may be initiated via other and/or additional methods without departing from the invention.

Initiating the restoration may cause the user data to be restored using the modified user data backup. Because the modified user data backup includes information previously used to graphically render representations of portions of the user data, performing the restoration using the modified user data backup may include causing the application (or other applications) that gates access to the user data to render it as it was rendered prior to the restoration and/or restoration event.

The method may end following step 728.

In step 730, the user data backup is sent to an application of a client service provider.

The manager of the storage may send a message an application of the client service provider. The message may include the user data backup. The message may include other and/or additional information. The user data backup may be sent to an application of the client service provider via other and/or additional methods without departing from the invention.

In step 732, a restoration using the user data backup is initiated.

In one or more embodiments of the invention, the manager of the storage sends an API call to the application of the client service provider to initiate a restoration using the user data backup. The API call may include a request to initiate the restoration of inaccessible user data stored on the client service provider using the user data backup. A restoration using the user data backup may be initiated via other and/or additional methods without departing from the invention.

The method may end following step 732.

Figure 8A:
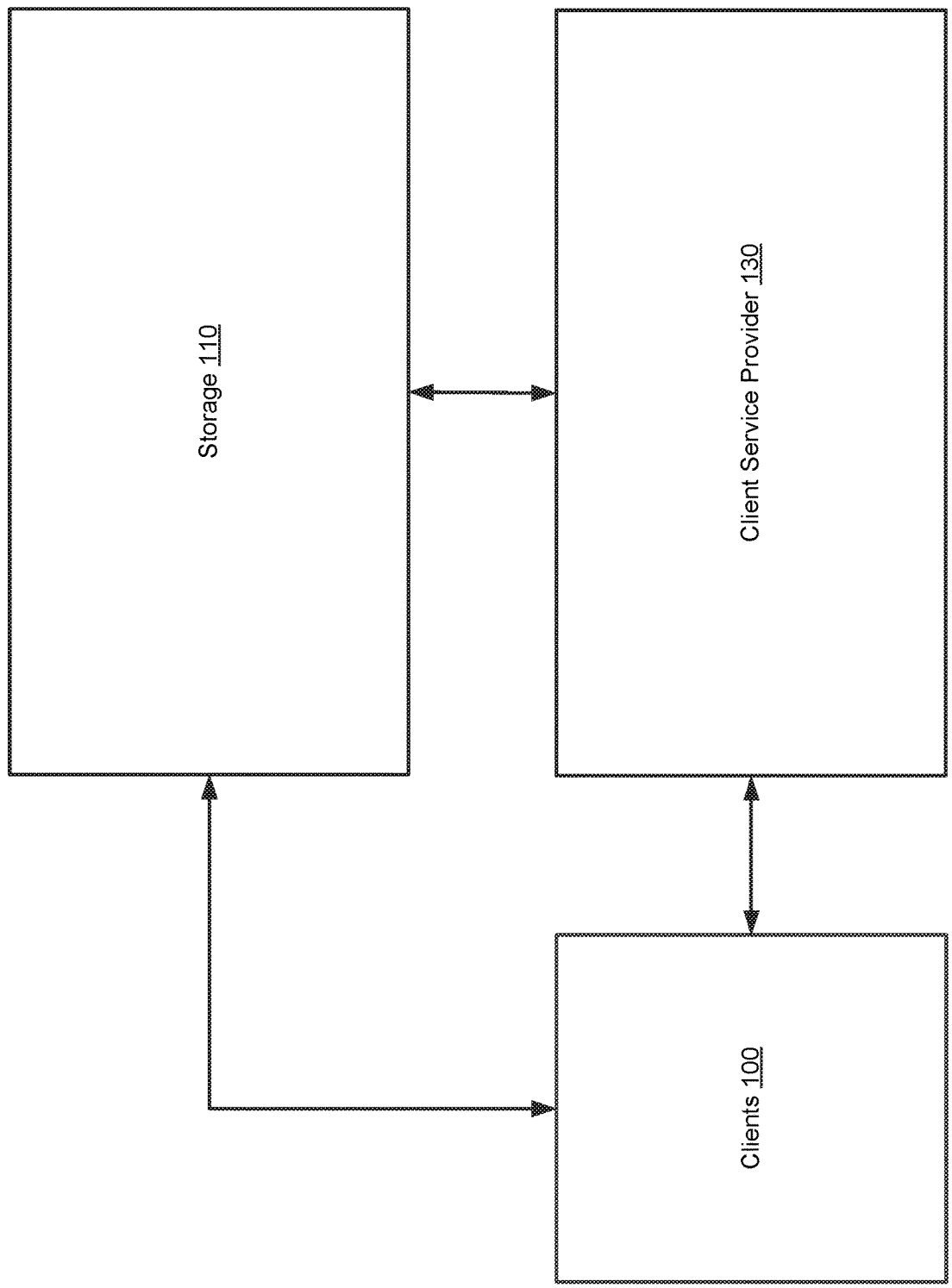

To further clarify aspects of embodiments of the invention, non-limiting examples are provided in FIGS. 8A-8J. FIG. 8A shows a diagram of an example system and FIGS. 8B-8J shows diagrams of actions that may be performed by the example system of FIG. 8A. The system of FIG. 8A may be similar to that of FIG. 1A. For the sake of brevity, only a limited number of components of the system of FIG. 1A are illustrated in FIG. 8A.

Example

FIGS. 8A-8J show diagrams of examples in accordance with one or more embodiments of the invention. Consider a scenario as illustrated in FIG. 8A in which users of the system access the clients (100) to generate user data on the client service provider (130), and a storage (110) is providing user data backup and restoration services for the user data stored on the client service provider (130). As discussed above, other components of the storage (110) and the client service provider (130) are not illustrated in FIGS. 8A-8J for brevity.

Figure 8B:
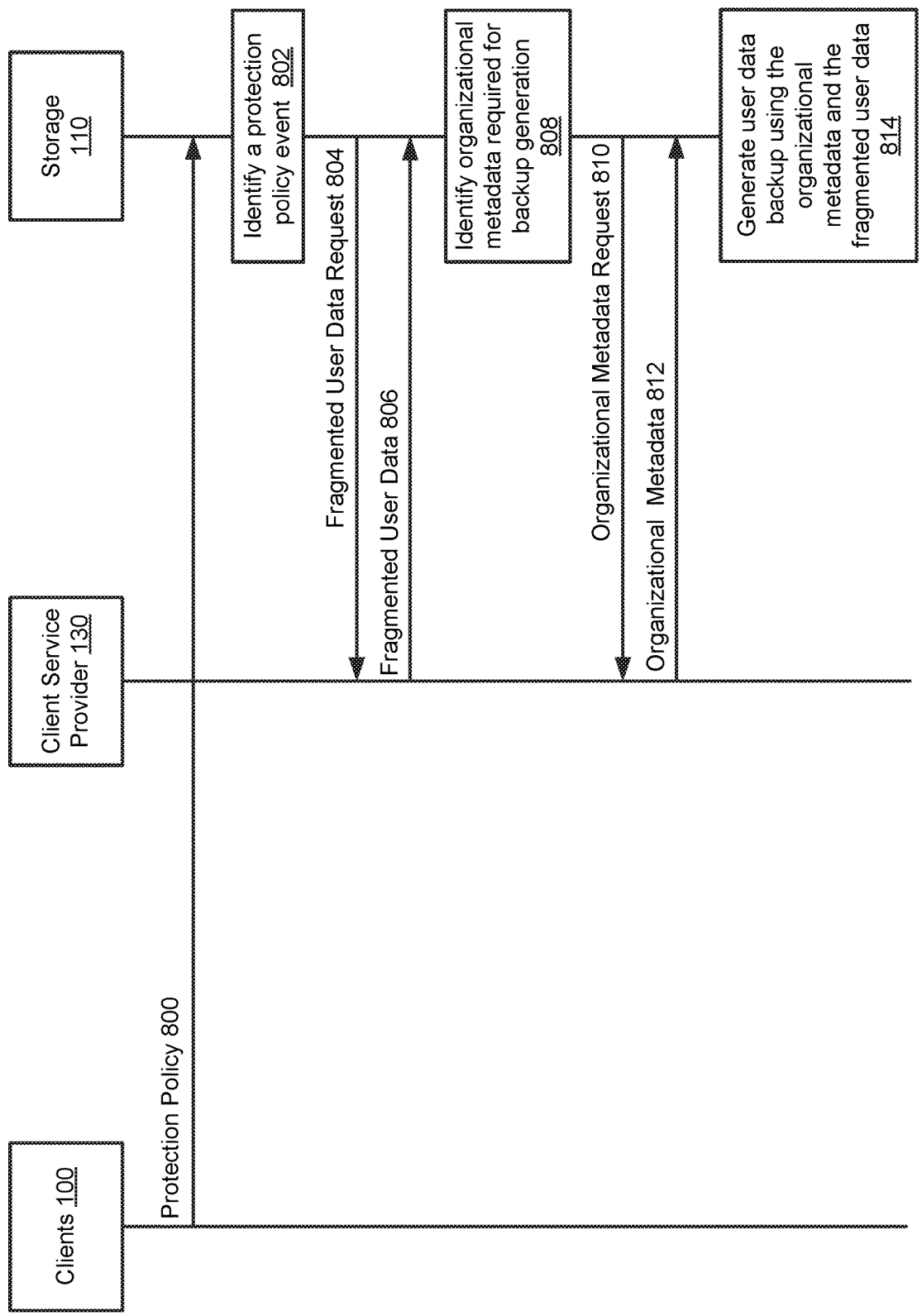

In order to provide such user data backup generation and restoration services, the storage (110) (or other entities such as a manager of the storage) may a request protection policy from the clients (100) that may provide guidelines for backing up user data stored on the client service provider (130). FIG. 8B shows an interaction diagram that illustrates interactions between the clients, the client service provider (130), and the storage (110).

At a first point in time, the clients (100) sends a protection policy (800) to the storage (110). After obtaining the protection policy, the storage (110) identifies a protection policy event (802) initiating a backup of user data stored on the client service provider (130). In response to the identification of the protection policy event, the storage (110) sends a fragmented user data request (804) to the client service provider (130). Upon receiving the fragmented user data request, the client service provider (130) sends the requested fragmented user data (806) to the storage (110).

After obtaining the fragmented user data from the client service provider (130) the storage (110) identifies organizational metadata required for backup generation of the user data (808). Once the organizational metadata required for backup generation is identified, the storage (110) sends a request to the client service provider (130) for the organizational metadata (810). In response to receiving the organizational metadata request, the client service provider (130) may send the requested organizational metadata (812) to the storage (110). After receiving both the organizational metadata and the fragmented user data, the storage (110) generates a user data backup using the organizational metadata and the fragmented user data (814).

Figure 8C:
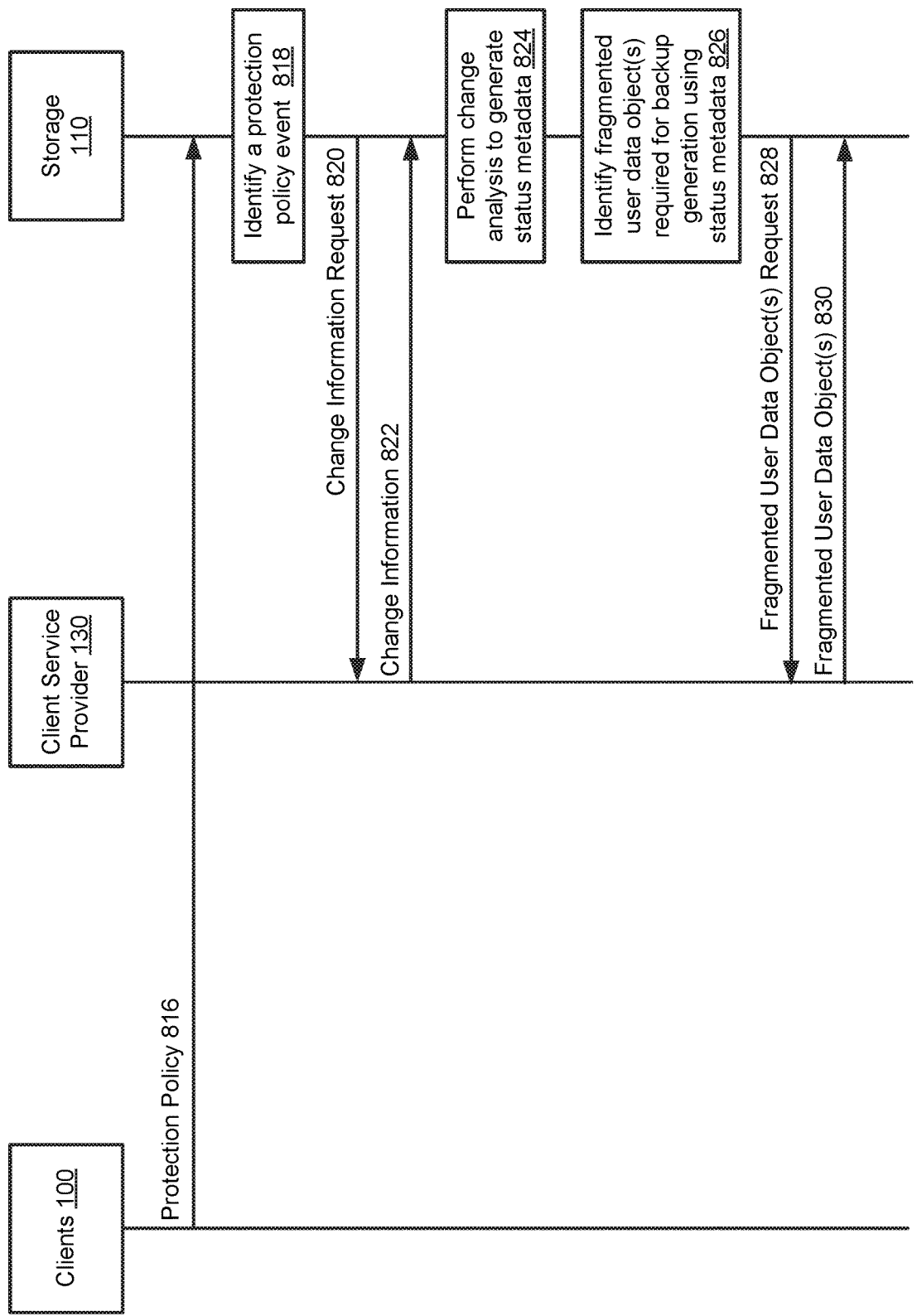

The backup generation and restoration services provided by the storage (110) may include generating incremental user data backups. FIG. 8C shows a second interaction diagram illustrating interactions between the clients (100), the client service provider (130), and the storage (110).

At a first point in time, the clients (100) sends a protection policy (816) to the storage (110). After obtaining the protection policy, the storage (110) identifies a protection policy event initiating a backup of user data stored on the client service provider (818). In response to the identification of the protection policy event, the storage (110) sends a change information request to the client service provider (820). Upon receiving the change information request, the client service provider (130) sends the change information to the storage (822).

After obtaining the change information, the storage (110) performs change analysis using the change information to generate status metadata (824). Once the status metadata is generated, the storage (110) identifies fragmented user data object(s) required for backup generation using the status metadata (826). The identified fragmented user data objects does not include all of the user data objects associated with the protection policy event, only the objects that have been modified since the previous user data backup associated with the protection policy was generated. Then the storage (110) sends a request to the client service provider (130) for the fragmented user data object(s) that were previously identified (828). In response to the fragmented user data object(s) request, the client service provider (130) sends the requested fragmented user data object(s) to the storage (830).

Figure 8D:
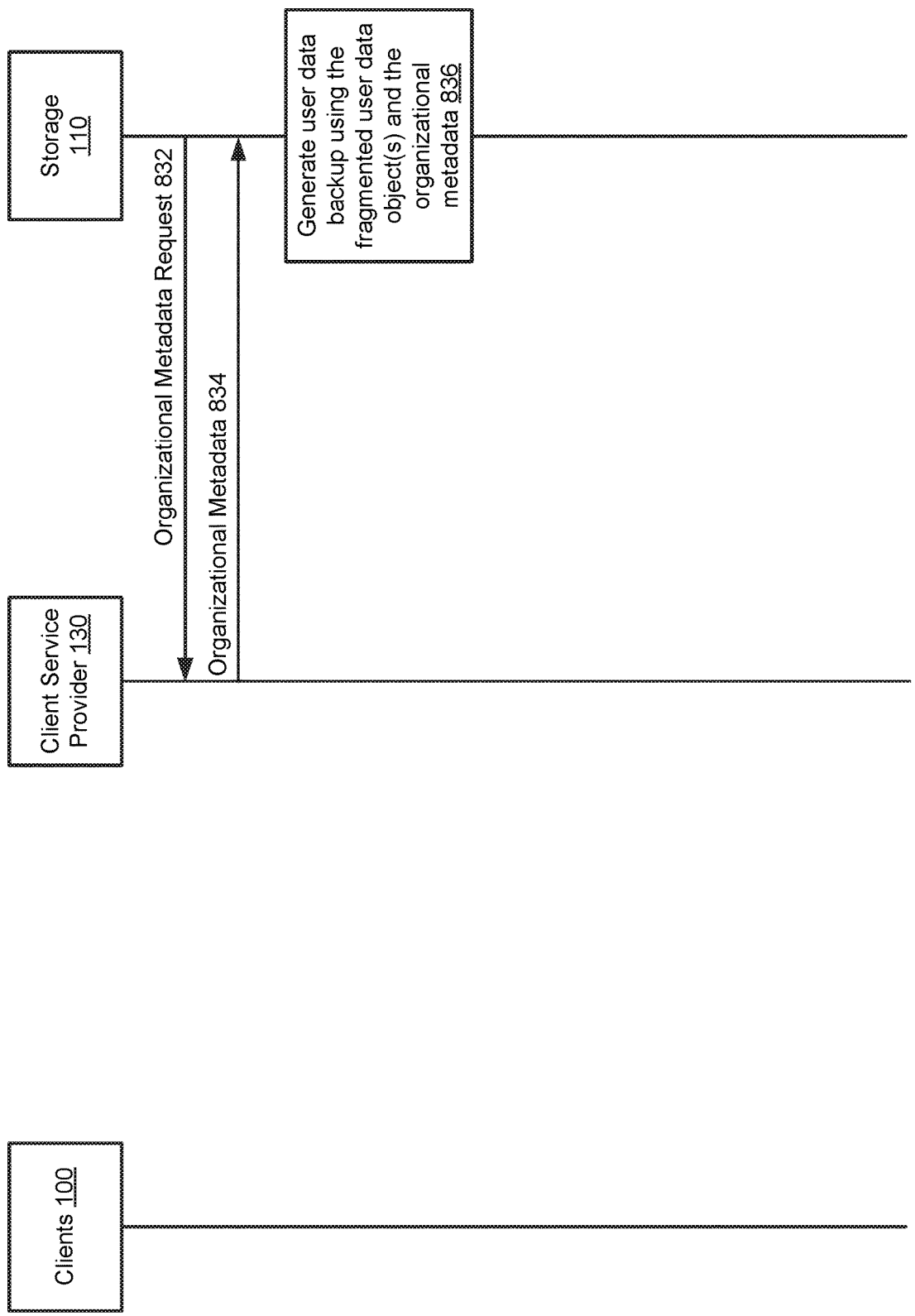

FIG. 8D shows a continuation of the example depicted in FIG. 8C. After obtaining the fragmented user data object(s), the storage (110) sends a request to the client service provider (130) for organizational metadata associated with the obtained fragmented user data object(s) (832). In response to the request, the client service provider (130) sends the requested organizational metadata to the storage (834). After obtaining both the organizational metadata and the fragmented user data object(s), the storage (110) generates a user data backup using the fragmented user data backup using the fragmented user data object(s) and the organizational metadata (836). The user data backup is an incremental user data backup as the user data backup include status metadata that indicates that each fragmented user data object(s) included in the user data backup was modified and none of the objects are new objects.

Figure 8E:
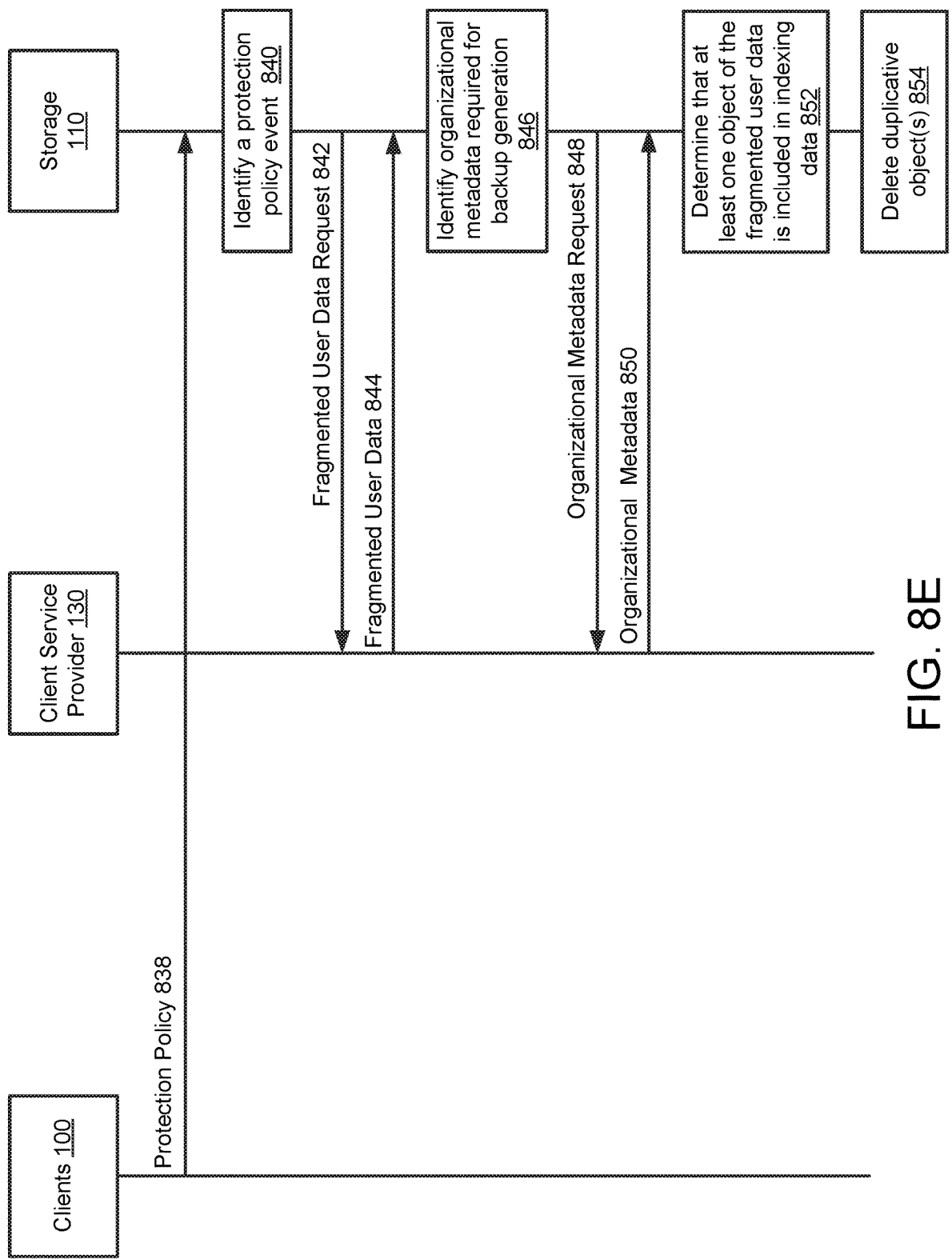

The backup generation and restoration services provided by the storage (110) include the functionality delete duplicative user data objects that are already stored in the storage (110) in order to improve storage capacity. FIG. 8E shows an interaction diagram of a third example for providing the aforementioned portion of the backup generation and restoration services that shows actions between the clients (100), the client service provider (130), and the storage (110).

At a first point in time, the clients (100) sends a protection policy to the storage (838). After obtaining the protection policy from the clients (100), the storage (110) identifies a protection policy event associated with the obtained protection policy (840). In response to identifying the protection policy event, the storage (110) sends a request to the client service provider (130) for fragmented user data associated with the protection policy event (842). Then the client service provider (130) sends the requested fragmented user data to the storage (844).

After obtaining the fragmented user data, the storage (110) identifies organizational metadata required for backup generation using the obtained fragmented user data (846). Once the required organizational metadata is identified, the storage (110) sends a request to the client service provider (130) for the identified organizational metadata (848). In response to receiving the organizational metadata request, the client service provider (130) sends the requested organizational metadata to the storage (850).

Figure 8F:
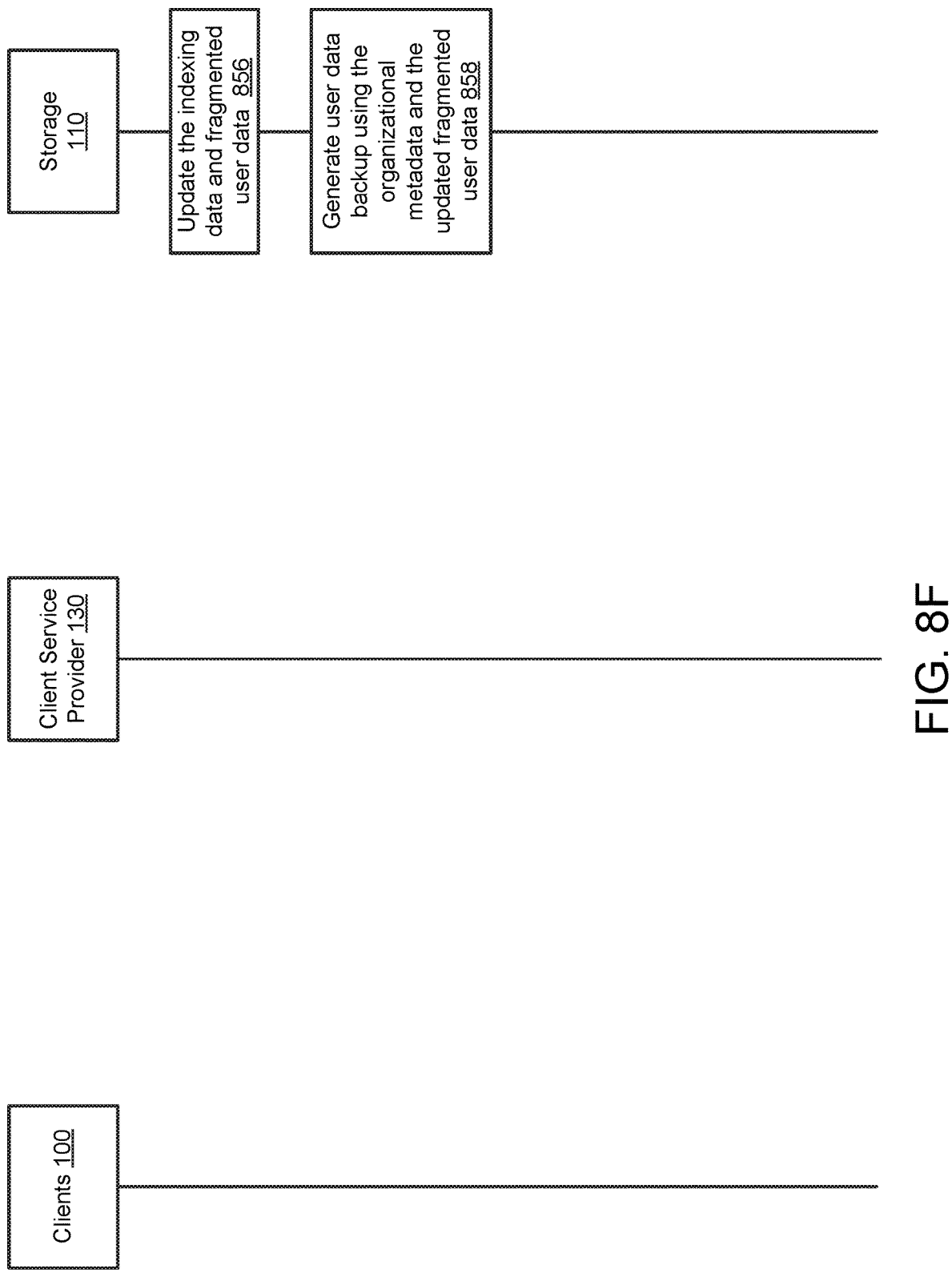

FIG. 8F shows a continuation of the example depicted in FIG. 8E. After obtaining both the fragmented user data and the organizational metadata, the storage (110) determines that at least one object of the fragmented user data is included in the indexing data (852). In response to determining that at least one object of the fragmented user data is included in the indexing data, the storage (110) deletes the duplicative object(s) from the fragmented user data (854). After deleting the duplicative object(s) from the fragmented user data, the storage (110) updates the indexing data and the fragmented user data (856). Once the indexing data is updated, the storage (110) generates a user data backup using the organizational metadata and the updated fragmented user data (858).

Figure 8G:
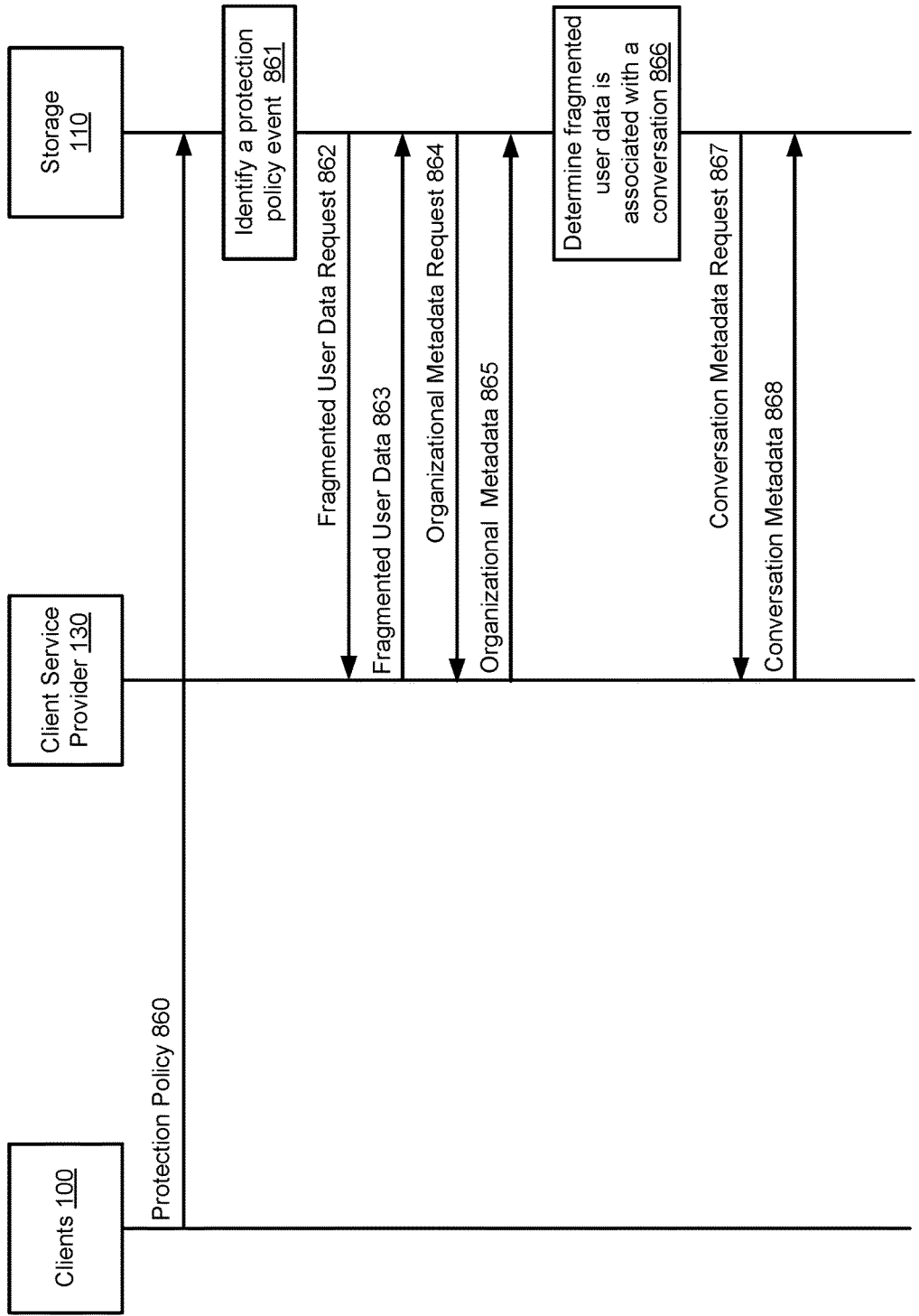

The backup generation and restoration services provided by the storage (110) include the functionality to generate conversation specific user data backups. FIG. 8G shows an interaction diagram of a fourth example for providing the aforementioned portion of the backup generation and restoration services that shows actions between the clients (100), the client service provider (130), and the storage (110).

At a first point in time, the clients (100) sends a protection policy to the storage (860). After obtaining the protection policy from the clients (100), the storage (110) identifies a protection policy event associated with the obtained protection policy (861). In response to identifying the protection policy event, the storage (110) sends a request to the client service provider (130) for fragmented user data associated with the protection policy event (862). Then the client service provider (130) sends the requested fragmented user data to the storage (863).

After obtaining the fragmented user data, the storage (110) sends a request to the client service provider (130) for organizational metadata associated with the fragmented user data (864). In response to receiving the organizational metadata request, the client service provider (130) sends the requested organizational metadata to the storage (865).

After obtaining both the fragmented user data and the organizational metadata, the storage (110) makes a determination that the fragmented user data is associated with a conversation (866). In response to the determination that the fragmented user data is associated with a conversation, the storage (110) sends a request to the client service provider (130) for conversation metadata associated with the fragmented user data (867). Upon receiving the request, the client service provider (130) sends the conversation metadata to the storage (868).

FIG. 8H shows a continuation of the example depicted in FIG. 8G. After receiving the fragmented user data, the organizational metadata, and the conversation metadata, the storage (110) generates a conversation specific user data backup using the organizational metadata, the conversation metadata, and the fragmented user data (869). Following the generation of the conversation specific user data backup, the storage (110) identifies a restoration event associated with a user data backup stored on the storage (870).

In response to the identification of the restoration event, the storage (110) makes a determination that the user data backup associated with the restoration event is a conversation specific user data backup (871). After making the determination that the user data backup is a conversation specific user data backup, the storage (110) modifies the user data backup with the conversation metadata of the extended metadata (872). Then the storage (110) sends the modified user data backup to the client service provider (873). After that, the storage (110) sends a message to the client service provider (130) that includes a request to initiate restoration using the modified user data backup (874).

Figure 8I:
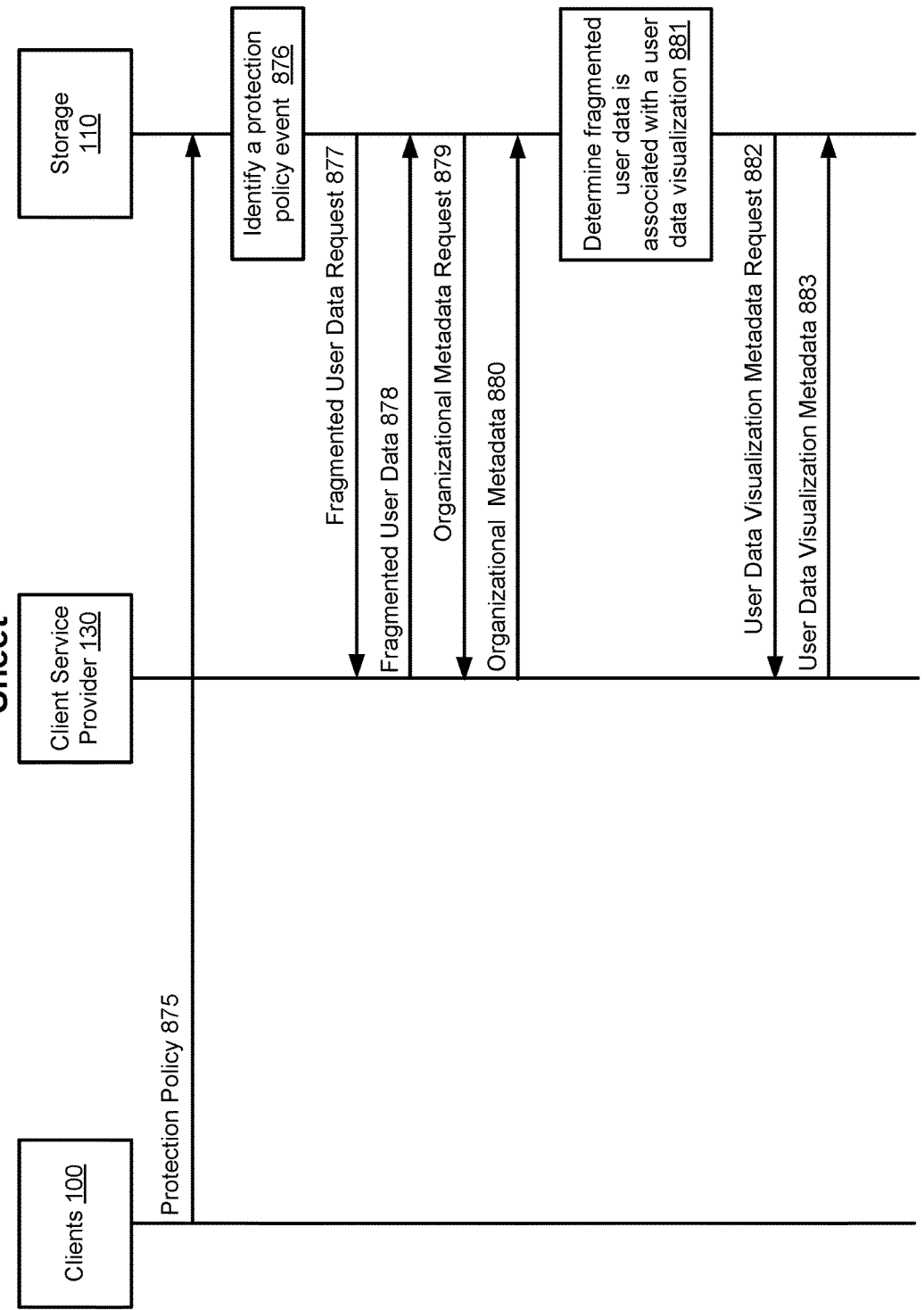

The backup generation and restoration services provided by the storage (110) include the functionality to generate user data visualization enhanced user data backups. FIG. 8I shows an interaction diagram of a fifth example for providing the aforementioned portion of the backup generation and restoration services that shows actions between the clients (100), the client service provider (130), and the storage (110).

At a first point in time, the clients (100) sends a protection policy to the storage (875). After obtaining the protection policy from the clients (100), the storage (110) identifies a protection policy event associated with the obtained protection policy (876). In response to identifying the protection policy event, the storage (110) sends a request to the client service provider (130) for fragmented user data associated with the protection policy event (877). Then the client service provider (130) sends the requested fragmented user data to the storage (878).

After obtaining the fragmented user data, the storage (110) sends a request to the client service provider (130) for organizational metadata associated with the fragmented user data (879). In response to receiving the organizational metadata request, the client service provider (130) sends the requested organizational metadata to the storage (880).

After obtaining both the fragmented user data and the organizational metadata, the storage (110) makes a determination that the fragmented user data is associated with a user data visualization (881). In response to the determination that the fragmented user data is associated with a user data visualization, the storage (110) sends a request to the client service provider (130) for user data visualization metadata associated with the fragmented user data (882). Upon receiving the request, the client service provider (130) sends the user data visualization metadata to the storage (883).

Figure 8J:
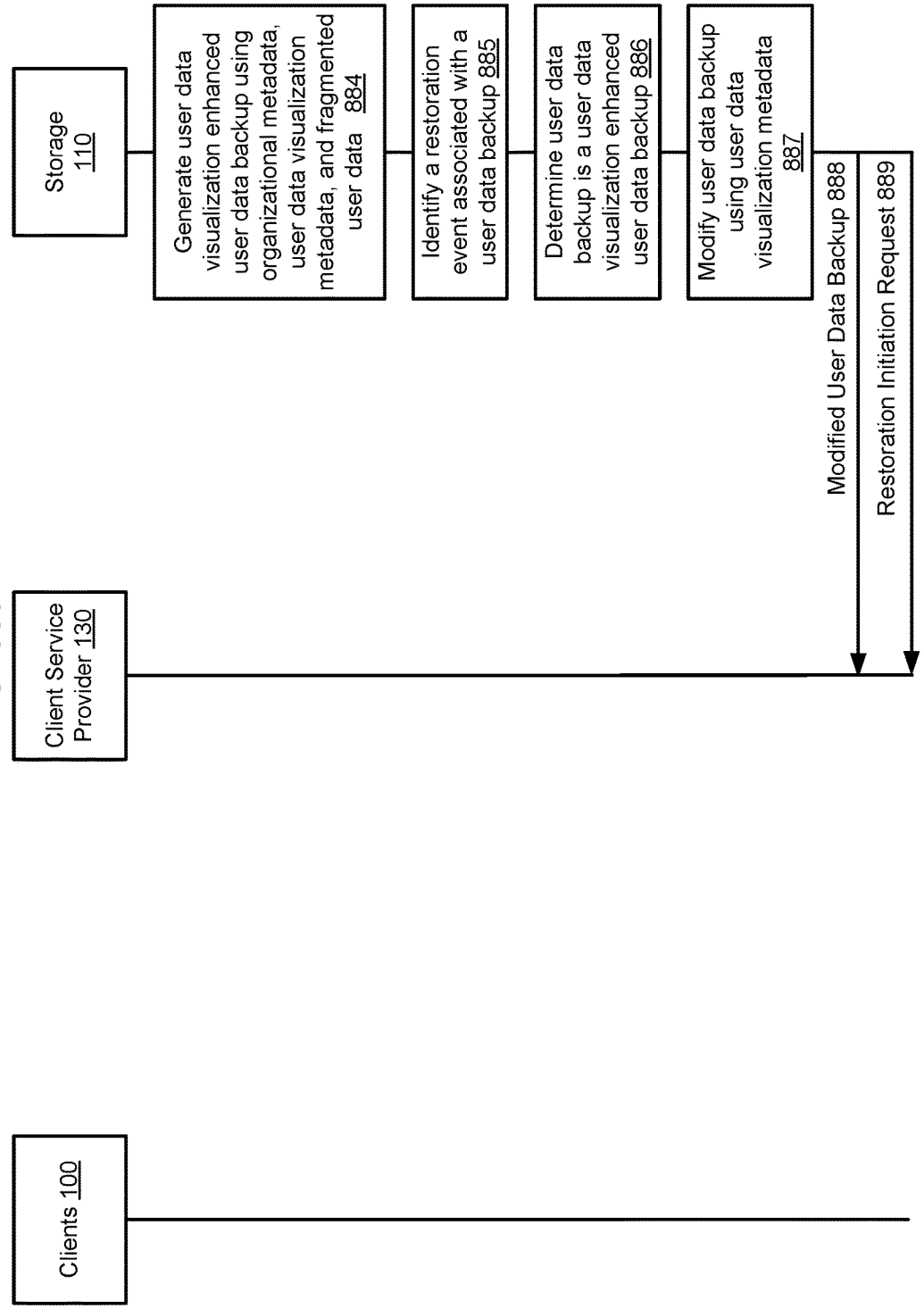

FIG. 8J shows a continuation of the example depicted in FIG. 8I. After receiving the fragmented user data, the organizational metadata, and the user data visualization metadata, the storage (110) generates a user data visualization enhanced user data backup using the organizational metadata, the user data visualization metadata, and the fragmented user data (884). Following the generation of the user data visualization enhanced user data backup, the storage (110) identifies a restoration event associated with a user data backup stored on the storage (885).

In response to the identification of the restoration event, the storage (110) makes a determination that the user data backup associated with the restoration event is a user data visualization enhanced user data backup (886). After making the determination that the user data backup is a user data visualization enhanced user data backup, the storage (110) modifies the user data backup with the user data visualization metadata of the extended metadata (887). Then the storage (110) sends the modified user data backup to the client service provider (888). After that, the storage (110) sends a message to the client service provider (130) that includes a request to initiate restoration using the modified user data backup (889).

End of Example

Thus, as illustrated in FIGS. 8A-8I, embodiments of the invention may provide a method for protecting user data stored on a client service provider. By protecting such user data, user data that becomes inaccessible may be restored. Consequently, the impact of the potential inaccessible user data may be reduced.

Figure 9:
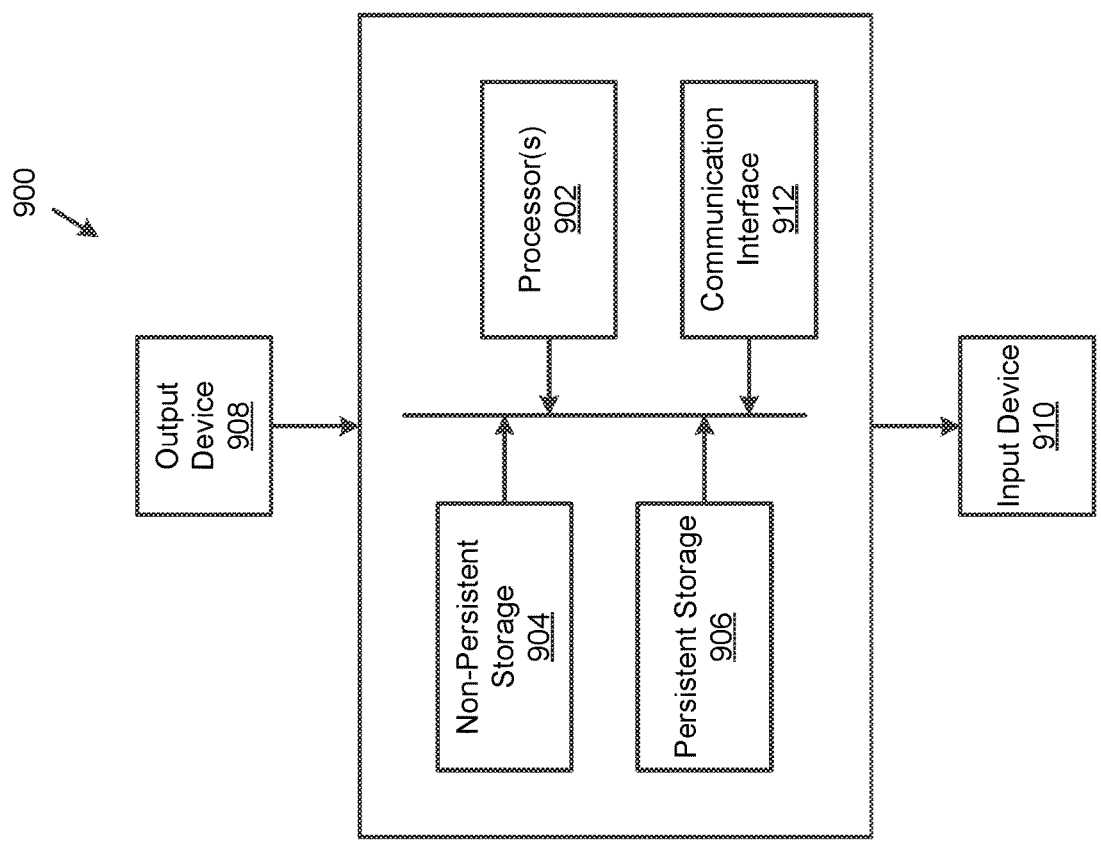
FIG. 9 shows diagram of a computing system in accordance with one or more embodiments of the invention.

As discussed above, embodiments of the invention may be implemented using computing devices. FIG. 9 shows a diagram of a computing device in accordance with one or more embodiments of the invention. The computing device (900) may include one or more computer processors (902), non-persistent storage (904) (e.g., volatile memory, such as random access memory (RAM), cache memory), persistent storage (906) (e.g., a hard disk, an optical drive such as a compact disk (CD) drive or digital versatile disk (DVD)

drive, a flash memory, etc.), a communication interface (912) (e.g., Bluetooth interface, infrared interface, network interface, optical interface, etc.), input devices (910), output devices (908), and numerous other elements (not shown) and functionalities. Each of these components is described below.

In one embodiment of the invention, the computer processor(s) (902) may be an integrated circuit for processing instructions. For example, the computer processor(s) may be one or more cores or micro-cores of a processor. The computing device (900) may also include one or more input devices (910), such as a touchscreen, keyboard, mouse, microphone, touchpad, electronic pen, or any other type of input device. Further, the communication interface (912) may include an integrated circuit for connecting the computing device (900) to a network (not shown) (e.g., a local area network (LAN), a wide area network (WAN) such as the Internet, mobile network, or any other type of network) and/or to another device, such as another computing device.

In one embodiment of the invention, the computing device (900) may include one or more output devices (908), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (902), non-persistent storage (904), and persistent storage (906). Many different types of computing devices exist, and the aforementioned input and output device(s) may take other forms.

Embodiments of the invention relate to a method and system for generating user data backups of limited-access user data using indexing data. More specifically, embodiments of the invention relate to deleting duplicative objects of the fragmented user data to improve the computational efficiency of protecting limited-access user data using the indexing data. The indexing data may include an object repository that tracks the user data objects stored in a storage and the storage locations of each object. The indexing data may be updated based on the user data objects included and/or discarded from user data backups.

In traditional systems, duplicative user data objects are not discarded from the user data backup, resulting in computational inefficiency and a reduction in storage capacity. Embodiments of the invention improve the traditional system by discarding duplicative user data objects from user data backups using indexing data. As a result, the computational efficiency and the storage capacity is improved.

The problems discussed above should be understood as being examples of problems solved by embodiments of the invention disclosed herein and the invention should not be limited to solving the same/similar problems. The disclosed invention is broadly applicable to address a range of problems beyond those discussed herein.

One or more embodiments of the invention may be implemented using instructions executed by one or more processors of the data management device. Further, such instructions may correspond to computer readable instructions that are stored on one or more non-transitory computer readable mediums.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A method for providing backup generation services for limited-access user data, comprising:
   obtaining fragmented user data, associated with an object that is potentially duplicative of an object stored in an object repository, from the limited-access user data, wherein:
     access to the limited-access user data is gated by an application that includes the functionality to provide portions of data chunks of the limited-access user data to a manager; and
     the fragmented user data comprises the portions of data chunks obtained using the functionality of the application;
   making a determination, that the object is duplicative based on a copy of the object stored in the object repository;
   in response to making the determination:
     generating a user data backup using the fragmented user data and organizational metadata associated with the fragmented user data without adding the object to the user data backup, wherein generating the user data backup comprises:
       generating backup metadata portions comprising a portion of the organizational metadata, a backup type, status metadata, and web-hook information; and
       associating at least one backup metadata portion of the backup metadata portions with at least one portion of the fragmented user data;
     associating the fragmented user data in the user data backup with the copy of the object stored in the object repository; and
     storing the user data backup in persistent storage.

2. The method of claim 1, wherein the object is an attachment to an electronic mail communication.

3. The method of claim 2, wherein the electronic mail communication is addressed to at least two users.

4. The method of claim 3, wherein a copy of the electronic mail communication is stored as part of a previously generated user data backup.

5. The method of claim 2, wherein associating the fragmented user data in the user data backup with the copy of the object stored in the object repository comprises:
   removing the attachment from the electronic mail communication; and
   adding a reference to the copy of the object stored in the object repository.

6. The method of claim 1, wherein obtaining a copy of the object via the application does not indicate to the manager that the object is duplicative.

7. A non-transitory computer readable medium comprising computer readable program code, which when executed by a computer processor enables the computer processor to perform a method for providing backup generation services for limited-access user data, the method comprising:
   obtaining fragmented user data, associated with an object that is potentially duplicative of an object stored in an object repository, from the limited-access user data, wherein:
     access to the limited-access user data is gated by an application that includes the functionality to provide portions of data chunks of the limited-access user data to a manager; and the fragmented user data comprises the portions of data chunks obtained using the functionality of the application;

making a determination, that the object is duplicative based on a copy of the object stored in the object repository;

in response to making the determination:
  generating a user data backup using the fragmented user data and organizational metadata associated with the fragmented user data without adding the object to the user data backup, wherein generating the user data backup comprises:
    generating backup metadata portions comprising a portion of the organizational metadata, a backup type, status metadata, and web-hook information; and
    associating at least one backup metadata portion of the backup metadata portions with at least one portion of the fragmented user data;
  associating the fragmented user data in the user data backup with the copy of the object stored in the object repository; and
  storing the user data backup in persistent storage.

8. The non-transitory computer readable medium of claim 7, wherein the object is an attachment to an electronic mail communication.

9. The non-transitory computer readable medium of claim 8, wherein the electronic mail communication is addressed to at least two users.

10. The non-transitory computer readable medium of claim 9, wherein a copy of the electronic mail communication is stored as part of a previously generated user data backup.

11. The non-transitory computer readable medium of claim 7, wherein obtaining a copy of the object via the application does not indicate to the manager that the object is duplicative.

12. A system for providing backup services for limited-access user data, comprising:
  persistent storage for storing:
    an object repository, and
    a user data backup; and
  a manager programmed to:
    obtain fragmented user data, associated with an object that is potentially duplicative of an object stored in the object repository, from the limited-access user data, wherein:
      access to the limited-access user data is gated by an application that includes the functionality to provide portions of data chunks of the limited-access user data to the manager; and
      the fragmented user data comprises the portions of data chunks obtained using the functionality of the application;
    make a determination, that the object is duplicative based on a copy of the object stored in the object repository;
    in response to making the determination:
      generate the user data backup using the fragmented user data and organizational metadata associated with the fragmented user data without adding the object to the user data backup, wherein generating the user data backup comprises:
        generating backup metadata portions comprising a portion of the organizational metadata, a backup type, status metadata, and web-hook information; and
        associating at least one backup metadata portion of the backup metadata portions with at least one portion of the fragmented user data;
      associate the fragmented user data in the user data backup with the copy of the object stored in the object repository; and
      store the user data backup in the persistent storage, wherein the user data backup comprises web hook information associated with the object.

13. The system of claim 12, wherein the object is an attachment to an electronic mail communication.

14. The system of claim 13, wherein the electronic mail communication is addressed to at least two users.

15. The system of claim 14, wherein a copy of the electronic mail communication is stored as part of a previously generated user data backup.

16. The system of claim 13, wherein associating the fragmented user data in the user data backup with the copy of the object stored in the object repository comprises:
  removing the attachment from the electronic mail communication; and
  adding a reference to the copy of the object stored in the object repository.

17. The system of claim 12, wherein obtaining a copy of the object via the application does not indicate to the manager that the object is duplicative.

* * * * *

UNITED STATES PATENT AND TRADEMARK OFFICE
CERTIFICATE OF CORRECTION

| | |
|---|---|
| PATENT NO. | : 11,625,305 B2 |
| APPLICATION NO. | : 16/886456 |
| DATED | : April 11, 2023 |
| INVENTOR(S) | : Shelesh Chopra et al. |

It is certified that error appears in the above-identified patent and that said Letters Patent is hereby corrected as shown below:

In the Claims

Claim 12, Column 54, Lines 28-29, the phrase "wherein the user data backup comprises web hook information associated with the object" should be deleted.

Signed and Sealed this
Twenty-seventh Day of June, 2023

Katherine Kelly Vidal
*Director of the United States Patent and Trademark Office*